(12) United States Patent
Monyei et al.

(10) Patent No.: US 12,711,567 B2
(45) Date of Patent: Aug. 18, 2026

(54) ARTIFICIAL INTELLIGENCE-BASED SYSTEM FOR INTEGRATED OPTIMIZATION OF AUTONOMOUS ELECTRIC VEHICLE FLEETS ACROSS TRANSPORTATION AND ELECTRICITY NETWORKS

(71) Applicant: Escrow-Tech Limited, Bradley Stoke (GB)

(72) Inventors: Chukwuka Gideon Monyei, Bradley Stoke (GB); Jennifer Ifechi Alphonsus, Bradley Stoke (GB); Michael Oluwadamilola Obolo, Amsterdam (NL); Christian Chitom Alphonsus, Lagos (NG); David Okwuchukwu Alphonsus, Lagos (NG); Peter Ayokunle Popoola, Durban (ZA); Chukwuemeka Godwin Monyei, Ashford (GB); Emmanuel Chukwunweike Monyei, Bochum (DE); Chinaza Favour Onwuka, Ibadan (NG); Daniel Adeboye, Abuja (NG); Uduak Christopher Edet, Abuja (NG); Michael Olusegun Ogunlowo, Lagos (NG); Godspower Ikenna Ogbonna, Ajah (NG); Emmanuel Chibuisi Otuonye, Kubwa (NG); Paul Osato Aigbekaen, Afijio L.G.A (NG)

(73) Assignee: ESCROW-TECH LIMITED, Bristol (GB)

( * ) Notice: Subject to any disclaimer, the term of this patent is extended or adjusted under 35 U.S.C. 154(b) by 0 days.

(21) Appl. No.: 19/238,441

(22) Filed: Jun. 14, 2025

(65) Prior Publication Data

US 2026/0004375 A1 Jan. 1, 2026

Related U.S. Application Data

(63) Continuation-in-part of application No. 18/759,717, filed on Jun. 28, 2024, now Pat. No. 12,333,457.

(51) Int. Cl.
*G06Q 50/40* (2024.01)
*B60L 55/00* (2019.01)
(Continued)

(52) U.S. Cl.
CPC .............. *G06Q 50/40* (2024.01); *B60L 55/00* (2019.02); *G05B 13/0265* (2013.01);
(Continued)

(58) Field of Classification Search
CPC .... G06Q 50/06; G06Q 10/04; G06Q 30/0283; G06Q 10/06; G06Q 10/06315; G05F 1/66; G05B 19/042; B60L 53/63; B60L 53/62
See application file for complete search history.

(56) References Cited

U.S. PATENT DOCUMENTS 7,969,324 B2 6/2011 Chevion et al.
9,224,293 B2 12/2015 Taylor
(Continued)

FOREIGN PATENT DOCUMENTS

CN 113128606 A 7/2021
DE 112011104561 T5 11/2013
(Continued)

OTHER PUBLICATIONS

S. Zhang, et al. "Online Joint Ride-Sharing and Dynamic Vehicle-to-Grid Coordination for Connected Electric Vehicle System," in IEEE Transactions on Transportation Electrification, vol. 10, No. 1, pp. 1194-1206, Mar. 2024 <https://ieeexplore.ieee.org/document/10147888?source=IQplus > (Year: 2024).*
(Continued)

*Primary Examiner* — Jerry O'Connor
*Assistant Examiner* — Michael R Koester
(74) *Attorney, Agent, or Firm* — GALVIN PATENT LAW LLC; Brian R. Galvin

(57) ABSTRACT

A system and method for integrated optimization of autonomous electric vehicle fleets across transportation and electricity networks which employs artificial intelligence to
(Continued)

dynamically allocate autonomous electric vehicles between mobility services and electricity grid services based on real-time conditions. The platform acquires data including energy mix forecasts, earth observation measurements, vehicle owner schedules, and emission-based route penalties to generate coordinated allocation decisions. Vehicle owners specify availability through a scheduling interface. The system optimizes vehicle utilization through a hierarchical optimization approach implementing mobility demand-side flexibility and electricity demand-side flexibility simultaneously. Multi-objective genetic algorithm optimization balances revenue generation, energy costs, emissions reduction, and battery health. The integrated approach maximizes value creation across both transportation and energy domains, reducing urban emissions while enhancing grid stability through coordinated management of distributed energy resources in autonomous electric vehicle fleets.

20 Claims, 26 Drawing Sheets

(51) Int. Cl.

| | |
|---|---|
| ***G05B 13/02*** | (2006.01) |
| ***G06Q 10/0631*** | (2023.01) |
| ***G06Q 20/38*** | (2012.01) |
| ***H02J 3/32*** | (2026.01) |

(52) U.S. Cl.

CPC ........ *G06Q 10/06314* (2013.01); *H02J 3/322* (2020.01); *G06Q 20/389* (2013.01)

(56) References Cited

U.S. PATENT DOCUMENTS

| | | | | |
|---|---|---|---|---|
| 11,429,910 | B1 * | 8/2022 | Lidbetter ............. | G01C 21/343 |
| 11,820,236 | B2 | 11/2023 | Park | |
| 12,321,872 | B1 * | 6/2025 | Richey ................. | G06Q 10/047 |
| 2020/0404051 | A1 | 12/2020 | Guniguntala et al. | |
| 2021/0027391 | A1 * | 1/2021 | Levin .................. | G06Q 30/018 |
| 2021/0312375 | A1 | 10/2021 | Khasis | |
| 2023/0303091 | A1 * | 9/2023 | You ........................ | B60L 53/65 |
| 2024/0343149 | A1 * | 10/2024 | Galbraith ............... | G06Q 50/06 |

FOREIGN PATENT DOCUMENTS

| | | | | |
|---|---|---|---|---|
| DE | 102023118874 A1 | 1/2024 | | |
| WO | WO-2020128111 A1 * | 6/2020 | ............. | G07C 5/008 |
| WO | WO-2023148620 A1 * | 8/2023 | ............. | G06Q 50/40 |

OTHER PUBLICATIONS

Monyei, Chukwuka G. & Viriri, Serestina, "An Improved Comfort Biased Smart Home Load Manager for Grid Connected Homes Under Direct Load Control", Singer Nature, 2018, pp. 526-536, LNAI 10870, Springer International Publishing AG.

Monyei, Chukwuka G. et al; "A Smart Grid Framework for Optimally Integrating Supply-Side, Demand-Side and Transmission Line Management Systems", MDPI, Energies, doi: 10.3390/en11051038, Apr. 24, 2018.

* cited by examiner

1200

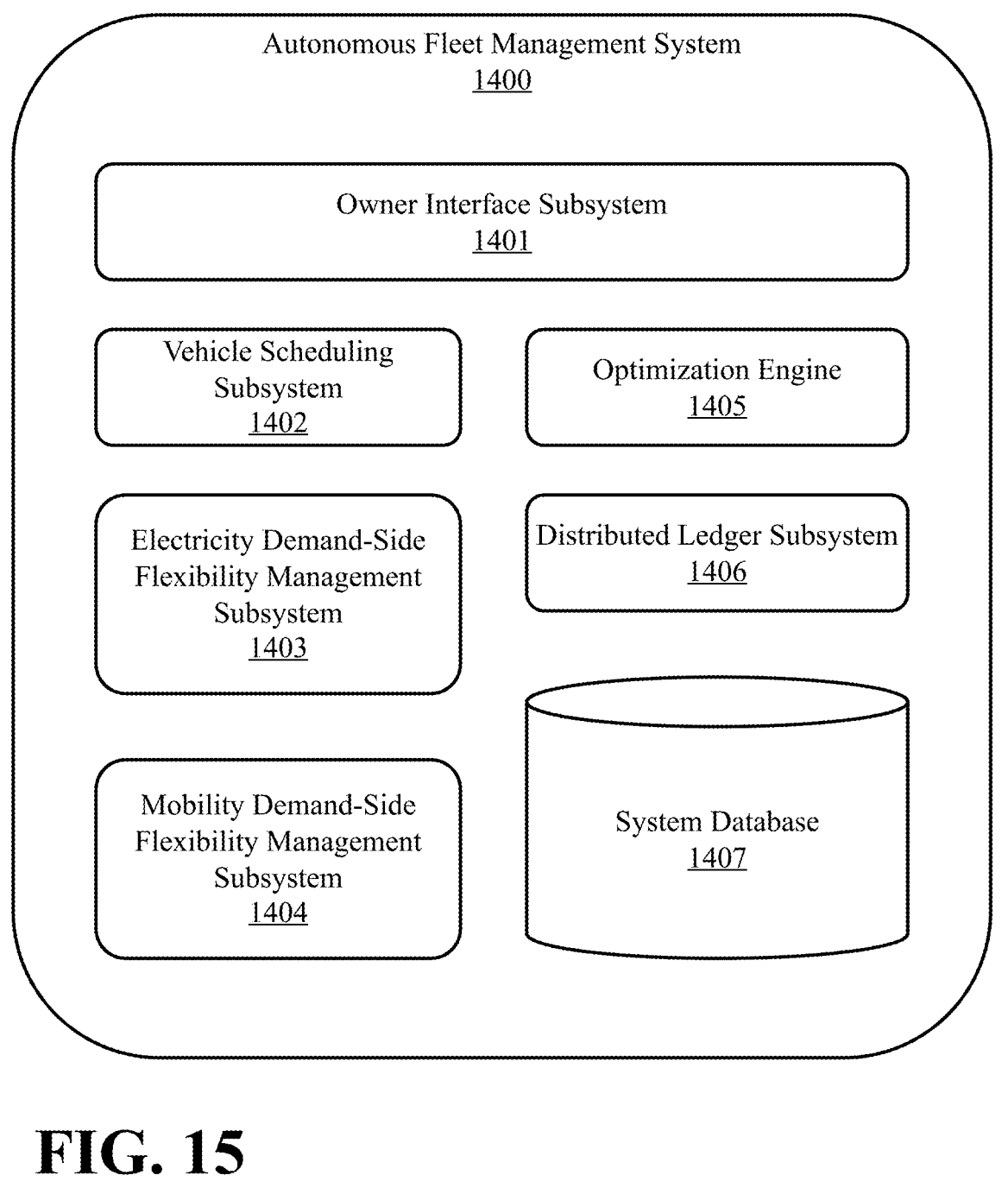

Autonomous Fleet Management System
1400

Owner Interface Subsystem
1401

Vehicle Scheduling Subsystem
1402

Optimization Engine
1405

Electricity Demand-Side Flexibility Management Subsystem
1403

Distributed Ledger Subsystem
1406

Mobility Demand-Side Flexibility Management Subsystem
1404

System Database
1407

FIG. 15

ARTIFICIAL INTELLIGENCE-BASED SYSTEM FOR INTEGRATED OPTIMIZATION OF AUTONOMOUS ELECTRIC VEHICLE FLEETS ACROSS TRANSPORTATION AND ELECTRICITY NETWORKS

CROSS-REFERENCE TO RELATED APPLICATIONS

Priority is claimed in the application data sheet to the following patents or patent applications, each of which is expressly incorporated herein by reference in its entirety:

Ser. No. 18/759,717

BACKGROUND OF THE INVENTION

Field of the Art

The present invention is in the field of urban mobility management, and more particularly to artificial intelligence-based dynamic pricing, mapping, emissions control, and scheduling of autonomous electric vehicles to optimize inner-city transportation networks while considering environmental impact and electricity grid flexibility.

Discussion of the State of the Art

Current navigation platforms optimize routes based on limited criteria like distance and time, neglecting environmental impacts and multi-objective preferences. They fail to incorporate real-time emissions data, dynamic road pricing based on pollution levels, or comprehensive vehicle emissions profiles, resulting in suboptimal routing from environmental and economic perspectives.

Most navigation systems lack advanced AI techniques like genetic algorithms for multi-objective optimization that could find more efficient, environmentally friendly routes by simultaneously considering various criteria and adapting to real-time conditions.

Additionally, with the increasing adoption of electric vehicles (EVs), especially autonomous or driverless EVs, there exists a significant untapped potential for integrating transportation systems with electricity grid management. Current transportation and energy systems operate largely in isolation, missing opportunities for synergistic optimization. The growing fleet of electric vehicles represents both a challenge for grid management due to charging demands and an opportunity for grid flexibility through vehicle-to-grid (V2G) capabilities.

Existing scheduling systems for vehicle fleets do not adequately address the dual role that electric vehicles can play in both transportation and electricity markets. Fleet management systems typically focus solely on optimizing routes and schedules for passenger or goods transportation, without considering how these vehicles could simultaneously provide services to the electricity grid when not in active transportation use.

Furthermore, current demand response and flexibility services in electricity markets are primarily designed for stationary assets like buildings, industrial loads, or fixed battery storage systems. These systems do not account for the unique characteristics of mobile battery storage provided by electric vehicles, such as their changing locations, variable availability, and diverse ownership structures.

The fragmented approach to managing mobility and electricity demand separately leads to missed opportunities for optimizing both systems simultaneously. There is no comprehensive framework that allows vehicle owners to participate in both transportation and electricity markets, maximizing the value of their assets while contributing to urban sustainability goals.

What is needed is an integrated AI-based system combining real-time emissions data, dynamic pricing, vehicle-specific information, and multi-objective optimization for sustainable inner-city mobility. This system should comprise scheduling capabilities for autonomous electric vehicles to participate in both mobility and electricity demand-side flexibility services, creating value for owners while reducing emissions and supporting grid stability.

SUMMARY OF THE INVENTION

Accordingly, the inventor has conceived and reduced to practice, a system and methods for integrated optimization of autonomous electric vehicle fleets across transportation and electricity networks which employs artificial intelligence to dynamically allocate autonomous electric vehicles between mobility services and electricity grid services based on real-time conditions. The platform acquires data including energy mix forecasts, earth observation measurements, vehicle owner schedules, and emission-based route penalties to generate coordinated allocation decisions. Vehicle owners specify availability through a scheduling interface. The system optimizes vehicle utilization through a hierarchical optimization approach implementing mobility demand-side flexibility and electricity demand-side flexibility simultaneously. Multi-objective genetic algorithm optimization balances revenue generation, energy costs, emissions reduction, and battery health. The integrated approach maximizes value creation across both transportation and energy domains, reducing urban emissions while enhancing grid stability through coordinated management of distributed energy resources in autonomous electric vehicle fleets.

According to a preferred embodiment, a system for integrated management of electric vehicles is disclosed, comprising: a computing device comprising at least a memory and a processor; a plurality of programming instructions stored in the memory and operable on the processor, wherein the plurality of programming instructions, when operating on the processor, cause the computing device to: acquire data related to transportation networks and electricity networks; receive scheduling information for a plurality of electric vehicles, wherein the scheduling information designates time periods according to different availability categories; allocate the plurality of electric vehicles between transportation services and electricity grid services based on the scheduling information and the acquired data; implement an optimization process to determine vehicle allocations that balance multiple objectives; for certain time periods, provide alternative transportation options while allocating associated vehicles to other services; present allocation decisions to users; and manage financial transactions associated with the vehicle services.

According to another preferred embodiment, a method for integrated management of electric vehicles is disclosed, comprising the steps of: acquiring data related to transportation networks and electricity networks; receiving scheduling information for a plurality of electric vehicles, wherein the scheduling information designates time periods according to different availability categories; allocating the plurality of electric vehicles between transportation services and electricity grid services based on the scheduling information and the acquired data; implementing an optimization process to determine vehicle allocations that balance multiple objectives; for certain time periods, providing alternative transportation options while allocating associated vehicles to other services; presenting allocation decisions to users; and managing financial transactions associated with the vehicle services.

According to a further aspect, the method includes scheduling information that designates time periods as one of: needed for personal use with no alternative, available for system allocation, or needed for personal use with an acceptable alternative. According to a further aspect, the method includes data related to transportation networks and electricity networks that comprises at least one of: energy mix temporal forecasts, earth observation data, emission-based route penalties, electricity pricing data, grid demand signals, or traffic patterns. According to a further aspect, the method includes an optimization process that comprises a hierarchical optimization approach operating across multiple time horizons including long-term planning, day-ahead scheduling, and real-time dispatch layers. According to a further aspect, the method includes multiple objectives that include at least two of: revenue generation, energy cost minimization, emissions reduction, renewable energy utilization, battery health preservation, and service reliability. According to a further aspect, the method includes implementing the optimization process that includes applying a genetic algorithm to balance the multiple objectives while satisfying vehicle-specific constraints and system-level constraints. According to a further aspect, the method includes managing financial transactions that includes recording service verification, compensation calculation, and transaction execution using a distributed ledger system. According to a further aspect, the method includes generating dynamic pricing for transportation network segments based on real-time emissions data obtained from satellite measurements and ground-based sensors. According to a further aspect, the method includes calculating net emissions impact by aggregating emissions reductions from both transportation services and electricity grid services provided by the electric vehicles. According to a further aspect, the method includes predicting future conditions in both transportation and electricity domains using machine learning models trained on historical data and continuously updated with real-time operational data.

BRIEF DESCRIPTION OF THE DRAWING FIGURES

FIG. 15 is a block diagram illustrating the detailed architecture of the autonomous fleet management system, according to an embodiment.

DETAILED DESCRIPTION OF THE INVENTION

Figure 1:
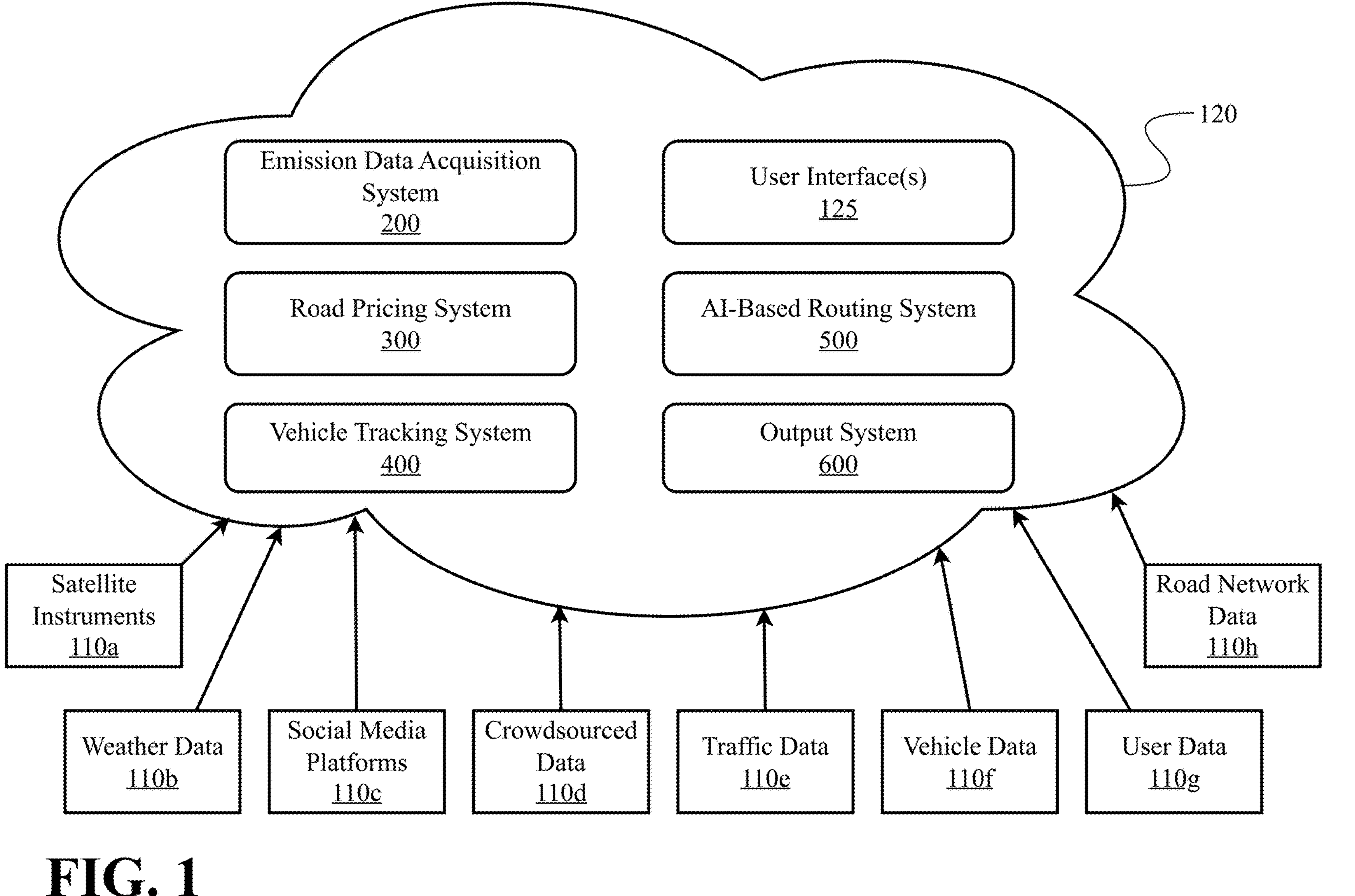
FIG. 1 is a block diagram illustrating an exemplary system architecture for an artificial intelligence-based pricing, mapping, and emissions control platform, according to an embodiment.

The inventor has conceived, and reduced to practice, A system and methods for integrated optimization of autonomous electric vehicle fleets across transportation and electricity networks which employs artificial intelligence to dynamically allocate autonomous electric vehicles between mobility services and electricity grid services based on real-time conditions. The platform acquires data including energy mix forecasts, earth observation measurements, vehicle owner schedules, and emission-based route penalties to generate coordinated allocation decisions. Vehicle owners specify availability through a scheduling interface. The system optimizes vehicle utilization through a hierarchical optimization approach implementing mobility demand-side flexibility and electricity demand-side flexibility simultaneously. Multi-objective genetic algorithm optimization balances revenue generation, energy costs, emissions reduction, and battery health. The integrated approach maximizes value creation across both transportation and energy domains, reducing urban emissions while enhancing grid stability through coordinated management of distributed energy resources in autonomous electric vehicle fleets.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Conceptual Architecture

Figure 14:
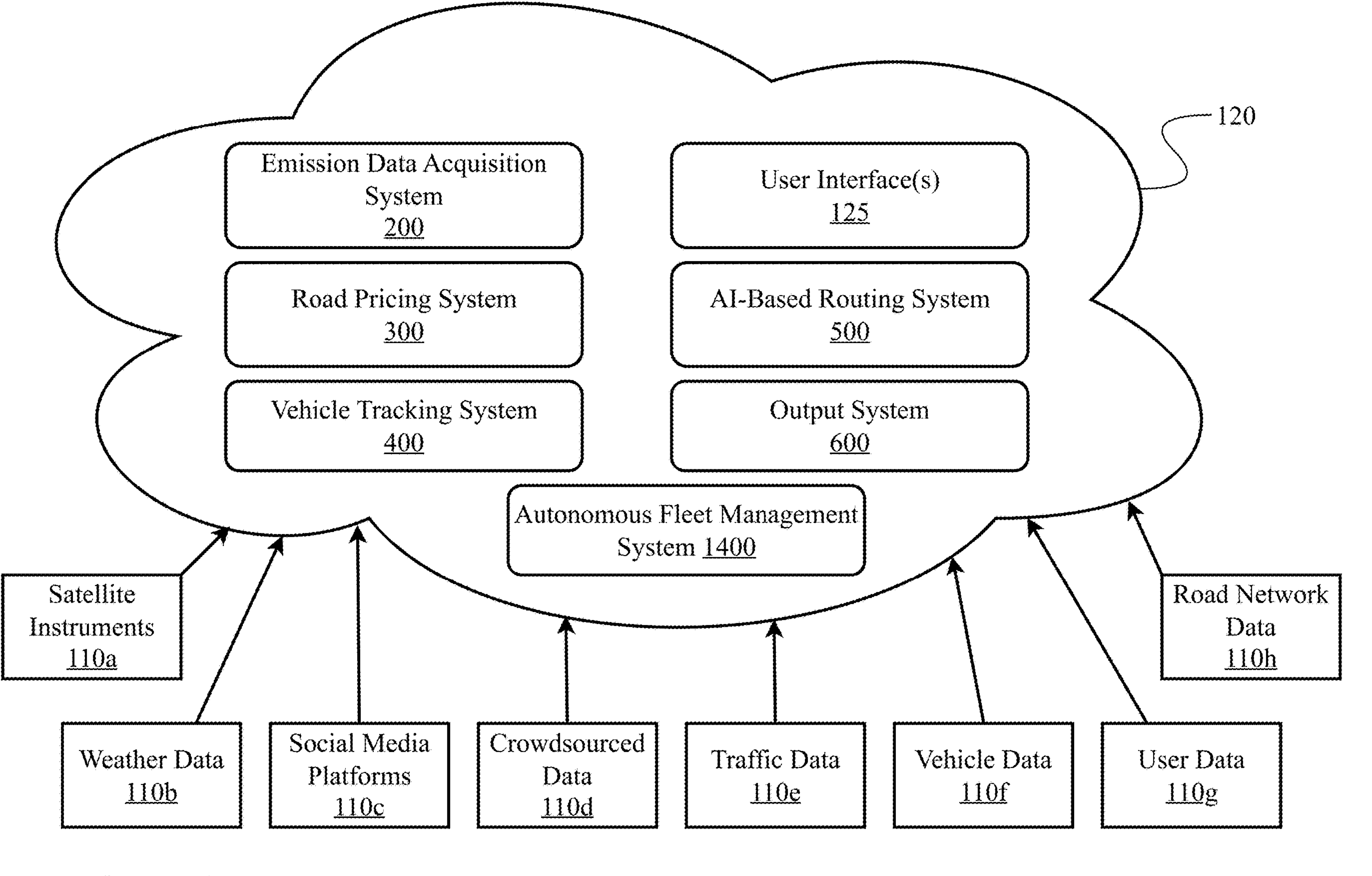
FIG. 14 is a block diagram illustrating an exemplary system architecture for an artificial intelligence-based pricing, mapping, emissions control, and autonomous fleet management platform, according to an embodiment.

FIG. 14 is a block diagram illustrating an exemplary system architecture for an artificial intelligence-based pricing, mapping, emissions control, and autonomous fleet management platform 120, according to an embodiment. According to the embodiment, platform 120 is configured as a cloud-based computing platform comprising various system or sub-system components configured to provide functionality directed to the execution of generating pricing and emissions context aware vehicle routing and autonomous electric vehicle scheduling using artificial intelligence and machine learning techniques. Exemplary platform systems can include a user interface 125, a data processing subsystem 200, a machine learning and artificial intelligence (ML/AI) subsystem 300, an emission data acquisition system 200, a road pricing system 300, a vehicle tracking system 400, an AI-based routing system 500, an output system 600, and an autonomous fleet management system 1400.

Autonomous fleet management system 1400 represents an extension to the platform's capabilities, enabling the coordinated management of driverless electric vehicles for dual purposes: transportation services (mobility demand-side flexibility or m-DSF) and electricity grid services (electricity demand-side flexibility or e-DSF). This system integrates seamlessly with the previously described components of platform 120 while adding new capabilities for vehicle scheduling, owner interface management, and participation in both transportation and electricity markets.

The autonomous fleet management system 1400 leverages the environmental awareness and routing capabilities of the original platform while adding sophisticated scheduling capabilities that optimize the allocation of autonomous electric vehicles across different service types over time. It considers owner preferences, vehicle capabilities, transportation demands, electricity market conditions, and environmental impacts to create comprehensive schedules that maximize value for all stakeholders.

The system connects with emissions data acquisition system 200 to incorporate air quality considerations into vehicle deployment decisions, prioritizing electric vehicles in areas with high pollution levels. It interfaces with road pricing system 300 to incorporate dynamic road pricing into scheduling decisions, optimizing routes and timing to minimize costs. The vehicle tracking system 400 provides essential real-time location and status information for the autonomous vehicle fleet, enabling accurate scheduling and dispatch.

The AI-based routing system 500 works in concert with the autonomous fleet management system 1400 to determine optimal routes for vehicles based on both transportation requirements and grid connection opportunities. Furthermore, output system 600 is extended to provide visualization and interaction capabilities for fleet managers, vehicle owners, and system operators.

In some embodiments, autonomous fleet management system 1400 may be implemented as a standalone software application or as a services/microservices architecture which can be deployed (via platform 120) to perform specific tasks or functionalities. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker or containerd and orchestrated using container orchestration platforms like Kubernetes.

The autonomous fleet management system 1400 enables a new paradigm of urban mobility and energy management, where autonomous electric vehicles serve as flexible assets that can dynamically shift between transportation services and grid services based on real-time conditions and optimization objectives. This creates new value streams for vehicle owners, improves transportation efficiency, reduces emissions from both transportation and electricity sectors, and enhances grid stability through distributed energy resources.

FIG. 15 is a block diagram illustrating the detailed architecture of the autonomous fleet management system 1400, according to an embodiment. The system comprises an owner interface subsystem 1401, a vehicle scheduling subsystem 1402, an electricity demand-side flexibility (e-DSF) management subsystem 1403, a mobility demand-side flexibility (m-DSF) management subsystem 1404, an optimization engine 1405, a distributed ledger subsystem 1406, and a system database 1407.

According to the aspect, the owner interface subsystem 1401 provides vehicle owners with capabilities to register their autonomous electric vehicles, specify availability schedules, set preferences for vehicle participation in various services, and view analytical reports on vehicle performance and financial returns. The interface may be implemented as a web portal, mobile application, or other user-facing interface that allows for secure authentication and real-time interaction with the platform.

The owner interface enables vehicle owners to create detailed scheduling parameters for their vehicles, indicating time windows when the vehicle must be available for personal use, when it can be deployed for mobility services (m-DSF), and when it could be connected to the electricity grid for charging or discharging operations (e-DSF). Owners can specify constraints such as minimum battery levels to be maintained, geographic boundaries for vehicle operation, and prioritization metrics for different types of services.

The interface may also provide dashboard visualization of key performance indicators (KPIs) such as (but not limited to) revenue generated from grid services, transportation services, energy costs saved through optimized charging, carbon emissions avoided, and financial settlements. These visualizations help owners understand the value proposition of participating in the dual-flexibility system and make informed decisions about how to configure their vehicle's participation parameters.

According to the aspect, vehicle scheduling subsystem 1402 manages the temporal allocation of autonomous electric vehicles based on (but not limited to) owner preferences, system needs, and optimization objectives. It maintains a real-time inventory of all registered vehicles, their current status (e.g., location, battery level, operational status, occupancy, etc.), and their forward-looking availability based on owner-specified constraints.

The scheduling subsystem may further comprise a reservation system that allows both advance booking and real-time dispatch of vehicles for mobility services. It can be configured to manage the temporal horizon of vehicle commitments, ensuring that vehicles are appropriately positioned and charged for their anticipated tasks. The subsystem can handle exceptions such as cancellations, delays, or vehicle malfunctions, automatically rerouting or reassigning vehicles as needed to maintain service levels.

For vehicles designated as available for grid services, the scheduling subsystem coordinates with charging infrastructure to ensure vehicles are properly connected and available during optimal periods for grid support. It manages the complex interdependencies between mobility needs and electricity grid opportunities, continuously updating vehicle schedules as conditions change in either domain.

According to an embodiment, the scheduling logic implements one or more constraint satisfaction algorithms that respect hard constraints (such as owner-mandated availability periods or minimum battery levels) while optimizing for soft constraints (such as maximizing revenue or minimizing emissions). The system learns from historical patterns to improve its predictive capabilities regarding traffic conditions, energy prices, and service demand.

In certain embodiments, autonomous fleet management system 1400 implements sophisticated scheduling logic within its vehicle scheduling subsystem 1402 to optimize the temporal allocation of vehicles across both mobility and electricity services. This scheduling logic represents a critical component that transforms owner availability preferences, service opportunities, and environmental data into actionable deployment plans that maximize value while respecting constraints.

The scheduling logic may employ a hierarchical temporal framework that operates across multiple time horizons simultaneously, enabling both long-term strategic planning and real-time tactical adjustments. In some implementations at the longest time horizon, typically spanning weeks to months, the system may implement a stochastic scenario-based planning approach that establishes broad resource allocation patterns based on historical data, seasonal trends, and anticipated special events. This long-range scheduling creates a foundational framework for more detailed scheduling decisions and identifies periods where fleet capacity constraints may require proactive recruitment of additional vehicles.

For the medium-term horizon, typically spanning days to a week, the scheduling logic may utilize a rolling horizon optimization approach that continuously updates schedules as new information becomes available. This approach balances the need for commitment stability with adaptability to changing conditions. The medium-term scheduler may divide the horizon into time blocks of varying granularity, with finer resolution for imminent periods and coarser resolution for more distant periods. This temporal decomposition supports computational efficiency while maintaining decision quality across the scheduling horizon.

At the shortest time horizon, typically spanning minutes to hours, the scheduling logic may implement a real-time adaptive dispatch system that makes immediate allocation decisions based on current conditions while maintaining consistency with the broader scheduling framework. This component handles immediate service requests, responds to unexpected events such as vehicle unavailability or service cancellations, and capitalizes on emerging high-value opportunities that could not be anticipated in advance.

The scheduling logic may incorporate one or more constraint handling mechanisms to manage the complex interrelationships between various system requirements. Hard constraints, such as vehicle battery capacity limits, owner-specified "No Alternative" periods, and regulatory requirements, are enforced strictly through feasibility filtering that eliminates any potential schedules violating these constraints. Soft constraints, such as preferred charging patterns, geographical service coverage targets, and optimal battery management practices, are incorporated through penalty functions that guide the optimization toward solutions that satisfy these preferences without strictly enforcing them.

In some embodiments, the scheduling logic may implement a two-stage stochastic programming approach to handle uncertainty in various parameters such as mobility demand, electricity prices, renewable energy availability, and traffic conditions. The first stage makes here-and-now decisions that must be committed before uncertainty is resolved, while the second stage determines recourse actions that can adapt to the realized scenarios. This approach enables robust scheduling that maintains good performance across a wide range of possible future conditions, rather than optimizing for a single deterministic forecast that may prove inaccurate.

The scheduling logic may also incorporate reinforcement learning techniques to improve decision quality over time through experience. By tracking the outcomes of past scheduling decisions under various conditions, the system can develop sophisticated state-action value mappings that inform future scheduling choices. This learning-based approach is particularly valuable for handling complex, non-linear relationships between scheduling decisions and performance outcomes that may be difficult to model explicitly.

A further aspect of the scheduling logic involves the intelligent integration of owner-provided availability schedules into the overall optimization framework. For periods designated as "Available" in the owner schedule, the vehicle is included in the full resource pool considered for both mobility and electricity services. The scheduling logic evaluates the potential value creation across both domains and allocates the vehicle to the highest-value opportunity, considering factors such as location, battery state, expected compensation, environmental impact, and alignment with system-level objectives.

For periods designated as "Needed for Personal Use with No Alternative," the scheduling logic implements strict exclusion logic that removes these time blocks from consideration for any platform services. These periods create boundary conditions for adjacent scheduling decisions, potentially influencing charging patterns and positioning strategies immediately before and after these reserved periods to ensure the vehicle is properly charged and located for the owner's personal use.

For the more complex "Needed for Personal Use with Alternative" periods, the scheduling logic implements a sophisticated substitution evaluation process. This process first determines whether providing an alternative transportation option would unlock sufficient value to justify the substitution. If justified, the system identifies appropriate alternative transportation options from within the fleet or through external partners (public transit, ride-sharing services, etc.) that meet the owner's specified requirements. The scheduling then creates linked assignments that ensure the owner's transportation needs are met while freeing their vehicle for higher-value utilization.

According to an embodiment, the computational implementation of this scheduling logic may vary across embodiments, reflecting different trade-offs between optimality, computational efficiency, and system flexibility. In some embodiments, the system may employ mathematical programming techniques such as mixed-integer linear programming (MILP) or mixed-integer nonlinear programming (MINLP) formulations solved using commercial or open-source optimization solvers. These approaches can guarantee optimality under certain conditions but may face scalability challenges with very large fleet sizes.

Alternative implementations may utilize meta-heuristic optimization methods such as genetic algorithms, particle swarm optimization, or simulated annealing. These approaches typically provide high-quality solutions without guaranteeing global optimality but offer better scalability with increasing problem size. The genetic algorithm approach, in particular, aligns well with the scheduling problem structure, representing schedules as chromosomes with operations like crossover and mutation naturally mapping to schedule modifications.

In highly distributed implementations, the scheduling logic may employ market-based mechanisms where vehicles (or their owners) act as autonomous agents that bid for service opportunities based on their capabilities, preferences, and expected value. This approach distributes computational load and creates a naturally scalable system.

Some embodiments may implement a hybrid approach that combines elements of these different methodologies, such as using mathematical programming for longer-term planning and heuristic methods for real-time dispatching, or employing hierarchical decomposition that solves different aspects of the scheduling problem with the most appropriate technique for each component.

A further capability of advanced scheduling logic implementations is adaptive rescheduling in response to disruptions, new information, or changing conditions. This capability enables the system to maintain near-optimal performance despite the inherent uncertainties in both transportation and electricity domains.

The adaptive rescheduling process may employ disruption minimization techniques that seek to accommodate necessary changes while preserving as much of the existing schedule as possible. This stability is particularly important for maintaining owner confidence in the system and ensuring predictable service delivery. Techniques such as minimum perturbation rescheduling and incremental schedule repair help balance the competing objectives of adaptation and stability.

To support efficient rescheduling, the system may maintain schedule flexibility metrics that quantify the adaptability of different schedule components. These metrics help identify which assignments can be adjusted with minimal impact on overall system performance, guiding the rescheduling process toward changes that provide maximum benefit with minimum disruption.

In some embodiments, the scheduling logic may proactively create contingency plans for high-impact uncertainty factors, enabling rapid implementation of pre-computed alternatives when specific trigger conditions occur. This approach reduces response time in critical situations and ensures well-considered decisions even under time pressure.

Through these various scheduling logic implementations, autonomous fleet management system 1400 transforms the complex multi-objective optimization problem of allocating vehicles across mobility and electricity services into actionable, value-maximizing deployment schedules that respect owner preferences while creating benefits for all stakeholders in the transportation and energy ecosystems.

According to the aspect, electricity demand-side flexibility management subsystem 1403 enables autonomous electric vehicles to participate in electricity markets and grid services when not required for transportation purposes. This subsystem interfaces with grid operators, electricity markets, and energy management systems to identify opportunities for vehicles to provide valuable grid services.

The e-DSF subsystem can be configured to monitor electricity market conditions, including, but not limited to, real-time and day-ahead prices, frequency regulation signals, reserve requirements, and renewable energy forecasts. It identifies periods of grid stress or opportunity, such as peak demand periods, renewable energy curtailment events, or frequency deviations, where vehicle batteries could provide valuable flexibility services.

For vehicles registered as available for grid services, the subsystem manages charging and discharging schedules to optimize value for both vehicle owners and the electricity system. This may include, but is not limited to, implementing smart charging strategies that shift charging to periods of low electricity prices or high renewable energy availability, as well as vehicle-to-grid operations where vehicles discharge stored energy back to the grid during peak demand or high-price periods.

In some embodiments, the e-DSF subsystem incorporates battery degradation models to ensure that grid participation does not excessively impact battery lifespan. It calculates the wear and tear costs associated with different types of grid services and incorporates these costs into decision-making algorithms to ensure vehicle owners are appropriately compensated for any impact on their assets.

The subsystem may be further configured to manage aggregation of multiple vehicles to create virtual power plants (VPPs) of sufficient scale to participate in wholesale electricity markets or utility programs. By pooling the capacity and flexibility of many distributed vehicles, the system can offer more reliable and substantial grid services than would be possible with individual vehicles acting alone.

According to the aspect, mobility demand-side flexibility (m-DSF) management subsystem 1404 optimizes the deployment of autonomous electric vehicles for transportation services. This subsystem may interface with the AI-based routing system 500 to ensure environmentally and economically optimal routing of vehicles while satisfying transportation demands.

The m-DSF subsystem processes transportation service requests, which may come from (but is not limited to) individual users, logistics providers, or public transit operators. It matches these requests with available vehicles based on various factors such as proximity, vehicle specifications, battery status, and owner preferences. According to an aspect of an embodiment, the subsystem implements dynamic pricing for transportation services based on factors such as current demand, vehicle availability, congestion levels, and emissions considerations.

For ride-sharing or multi-passenger services, the subsystem may implement advanced pooling algorithms that efficiently combine multiple trips to maximize vehicle utilization while minimizing detours and passenger inconvenience. This increases the overall efficiency of the transportation system and reduces the number of vehicles required to serve a given transportation demand.

The m-DSF subsystem coordinates with the vehicle tracking system 400 to monitor the real-time position and status of all autonomous vehicles in the fleet. It can implement predictive positioning strategies that proactively place vehicles in areas of anticipated high demand, reducing response times and increasing service availability.

According to a further aspect, the subsystem facilitates emissions-aware dispatching, prioritizing the use of electric vehicles in areas with high pollution levels, sensitive populations, or environmental restrictions. By integrating with the emissions data acquisition system 200, the m-DSF subsystem ensures that transportation services contribute to overall air quality goals while meeting mobility needs.

According to the aspect, optimization engine 1405 serves as a computational core of the autonomous fleet management system, implementing advanced artificial intelligence and optimization algorithms to solve the complex, multi-objective scheduling problem of deploying vehicles for both transportation and electricity grid services.

The optimization engine extends the genetic algorithm economic and environmental dispatch (GA-EED) tool described in the original application to incorporate the dual flexibility domains of mobility and electricity. The system formulates the comprehensive scheduling problem as a mixed-integer non-linear programming (MINLP) problem. This formulation includes decision variables representing vehicle states (e.g., mobility service, grid service, or idle), charging power levels, and route assignments across multiple time periods. For a fleet of N autonomous electric vehicles over a planning horizon divided into T time slots, the engine optimizes the allocation of each vehicle to one of three possible states at each time slot.

The decision variables in one embodiment may include binary variables indicating vehicle service state (mobility, grid, or idle), charging power at each time interval, and assigned routes for mobility service. The objective function typically combines multiple weighted objectives including revenue from services, energy costs, emissions impact, renewable energy utilization, and battery degradation costs. These are subject to constraints including battery state of charge limits, energy balance equations, vehicle state exclusivity, owner availability constraints, geographical feasibility, and charging infrastructure availability.

To address the computational complexity, the optimization engine implements a hierarchical decomposition approach breaking the problem into multiple layers with different temporal resolutions. This approach typically includes a long-term planning layer establishing allocation patterns days to weeks ahead, a day-ahead scheduling layer creating specific hourly schedules, and a real-time dispatch layer making final adjustments based on immediate conditions. Long-term layer performs high-level scheduling using aggregated models of vehicle availability and service requirements. It establishes broad patterns of vehicle allocation between mobility and electricity services based on forecasted demand, energy prices, and emissions profiles. Day-ahead layer refines the long-term plan into specific hourly schedules for the next day, allocating individual vehicles to specific service types for each hour based on confirmed reservations, updated forecasts, and day-ahead electricity market signals. Real-time layer makes final adjustments to vehicle assignments based on real-time conditions, handling immediate service requests, responding to grid signals, and managing exceptions or disruptions. Each layer can feed its results to the subsequent layer, with feedback mechanisms allowing for continuous refinement of plans as new information becomes available.

The GA-EED implementation for dual-flexibility optimization employs specialized chromosome encoding representing complete vehicle schedules. In one embodiment, each chromosome may be structured as a three-dimensional matrix where dimensions correspond to vehicles, time slots, and assignment types. The fitness function evaluates schedule quality based on weighted objectives, incorporating models for: service revenue estimation based on distance duration, time of day, and location; grid service value calculation based on energy market prices, service type (frequency regulation, reserves, energy arbitrage), and battery capacity; energy cost calculation using time-dependent electricity prices; emissions impact calculation using the emissions intensity of electricity and displaced conventional transportation; and battery degradation estimation (e.g., using cycling and calendar aging models).

Genetic operators implemented in various embodiments may include tournament selection with elitism, specialized crossover operators (time-slice, vehicle-group, and service-type), and multiple mutation types (random reassignment, time-shift, service-type flip, and constraint-aware perturbation). Constraint handling typically uses a penalty function approach combined with repair mechanisms, while genetic parameters may be dynamically adjusted based on population metrics.

The optimization engine incorporates several machine learning models that enhance its performance. Demand prediction models using deep neural networks, particularly LSTM and Transformer architectures, forecast spatiotemporal patterns of mobility demand. These models incorporate temporal factors, spatial characteristics, external conditions, and economic variables to predict demand patterns with confidence intervals.

Energy price and grid condition forecasting may leverage ensemble models combining gradient boosting machines and neural networks to predict electricity prices, grid congestion, and renewable energy availability. Battery degradation models, often implemented as physics-informed neural networks, estimate wear based on charging cycles, temperature conditions, and usage patterns, providing cost estimates for different utilization strategies and enabling appropriate compensation for vehicle owners.

Route energy consumption models predict energy requirements based on vehicle specifications, route characteristics, traffic conditions, and weather factors. Reinforcement learning approaches may optimize high-level allocation policies, learning from previous scheduling outcomes through algorithms such as Proximal Policy Optimization or Soft Actor-Critic.

The computational implementation typically leverages distributed computing architectures for scalability. This may comprise data parallelism for fitness evaluations, model parallelism for neural network components, hierarchical processing allocating resources to different optimization layers, GPU acceleration for computationally intensive tasks, approximate computing for time-sensitive decisions, and incremental planning techniques for efficient schedule updates.

The optimization engine implements continuous learning mechanisms allowing adaptation over time. These may comprise online learning updating models incrementally with new data, systematic comparison of alternative strategies, automated hyperparameter tuning using Bayesian optimization, transfer learning across contexts, and explainability tools providing insights into model decisions.

According to the aspect, distributed ledger subsystem 1406 provides secure, transparent, and immutable record-keeping for all transactions, services, and financial settlements within the autonomous fleet management system. This subsystem ensures trust among all participants in the ecosystem, including vehicle owners, service users, grid operators, and platform administrators.

The distributed ledger implements blockchain or similar distributed ledger technology to record key events and transactions, such as vehicle registrations, service delivery confirmations, grid service verifications, financial settlements, and energy transfers. Each transaction is cryptographically secured, timestamped, and linked to previous transactions, creating an auditable chain of events that cannot be altered retroactively.

Smart contracts embedded in the distributed ledger may be implemented to automate the execution of agreements between parties, such as compensation for transportation services, payments for grid services, penalties for non-performance, and incentives for desired behaviors. These contracts execute automatically when predefined conditions are met, reducing administrative overhead and ensuring timely settlements.

The subsystem can implement tokenization of mobility and energy services, allowing for efficient micro-transactions and innovative business models such as mobility-as-a-service subscriptions, peer-to-peer vehicle sharing, and community-based virtual power plants. These tokens can represent service credits, energy allocations, emissions allowances, or financial value.

Various privacy-preserving mechanisms within the distributed ledger ensure that sensitive information about vehicle owners, users, and operations is appropriately protected while still enabling necessary verification and auditing functions. This balances transparency needs with privacy rights and commercial confidentiality.

According to the aspect, system database 1407 stores comprehensive data related to vehicle assets, schedules, transactions, and performance metrics. This database serves as the central repository for all information needed to operate the autonomous fleet management system effectively.

The database may comprise detailed records of all registered autonomous electric vehicles, including, but not limited to, technical specifications (e.g., battery capacity, charging capabilities, range, etc.), ownership information, participation preferences, and historical performance data. It maintains up-to-date status information for each vehicle, including location, battery state of charge, operational status, and current assignment.

Historical data stored in the database includes complete trip records, charging sessions, grid service events, energy transfers, financial transactions, and system interactions. This historical data may be used for performance analysis, pattern recognition, forecasting, and continuous improvement of the system algorithms.

The database implements one or more access control mechanisms to ensure that sensitive information is only accessible to authorized users and subsystems. It supports real-time querying and analytics to enable responsive decision-making and reporting functions across the platform.

The autonomous fleet management system 1400 integrates with the various components of platform 120 to create a comprehensive solution for sustainable urban mobility and energy management. The system coordinates with emissions data acquisition system 200 to incorporate real-time air quality information into both e-DSF and m-DSF decision-making. It interfaces with road pricing system 300 to optimize vehicle routing and scheduling based on dynamic road pricing signals. Vehicle tracking system 400 provides essential real-time location and status information for all managed autonomous vehicles.

The AI-based routing system 500 works with the autonomous fleet management system to determine optimal routes for vehicles based on both transportation needs and grid connection opportunities. The output system 600 can be extended to provide specialized visualization and interaction capabilities for fleet managers, vehicle owners, and system operators.

This integrated platform enables comprehensive optimization across multiple domains, creating synergies between transportation efficiency, environmental performance, energy management, and economic value creation for all participants in the ecosystem.

Figure 16:
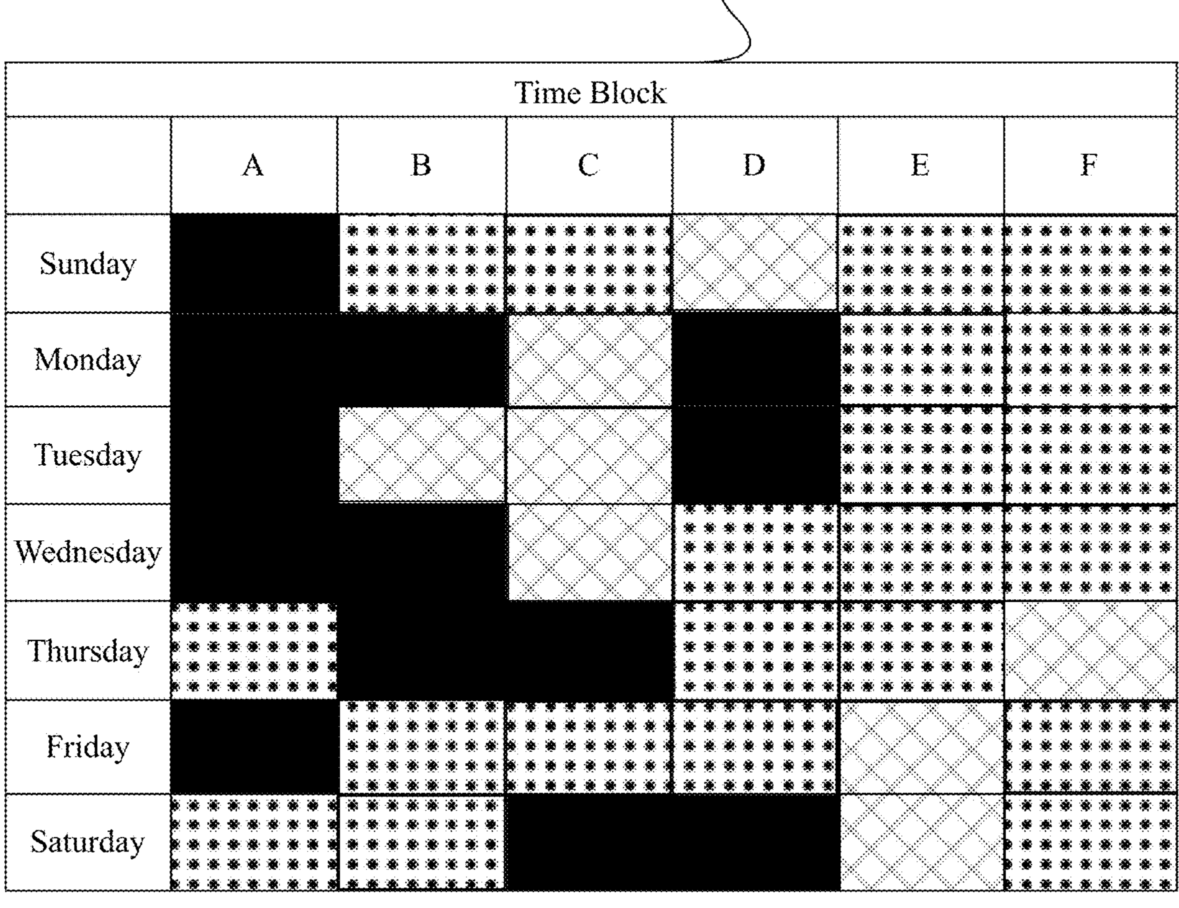
FIG. 16 is block diagram illustrating an exemplary asset schedule created by an autonomous vehicle owner or operator, according to an embodiment.
Figure 16:
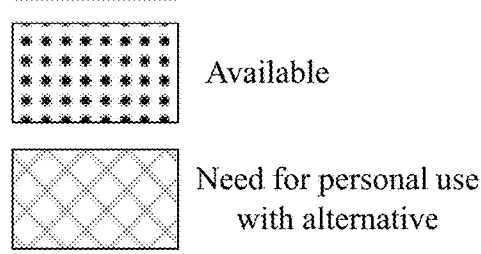

FIG. 16 is block diagram illustrating an exemplary asset schedule created by an autonomous vehicle owner or operator, according to an embodiment. Autonomous fleet management system 1400 provides a sophisticated yet intuitive scheduling interface through the owner interface subsystem 1401 that enables vehicle owners/operators to precisely specify the availability of their autonomous electric vehicles for platform utilization. This scheduling functionality serves as a critical input to the optimization engine 1405, ensuring that vehicle deployment respects owner preferences while maximizing value creation opportunities.

Vehicle owners can designate specific time blocks 1600 throughout the week using one or more distinct availability categories. The first category, "Needed for Personal Use with No Alternative," represents time periods during which the owner requires exclusive use of their vehicle and no substitute transportation option is acceptable. During these periods, the vehicle is completely unavailable for platform services and will not be considered in the optimization process for either mobility (m-DSF) or electricity (e-DSF) services. These periods are treated as hard constraints in the scheduling algorithm.

The next category, "Available," indicates time periods during which the owner makes their vehicle fully available to the platform for optimal allocation. During these periods, the optimization engine 1405 has complete flexibility to assign the vehicle to either mobility services, electricity grid services, or keep it idle based on the highest-value opportunity, subject only to technical constraints and battery management requirements.

A third category, "Needed for Personal Use with Alternative," represents time periods during which the owner has transportation needs but is willing to accept an alternative means of transportation if the platform determines that their vehicle can create more value through other services. During these periods, the platform may allocate the owner's vehicle to grid services or higher-value mobility services while ensuring the owner's mobility needs are met through another vehicle in the fleet or alternative transportation options.

The schedule creation process is designed to be flexible and user-friendly while capturing detailed availability information. The owner can access the scheduling interface through owner interface subsystem 1401, which may be implemented as a web portal, mobile application, or other user-facing interface. In some aspects, the interface presents a calendar view that can display availability patterns at various time resolutions. For each day of the week, the owner can create customized time blocks (e.g., 10 am to 12 pm, 1:30 pm to 2:15 pm, etc.) by selecting start and end times and assigning one of the availability categories. The interface allows for different patterns to be set for different days of the week and supports recurring schedules to minimize repetitive input.

Owners can create exception periods for special circumstances, such as vacations, business trips, or other events that temporarily alter their regular availability pattern. These exceptions override the recurring schedule for their specified duration. For time blocks designated as "Needed for Personal Use with Alternative," the owner can specify additional parameters such as required departure and arrival times, origin and destination locations, passenger capacity requirements, special vehicle feature requirements, maximum acceptable deviation from preferred times, and preferred alternative transportation modes.

The system enables owners to save multiple schedule templates for different recurring patterns and activate them as needed with minimal effort. It also provides visualization tools that help owners understand the potential value creation opportunities associated with different scheduling patterns, encouraging availability during high-value periods for both mobility and grid services.

Once created, the schedule may be securely stored in the system database 1407 and becomes a key input to the optimization process. The vehicle scheduling subsystem 1402 incorporates the owner-specified availability constraints into its temporal allocation model, ensuring that vehicles are never allocated to platform services during "No Alternative" periods and that appropriate alternatives are arranged during "With Alternative" periods. The optimization engine 1405 uses the availability schedule as a fundamental constraint in its multi-objective optimization process, maximizing value creation within the boundaries set by owner preferences.

For predictive purposes, the system may analyze patterns across multiple owner schedules to forecast fleet capacity at different times and locations. This aggregated availability information informs strategic planning, marketing efforts for service offerings, and infrastructure investment decisions. The system may implement incentive mechanisms that encourage owners to expand availability during high-demand periods, such as dynamic compensation rates, guaranteed minimum earnings for specific time slots, or special bonuses for consistent availability patterns.

Schedule adherence is monitored in real-time, with mechanisms to handle unexpected changes or emergencies. Owners can make urgent adjustments to their availability (subject to existing commitments), and the system can dynamically reoptimize to accommodate these changes while minimizing disruption to services. Through this comprehensive scheduling system, vehicle owners maintain precise control over their asset utilization while contributing to the efficient operation of the autonomous fleet management system. The structured availability data enables sophisticated optimization that respects owner constraints while maximizing value creation across both mobility and electricity services.

Figure 17:
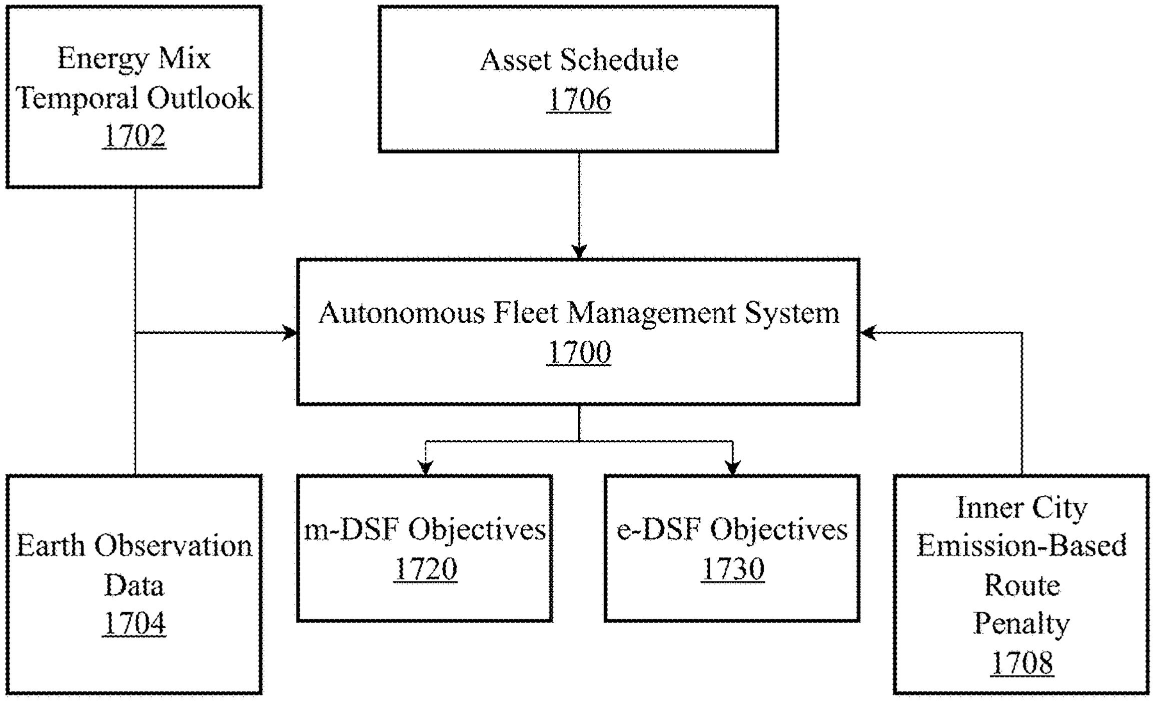
FIG. 17 is a block diagram illustrating an exemplary aspect of the autonomous fleet management system, according to an embodiment.

FIG. 17 is a block diagram illustrating an exemplary aspect of the autonomous fleet management system, according to an embodiment. As shown in the embodiment, an autonomous fleet management system 1700 integrates multiple critical data streams and produces optimized objectives for both mobility and electricity services. The system diagram illustrates how four exemplary input components, energy mix temporal outlook 1702, earth observation data 1704, asset schedules 1706, and inner-city emission-based route penalties 1708, flow into the autonomous fleet management system to generate mobility demand-side flexibility (m-DSF) objectives 1720 and electricity demand-side flexibility (e-DSF) objectives 1730.

According to an aspect, energy mix temporal outlook 1702 provides comprehensive forecasting of electricity generation composition across the scheduling horizon. This data stream may comprise predictions of renewable energy generation (solar, wind, hydro) percentages, fossil fuel generation levels, grid carbon intensity factors, and electricity price projections at various temporal resolutions (hourly, daily, weekly, etc.). The energy mix data can be sourced from grid operators, electricity market platforms, weather-based renewable forecasting services, and historical generation pattern analysis. This input may be used for identifying optimal periods for vehicle charging (e.g., during high renewable penetration) and grid service provision (e.g., during high fossil fuel generation or grid stress events).

Earth observation data 1704 delivers real-time and forecasted environmental conditions obtained primarily through satellite monitoring and ground-based sensor networks. This data stream may comprise atmospheric nitrogen dioxide ($NO_2$) concentrations, particulate matter levels, other air pollutant measurements, weather conditions affecting pollution dispersion, and urban heat island effects. The data can be processed by emissions data acquisition system 200 to create high-resolution spatial and temporal maps of air quality conditions across the operational area. This input enables environmentally responsive vehicle deployment that prioritizes electric mobility services in areas experiencing poor air quality.

Asset schedule(s) 1706 comprise the comprehensive availability and preference information provided by vehicle owners/operators through a scheduling interface. This data stream includes temporal availability patterns (categorized as "No Alternative," "Available," or "With Alternative"), specific transportation requirements during "With Alternative" periods, battery management preferences, geographic operating boundaries, special service participation preferences, and various other parameters depending upon the use case and specific embodiment. The schedules are stored and processed by vehicle scheduling subsystem 1402 to establish the fundamental constraints within which optimization must occur.

Inner-city emission-based route penalties 1708 provide dynamic, spatially explicit disincentives for vehicle routing through high-pollution areas. This data stream may comprise in part or in whole the outputs of road pricing system 300 and can further incorporate real-time $NO_2$ concentration data, traffic congestion levels, road-specific weight matrices from governmental authorities, and calculated penalty values for each road segment. These penalties create a dynamic pricing mechanism that discourages unnecessary traffic in environmentally sensitive areas while incentivizing routing that minimizes overall emissions impact.

Autonomous fleet management system 1700 serves as the central intelligence that processes these diverse inputs through several specialized subsystems. An e-DSF management subsystem 1403 can be configured to analyze the energy mix temporal outlook alongside asset schedules to identify grid service opportunities. An m-DSF management subsystem 1404 can be configured to process earth observation data and emission-based penalties in conjunction with asset schedules to optimize mobility service allocation. The optimization engine 1405 applies sophisticated multi-objective algorithms to balance competing objectives and constraints from all input streams.

In some implementations, the system applies temporal pattern recognition to identify recurring opportunities in both domains, spatial analytics to optimize vehicle positioning, and predictive modeling to anticipate service demand and environmental conditions. Machine learning components continuously improve the system's ability to extract actionable insights from the complex, multi-dimensional input data. A distributed ledger subsystem 1406 ensures secure and transparent record-keeping of all decisions and outcomes.

The system generates m-DSF objectives 1720 that guide the deployment of vehicles for mobility services in an environmentally and economically optimized manner. These objectives may include, but are not limited to, spatial and temporal prioritization of mobility services (targeting high-demand, high-pollution areas for electric vehicle deployment), emissions-minimizing route planning (incorporating emission-based penalties to avoid pollution hotspots), service type optimization (prioritizing high-occupancy or shared mobility for maximum displacement of conventional vehicles), and strategic vehicle positioning (pre-positioning vehicles in anticipated high-demand areas to minimize deadheading).

Simultaneously, the system produces e-DSF objectives 1730 that optimize the fleet's interaction with the electricity grid. These objectives can include, but are not limited to, temporally optimized charging schedules (prioritizing charging during high renewable generation periods), vehicle-to-grid service allocation (identifying opportunities for frequency regulation, peak shaving, or other ancillary services), geographic distribution of grid services (targeting constrained grid areas for distributed energy resource support), and aggregated capacity management (combining multiple vehicles into virtual power plants of sufficient scale for market participation).

The system continuously balances these dual sets of objectives, recognizing the inherent trade-offs and synergies between them. For example, vehicles providing mobility services in high-pollution areas may be prioritized for charging during renewable energy abundance periods, creating a virtuous cycle of environmental benefits across both transportation and energy sectors. The synchronized pursuit of these objectives enables the autonomous fleet management system to maximize environmental benefits, economic value, and service quality through the coordinated deployment of autonomous electric vehicles across both mobility and electricity domains.

This system diagram illustrates the integration capabilities of autonomous fleet management system 1700, showcasing its ability to synthesize diverse data streams into coherent, optimized service objectives that benefit vehicle owners, service users, electricity systems, and urban environments simultaneously.

Figure 18:
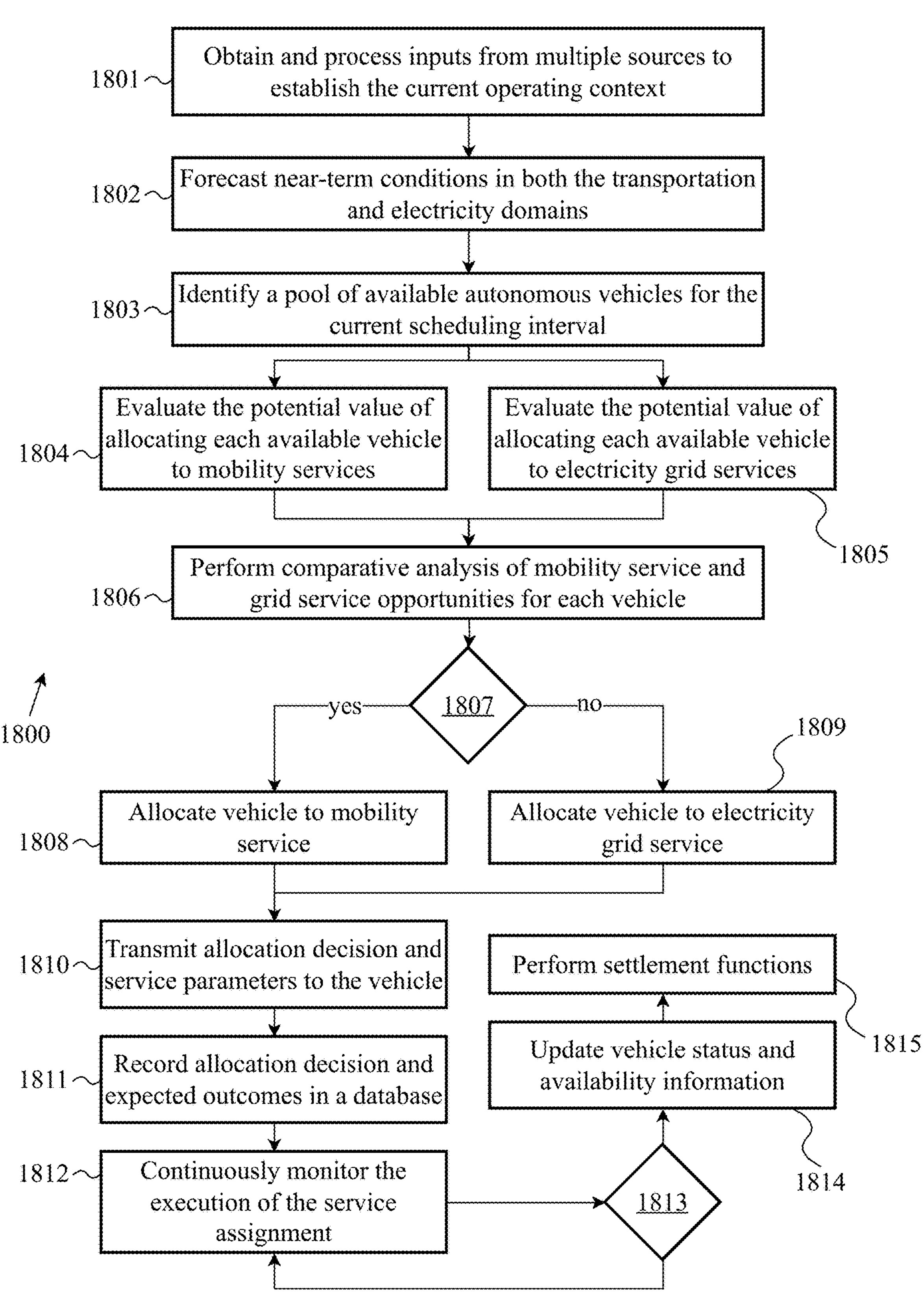
FIG. 18 is a flow diagram illustrating an exemplary method for dual flexibility resource allocation in the autonomous fleet management system, according to an embodiment.

FIG. 18 is a flow diagram illustrating an exemplary method 1800 for dual flexibility resource allocation in the autonomous fleet management system, according to an embodiment. According to the embodiment, the process begins at step 1801 when the autonomous fleet management system receives and processes inputs from a plurality of sources to establish the current operating context. These inputs may comprise multi-modal data. These inputs can include, but are not limited to, vehicle owner availability schedules and preferences, current vehicle status information (e.g., location, battery state of charge, operational condition, etc.), transportation service requests, electricity grid conditions and market signals, real-time emissions data, and dynamic road pricing information. The system aggregates and normalizes this diverse data to create a comprehensive representation of the current decision environment.

At step 1802, the system forecasts near-term conditions in both the transportation and electricity domains. This may comprise predicting mobility demand patterns across the service area, anticipated traffic conditions, expected electricity prices and grid needs, and projected emissions levels. These forecasts typically extend from minutes to hours ahead, depending on the specific scheduling horizon being addressed, and provide essential context for optimizing vehicle allocations.

At step 1803, the system identifies the pool of available autonomous electric vehicles for the current scheduling interval. This may comprise filtering the total fleet based on owner-specified availability, vehicle operational status, current location, and battery state of charge. Vehicles that are currently in use, undergoing maintenance, or explicitly marked as unavailable by their owners are excluded from consideration for new assignments.

At step 1804, the system evaluates the potential value of allocating each available vehicle to mobility services (m-DSF). This evaluation can consider factors such as proximity to transportation service requests, vehicle suitability for the requested service type, potential revenue from the transportation service, estimated emissions impact based on the proposed route and current air quality conditions, and alignment with owner preferences and constraints. The output may be represented as a quantified value metric for each potential mobility service assignment.

At step 1805, the system similarly evaluates the potential value of allocating each available vehicle to electricity grid services (e-DSF). This evaluation can consider factors such as the vehicle's battery capacity and state of charge, proximity to compatible charging infrastructure, current and projected electricity prices, grid service compensation rates, estimated battery degradation costs, and alignment with owner preferences and constraints. The output may be represented as a quantified value metric for each potential grid service assignment.

At step 1806, the optimization engine performs a comparative analysis of mobility service and grid service opportunities for each vehicle. This comparison weighs the quantified value metrics from steps 1804 and 1805 against each other, accounting for system-level objectives such as balancing service provision across both domains and meeting minimum service level commitments. The comparison may also consider synergistic opportunities, such as routing vehicles providing mobility services to end their trips at charging stations where they could subsequently provide grid services.

At decision point 1807, the system determines whether the value of mobility service (m-DSF) exceeds the value of grid service (e-DSF) for each vehicle. This comparison incorporates not only the direct economic value to the vehicle owner but also system-level considerations such as transportation service coverage, grid support requirements, and environmental impact.

If mobility service is determined to be more valuable, the process proceeds to step 1808, where the system allocates the vehicle to mobility service (m-DSF). This may comprise assigning the vehicle to a specific transportation request or positioning the vehicle in an area of anticipated high demand, among other actions. The system generates a detailed route plan, incorporating emissions-aware routing from AI-based routing system 500 and considering dynamic road pricing from road pricing system 300. The assignment can include, but is not limited to, specifications for pickup/drop-off locations, passenger or cargo details, service duration, and compensation terms.

Alternatively, if grid service is determined to be more valuable, the process proceeds to step 1809, where the system allocates the vehicle to electricity grid service (e-DSF). This may comprise directing the vehicle to an appropriate charging station or connection point and establishing parameters for the grid service, such as charging or discharging rates, duration, and response requirements. The assignment can include, but is not limited to, specifications for the type of grid service (e.g., frequency regulation, peak shaving, renewable integration), connection details, service duration, and compensation terms.

At step 1810, the system communicates the allocation decision and service parameters to the vehicle and relevant subsystems. For mobility service allocations, this may comprise transmitting route information to the vehicle's navigation system, service details to the user interface, and expected arrival times to service requesters. For grid service allocations, this may comprise communicating connection instructions to the vehicle, service parameters to the charging infrastructure, and commitment details to grid operators or market platforms.

At step 1811, the system records the allocation decision and expected outcomes in system database 1407 and distributed ledger subsystem 1406. This record may comprise all relevant details of the assignment, such as the vehicle identifier, service type, expected duration, estimated compensation, and projected impacts on battery state of charge, emissions, and system performance metrics. This information is used for settlement, analysis, and continuous improvement of the allocation algorithm.

At step 1812, the system continuously monitors the execution of the service assignment, comparing actual performance against expected parameters. For mobility services, this can include, but is not limited to, tracking the vehicle's adherence to the planned route, service completion time, energy consumption, and user feedback. For grid services, this can include, but is not limited to, monitoring energy flows, response to control signals, and grid condition impacts. Any significant deviations may trigger adaptive responses or replanning as necessary.

At decision point 1813, the system determines whether the current service assignment is complete or requires modification. If the service is ongoing and proceeding as expected, the monitoring continues at step 1812. If the service requires modification due to changing conditions or is nearing completion, the process proceeds to step 1814.

At step 1814, the system updates the vehicle's status and availability information in preparation for its next assignment. This may comprise recording the current battery state of charge, location, operational status, and timing for next availability. The updated information feeds back into the available vehicle pool for the next scheduling cycle, beginning again at step 1803.

At step 1815, the system performs settlement functions for the completed service, calculating actual compensation based on, for instance, measured service delivery, updating owner accounts, and finalizing the transaction record in the distributed ledger. This step may comprise calculating any adjustments based on the difference between expected and actual service performance, processing payments or credits, and updating historical performance metrics for the vehicle.

This exemplary process enables the autonomous fleet management system to dynamically allocate vehicles between mobility and electricity services based on real-time conditions, optimizing value creation across both domains while respecting owner preferences and system constraints.

Figure 19:
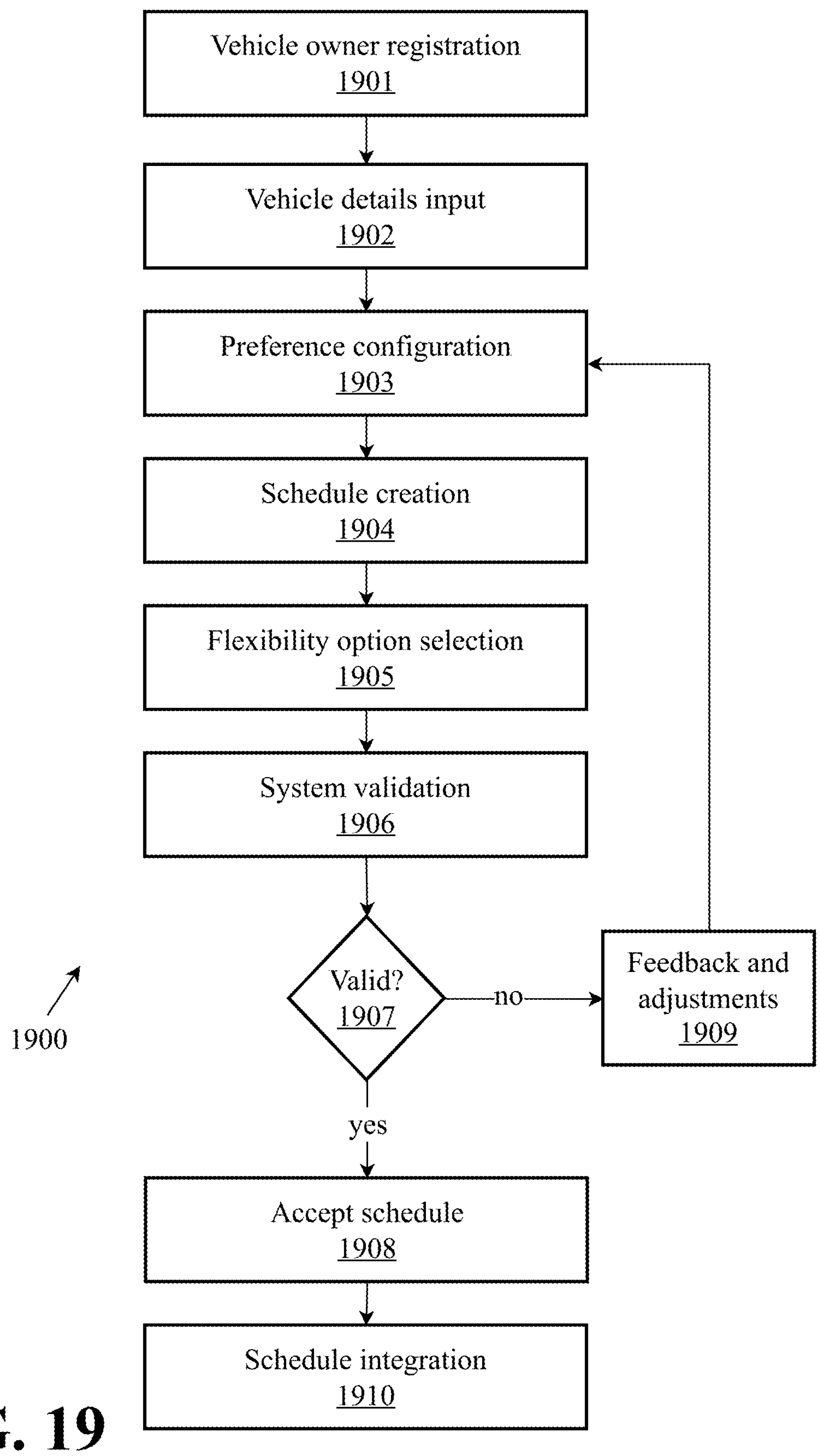
FIG. 19 is a flow diagram illustrating an exemplary method for vehicle owner scheduling and preference setting, according to an embodiment.

FIG. 19 is a flow diagram illustrating an exemplary method 1900 for vehicle owner scheduling and preference setting, according to an embodiment. According to the embodiment, process 1900 illustrates the workflow for vehicle owners to register, configure, and schedule their autonomous electric vehicles for participation in the dual-flexibility system. The process begins at the start point and proceeds as follows:

At step 1901, the vehicle owner completes a registration process with the autonomous fleet management system. This may comprise establishing a secure account, providing identity verification, and agreeing to the platform's terms and conditions. The registration process may include verification of vehicle ownership, driver's license validation, insurance confirmation, and banking or payment details for financial transactions.

At step 1902, the owner inputs detailed information about their autonomous electric vehicle. This information may comprise vehicle make and model, year of manufacture, battery capacity and type, charging capabilities (maximum charging/discharging rates, connector types, etc.), vehicle range, autonomous driving capabilities and certification level, and any special features or limitations. The system may interface with vehicle registration databases or manufacturer APIs to validate and supplement the provided information.

At step 1903, the owner configures their preferences for vehicle participation in the system. This preference configuration can include setting priorities between revenue generation, minimal battery degradation, environmental impact, and service types. The owner may specify preferred operating areas, maximum daily mileage, minimum compensation rates, and privacy settings. The system presents default settings based on typical usage patterns but allows for comprehensive customization to match the owner's specific priorities and constraints.

At step 1904, the owner creates a detailed schedule defining time periods when their vehicle is available for system use and when it must be reserved for personal use. This schedule creation can span days, weeks, or months in advance and can include recurring patterns (e.g., available weekdays 9 AM-5 PM, reserved evenings and weekends) as well as one-time exceptions. The interface provides calendar-based visualization allowing for intuitive temporal blocking and supports both precise scheduling and flexible time windows.

At step 1905, the owner selects specific flexibility options for time periods when the vehicle is available to the system. For each available time slot, the owner can specify whether the vehicle should be considered for mobility services (m-DSF), electricity grid services (e-DSF), or both. For each service type, the owner can set additional parameters such as minimum trip distance/duration for mobility services or minimum state of charge requirements for grid services. These selections define the boundaries within which the optimization engine can allocate the vehicle.

At step 1906, the system performs validation of the owner's inputs, checking for logical consistency, feasibility, and alignment with system capabilities. This validation may comprise verifying that the schedule doesn't contain conflicts, that service preferences are compatible with vehicle specifications, and that minimum constraints don't overly restrict the system's ability to utilize the vehicle effectively. The validation process can apply both rule-based checks and predictive models that estimate the likely utilization and value generation given the specified parameters.

At decision point 1907, the system determines whether the provided schedule and preferences are valid and can be accepted into the system. If the validation process identifies issues that prevent effective participation, the process proceeds to step 1909. If the validation is successful, the process proceeds to step 1908.

At step 1908, the system confirms acceptance of the schedule and preferences, providing the owner with a summary of the expected outcomes based on historical patterns and forecasts. This acceptance may include, but is not limited to, estimated revenue potential, projected battery impacts, and anticipated service allocations between mobility and grid services. The system may also highlight particularly valuable time slots based on forecasted demand and grid needs, allowing the owner to make informed adjustments if desired.

At step 1909, if validation issues were identified, the system provides specific feedback about the problems and suggests potential adjustments. This feedback may include highlighting schedule conflicts, identifying overly restrictive constraints that would prevent economic utilization, or suggesting modifications to better align with forecasted high-value opportunities. In some aspects, the feedback is designed to be actionable, showing the owner how specific changes could improve potential outcomes.

Following step 1909, the process loops back to step 1903, allowing the owner to make adjustments to their preferences and schedule based on the system's feedback. This creates an iterative refinement process where owners can see how their constraints affect potential value and make informed tradeoffs.

At step 1910, once a valid schedule is accepted, the system integrates it into the fleet-wide optimization system. This integration makes the vehicle available to the optimization engine for the specified time periods and under the defined constraints. The schedule becomes part of the resource pool considered in the dual flexibility resource allocation process described herein. The system also establishes monitoring and notification protocols based on the owner's communication preferences.

The process concludes with the vehicle fully registered, configured, and scheduled within the autonomous fleet management system. The owner can return to the system at any time to view the current status and performance of their vehicle, modify their schedule or preferences, or view historical performance metrics and compensation records.

Figure 20:
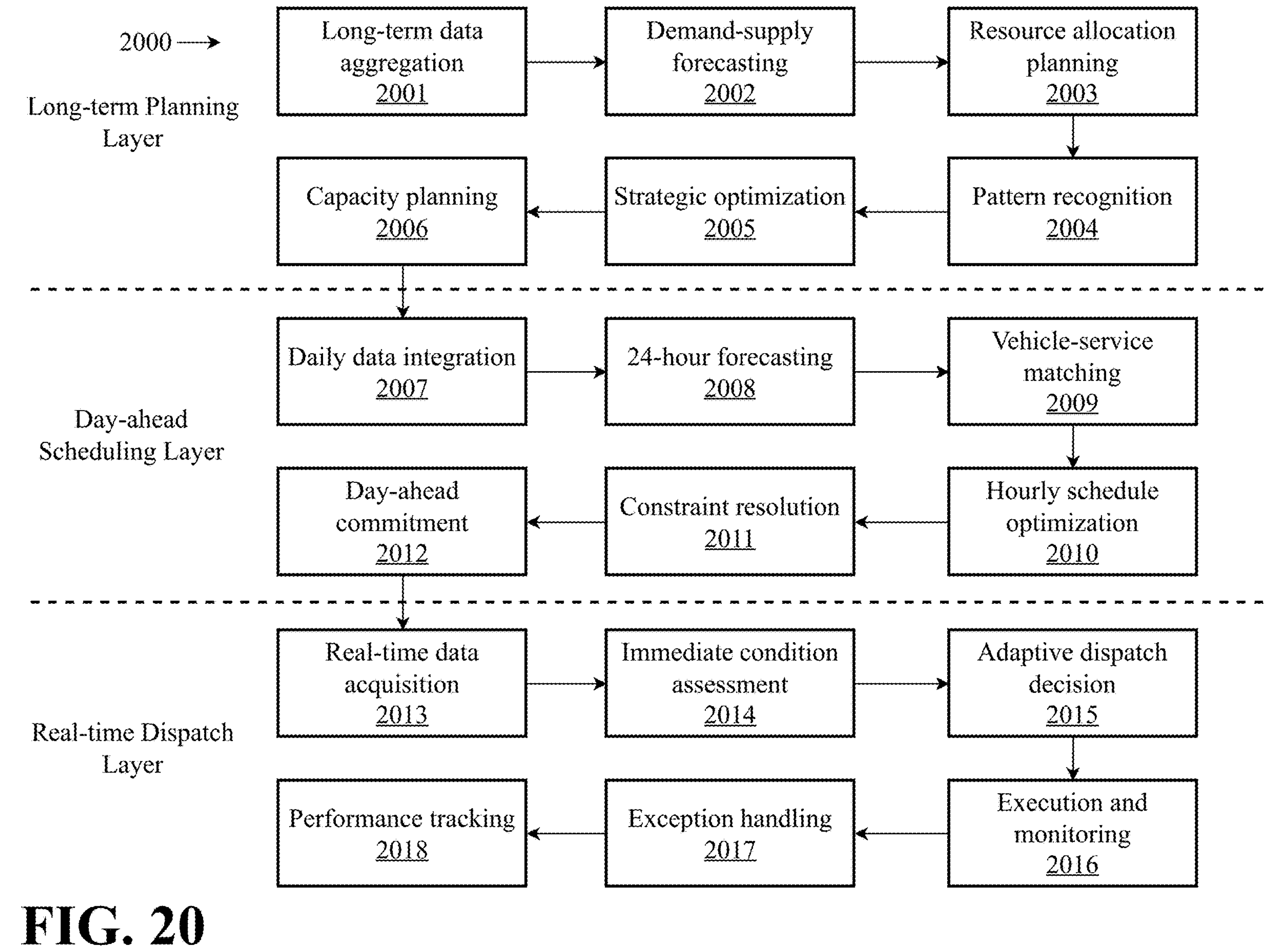
FIG. 20 is a flow diagram illustrating an exemplary method for implementing hierarchical optimization, according to an embodiment.

FIG. 20 is a flow diagram illustrating an exemplary method 2000 for implementing hierarchical optimization, according to an embodiment. According to the embodiment, process 2000 illustrates a hierarchical optimization approach implemented by an optimization engine of the autonomous fleet management system. This process operates across various distinct temporal layers to efficiently handle the complex multi-objective optimization problem of allocating autonomous electric vehicles to mobility and electricity grid services.

At step 2001, the system performs long-term data aggregation, collecting and processing historical and projected data relevant to optimization over an extended time horizon (typically days to weeks). This can include historical vehicle usage patterns, long-range weather forecasts, planned events, seasonal demand variations, maintenance schedules, electricity market forward curves, and renewable generation forecasts. The data is normalized, cleaned, and structured to support long-term planning decisions.

At step 2002, the system conducts comprehensive demand-supply forecasting across both transportation and electricity domains. For transportation, this may comprise forecasting mobility demand patterns by time of day, day of week, and geographic area, accounting for seasonal factors and planned events. For electricity, this may comprise forecasting grid needs, renewable generation, and market prices over the planning horizon. These forecasts establish the expected resource requirements and value opportunities.

At step 2003, the system develops a high-level resource allocation plan that strategically positions the fleet to meet projected demands in both domains. This plan estimates how many vehicles will be needed for mobility services versus grid services across different time periods and geographic areas. It establishes broad allocation targets rather than specific vehicle assignments, providing the structural framework for more detailed scheduling.

At step 2004, the system applies pattern recognition techniques to identify recurring temporal and spatial patterns in both service domains. These may include rush hour congestion patterns, regular grid stress periods, renewable generation cycles, and event-driven demand spikes. The system categorizes time periods and geographic areas based on these patterns to inform optimization strategies.

At step 2005, the system performs strategic optimization to determine high-level resource allocation strategies that maximize value across the planning horizon. This optimization balances long-term objectives such as revenue maximization, service coverage, grid support, and emissions reduction. It considers fleet-level constraints rather than individual vehicle assignments, establishing the strategic framework for subsequent layers.

At step 2006, the system conducts capacity planning based on the strategic optimization results. This may comprise determining whether the available fleet capacity is sufficient to meet projected demands and identifying potential capacity gaps or surpluses. The system may recommend fleet adjustments, such as recruiting additional vehicles for specific time periods or geographic areas where capacity shortfalls are projected.

At step 2007, the system performs daily data integration, incorporating the strategic plans from the long-term layer with updated daily information. This may comprise confirmed vehicle availability from owner schedules, updated weather forecasts, traffic conditions, road closures, day-ahead electricity market prices, and confirmed service reservations. This creates a consolidated view of the operating environment for the next 24 hours.

At step 2008, the system generates detailed 24-hour forecasts for both mobility demand and electricity grid conditions. These forecasts have higher temporal and spatial resolution than the long-term forecasts, typically providing hourly projections for specific neighborhoods or grid connection points. The forecasts incorporate the latest available information and have higher confidence levels due to the shorter prediction horizon.

At step 2009, the system performs vehicle-service matching, pairing specific vehicles with specific mobility or grid service opportunities based on their attributes, location, and owner preferences. This matching process may consider vehicle capabilities, battery state of charge, geographic positioning, and compatibility with service requirements to create potential assignment candidates.

At step 2010, the system executes hourly schedule optimization, determining the optimal allocation of each vehicle for each hour of the upcoming day. This optimization uses the vehicle-service matching candidates and applies detailed constraints and objectives to create a comprehensive hourly schedule that maximizes fleet-wide value while respecting all vehicle-specific constraints.

At step 2011, the system performs constraint resolution to address any conflicts or infeasibilities in the optimized schedule. This may involve adjusting assignments to satisfy hard constraints, balancing competing objectives, or identifying trade-offs that maximize overall value while minimizing constraint violations. The resolution process ensures the schedule is both optimal and feasible.

At step 2012, the system finalizes day-ahead commitments, confirming vehicle allocations for the next day to relevant stakeholders. For electricity grid services, this may involve submitting formal bids or commitments to electricity markets or grid operators. For mobility services, this may involve confirming service availability to users or transportation platforms. These commitments establish the baseline schedule for the real-time layer.

At step 2013, the system conducts real-time data acquisition, continuously collecting and processing current data from various sources. This may comprise real-time vehicle telemetry (e.g., location, battery state, operational status, etc.), current traffic conditions, immediate service requests, real-time electricity prices and grid signals, and current emissions measurements. This creates an up-to-the-minute view of the operating environment.

At step 2014, the system performs immediate condition assessment, evaluating the current state against the day-ahead schedule and identifying any significant deviations or emerging opportunities. This assessment considers factors such as schedule adherence, unexpected events, immediate service requests, grid emergency signals, or sudden changes in traffic or weather conditions that might warrant adjustment to the planned schedule.

At step 2015, the system makes adaptive dispatch decisions, determining whether to maintain the planned schedule or make real-time adjustments based on the condition assessment. These decisions balance the value of adhering to commitments against the potential benefits of responding to immediate conditions. The system prioritizes maintaining critical commitments while capitalizing on high-value emerging opportunities.

At step 2016, the system manages execution and monitoring of the dispatch decisions, sending instructions to vehicles, tracking their performance, and maintaining real-time awareness of their status. This includes communicating route information, service parameters, connection instructions, or other operational directives to the vehicles and monitoring their implementation through continuous telemetry feedback.

At step 2017, the system handles exceptions that arise during execution, such as service cancellations, vehicle malfunctions, unexpected traffic conditions, or grid service interruptions. The exception handling may involve rerouting vehicles, reassigning services to alternative vehicles, negotiating modified service terms, or implementing contingency plans to maintain system performance despite disruptions.

At step 2018, the system conducts performance tracking, measuring and recording actual outcomes against expected performance for both vehicles and services. This may comprise tracking metrics such as service completion times, energy consumption, grid service accuracy, user satisfaction, and financial outcomes. The performance data is stored for analysis, settlement, and continuous improvement.

In some embodiments, the process comprises a continuous improvement point, which feeds back into all three layers of the optimization hierarchy. Real-time performance data informs adjustments to immediate dispatch decisions, refinements to day-ahead scheduling algorithms, and updates to long-term planning strategies. This creates a closed-loop learning system that continuously enhances optimization performance based on operational experience.

The exemplary hierarchical optimization method enables efficient management of computational resources by applying appropriate techniques at each temporal layer, while ensuring coordination between strategic planning, tactical scheduling, and operational execution for the autonomous electric vehicle fleet.

Figure 21:
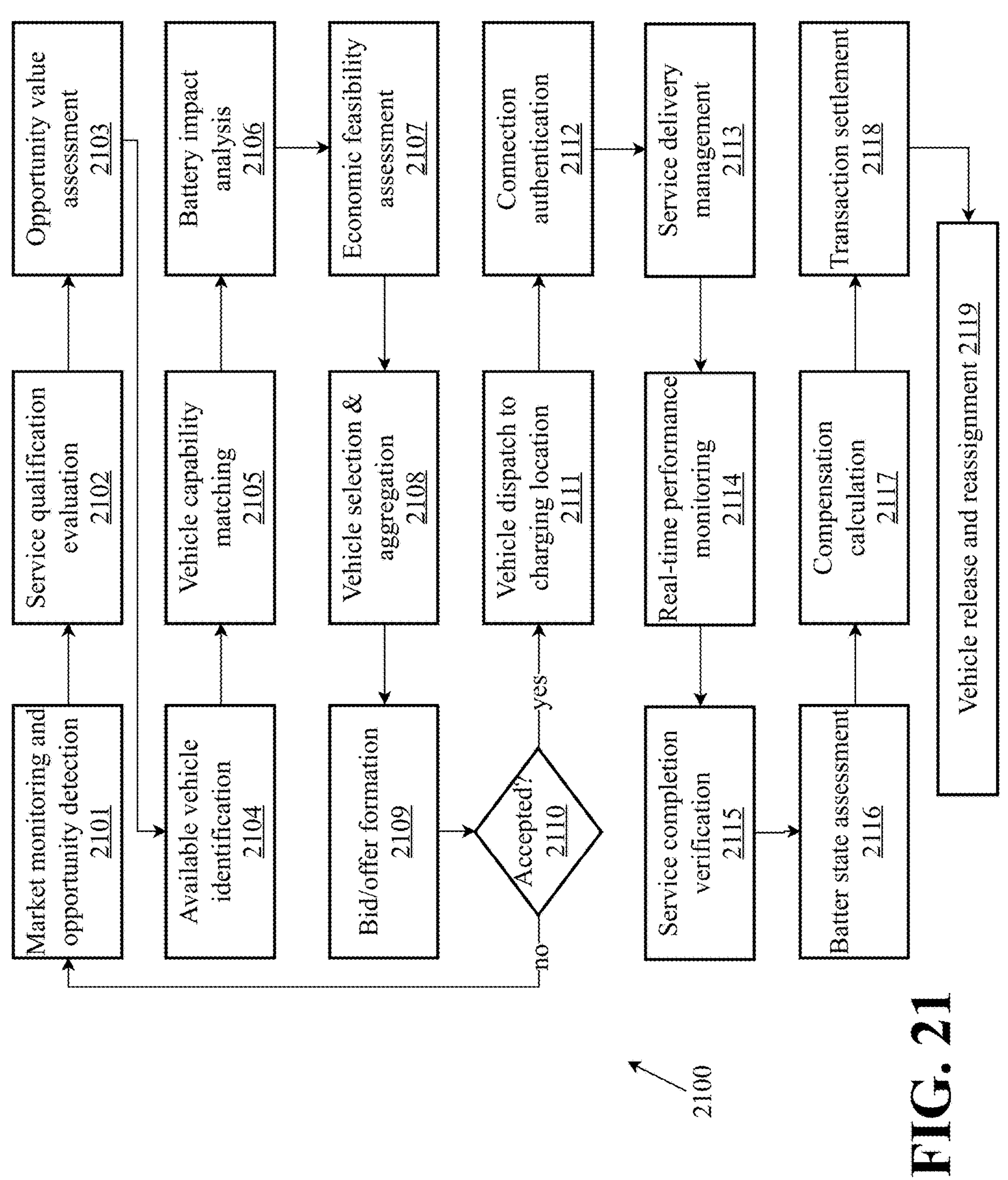
FIG. 21 is a flow diagram illustrating an exemplary method for grid service participation, according to an embodiment.

FIG. 21 is a flow diagram illustrating an exemplary method 2100 for grid service participation, according to an embodiment. According to the embodiment, process 2100 illustrates an exemplary complete workflow for autonomous electric vehicles to participate in electricity grid services as part of the e-DSF functionality of the autonomous fleet management system.

At step 2101, the system performs continuous market monitoring and opportunity detection, analyzing electricity market data to identify potential grid service opportunities. This involves processing real-time and day-ahead market signals, grid condition indicators, and service requests from utilities or aggregators. The system identifies emerging opportunities such as frequency regulation needs, capacity shortages, demand response events, or favorable energy arbitrage conditions based on price differentials.

At step 2102, the system evaluates the service qualification requirements for each identified opportunity. This involves analyzing the technical specifications, duration, response time, capacity requirements, and regulatory compliance factors associated with the grid service. The evaluation determines whether the fleet's capabilities can satisfy the baseline requirements for participation in the specific service type.

At step 2103, the system conducts a detailed opportunity value assessment, quantifying the potential economic value, operational feasibility, and strategic importance of each qualified grid service opportunity. This assessment considers factors such as compensation rates, service duration, energy requirements, timing, location constraints, and alignment with fleet capabilities. It produces a prioritized ranking of opportunities based on their overall value potential.

At step 2104, the system identifies available vehicles that could potentially provide the grid service based on current status, location, and owner preferences. This involves querying the available vehicle pool to find vehicles that are not currently assigned to mobility services, have sufficient battery capacity, and are authorized by their owners for grid service participation during the relevant time period.

At step 2105, the system performs vehicle capability matching, evaluating each available vehicle's technical capabilities against the specific requirements of the grid service opportunity. This matching considers factors such as battery capacity, charging/discharging rates, connector types, communication protocols, response times, and geographic proximity to suitable connection points. The matching process identifies the subset of available vehicles that can effectively deliver the specific grid service.

At step 2106, the system conducts a battery impact analysis for each potentially participating vehicle. This analysis estimates how the grid service would affect the vehicle's battery state of charge, depth of discharge, cycling patterns, and long-term degradation. It applies battery degradation models that account for chemistry-specific aging factors, temperature conditions, and usage history to quantify the expected wear cost associated with the service.

At step 2107, the system performs an economic feasibility assessment that compares the expected compensation for the grid service against the estimated costs, including battery degradation, energy losses, opportunity costs (potential mobility service revenue), and operational overhead. This assessment determines whether participation would create positive net value for the vehicle owners and establishes minimum compensation thresholds for participation.

At step 2108, the system selects specific vehicles for participation and aggregates their capabilities to form a service offering. The selection process optimizes the vehicle mix based on various parameters such as their individual characteristics, locations, and owner preferences to create the most cost-effective and reliable service capability. The aggregation combines the selected vehicles into a virtual power plant of sufficient scale to meet the service requirements.

At step 2109, the system formulates a formal bid or offer to provide the grid service based on the aggregated vehicle capabilities and economic parameters. The bid specifies the capacity offered, price requirements, duration, location, and technical parameters. For market-based services, the bid can be structured according to market rules and submission protocols. For bilateral services, the offer includes proposed terms and conditions for service provision.

At decision point 2110, the system determines whether the bid or offer has been accepted by the market operator, utility, or other counterparty. This involves monitoring for acceptance messages, contract confirmations, or dispatch signals that indicate the service will be called upon. If the bid is not accepted, the process returns to the market monitoring stage to identify new opportunities. If the bid is accepted, the process proceeds to service delivery preparations.

At step 2111, the system dispatches selected vehicles to appropriate charging locations or connection points in preparation for service delivery. This dispatch process coordinates with AI-based routing system 500 to generate optimal routes to the designated charging stations or connection points. It considers factors such as current vehicle location, traffic conditions, required arrival time, and energy efficiency to ensure vehicles are properly positioned for service provision.

At step 2112, the vehicles establish physical and communications connections with the charging infrastructure and complete authentication procedures to enable secure control and monitoring. This may comprise handshaking between vehicle systems and charging station controllers, verification of vehicle identity and authorization, initialization of communication protocols, and establishment of control parameters for the grid service.

At step 2113, the system manages the actual delivery of the grid service, coordinating the charging and discharging of the connected vehicles according to grid signals and service requirements. This management can include, but is not limited to, real-time control of power flows, dynamic adjustment of charge/discharge rates, adherence to contractual parameters, and synchronization across multiple vehicles to deliver the aggregate service reliably.

At step 2114, the system conducts real-time performance monitoring during service delivery, tracking key metrics such as response time, accuracy, power levels, energy flows, and compliance with dispatch signals. This monitoring compares actual performance against service requirements and identifies any deviations or issues requiring intervention. It also collects data for subsequent verification, settlement, and performance improvement.

At step 2115, the system performs service completion verification when the grid service period ends, documenting the actual service delivered compared to the contracted requirements. This verification can include compiling compliance metrics, energy accounting, service duration records, and performance quality indicators. The verification creates an auditable record of service delivery that serves as the basis for compensation and settlement.

At step 2116, the system conducts a post-service battery state assessment for each participating vehicle, measuring and recording the actual impact of the grid service on battery conditions. This assessment may include, but is not limited to, state of charge measurements, internal resistance checks, temperature readings, and estimated degradation impact. The data informs subsequent battery management strategies and feeds into the degradation models for continuous refinement.

At step 2117, the system calculates the compensation due for the grid service based on the verified service delivery and contractual terms. This calculation applies the agreed pricing to the actual service quantities, adjusts for any performance bonuses or penalties, accounts for energy costs or benefits, and allocates the compensation among participating vehicle owners according to their contribution and the system's revenue sharing model.

At step 2118, the system executes the financial settlement of the transaction, processing payments to vehicle owners through distributed ledger subsystem 1406. The settlement may comprise recording the transaction details, transferring compensation to owner accounts, documenting battery impact compensation, and maintaining a complete audit trail of the financial flows and supporting performance data.

At step 2119, the system releases the vehicles from grid service and makes them available for reassignment to other services. This can include updating their status in the vehicle scheduling subsystem 1402, recalculating their availability based on current battery state and owner preferences, and reintegrating them into the available resource pool for either mobility services or additional grid services.

The process may further comprise one or more performance evaluation steps, where the system analyzes the completed grid service participation to identify opportunities for improvement in vehicle selection, bid formation, service delivery, and compensation models. This evaluation feeds back into the system's continuous learning process, enhancing future grid service participation effectiveness.

This exemplary workflow enables autonomous electric vehicles to actively participate in electricity markets and grid services when not required for transportation, creating additional value for vehicle owners while supporting grid stability and renewable energy integration.

Figure 22:
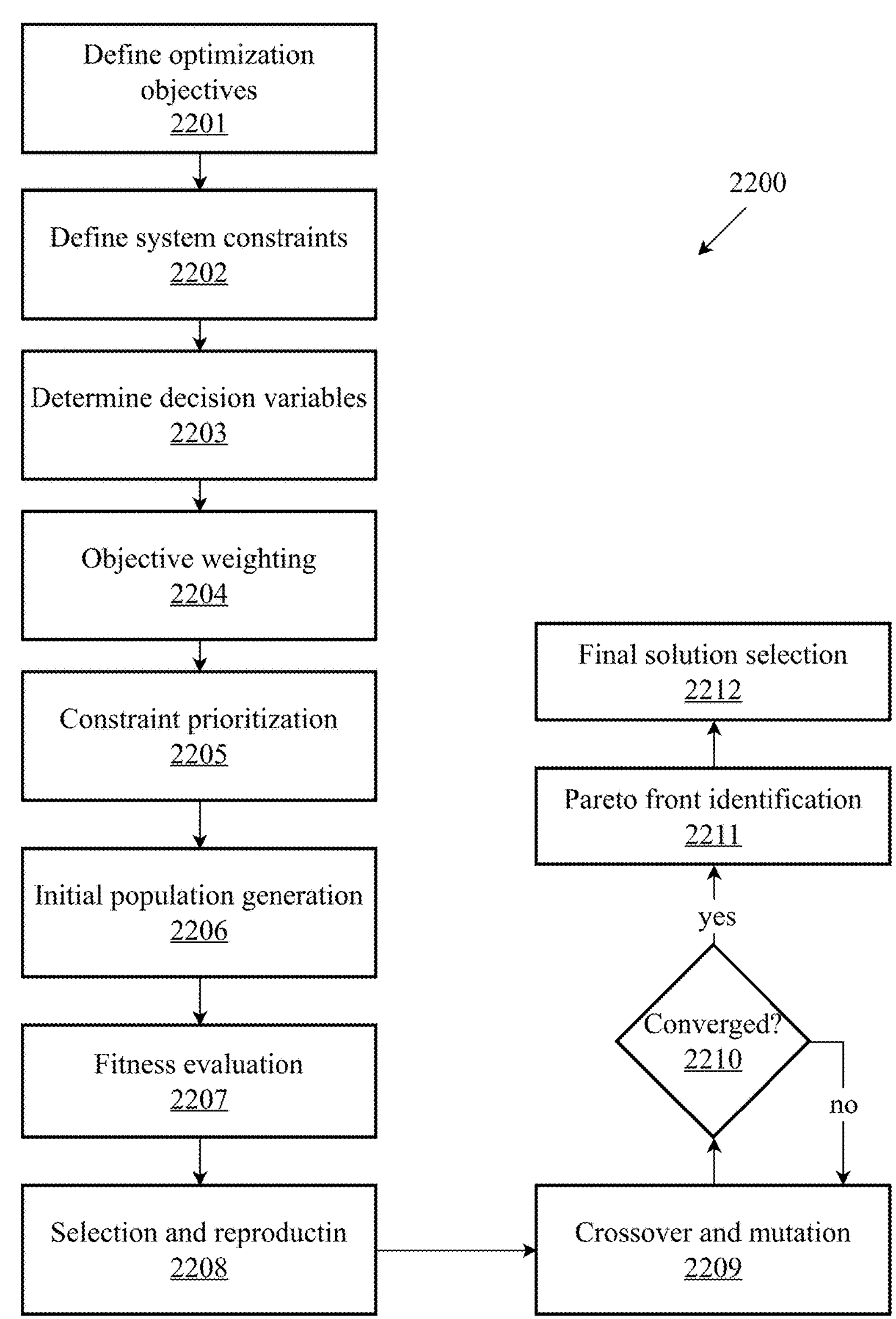
FIG. 22 is a flow diagram illustrating an exemplary method for implementing a multi-objective optimization process, according to an embodiment.

FIG. 22 is a flow diagram illustrating an exemplary method 2200 for implementing a multi-objective optimization process, according to an embodiment. According to the embodiment, process 2200 illustrates the multi-objective optimization approach implemented by optimization engine 1405 to balance multiple competing objectives when allocating autonomous electric vehicles between mobility and electricity grid services. The process may be structured for illustrative purposes into four distinct phases: problem definition, preference articulation, solution generation, and solution selection.

At step 2201, the system defines the specific optimization objectives that will guide the allocation process. These typically include, but are not limited to, revenue maximization (the total income generated from mobility and grid services), energy cost minimization (reducing the costs associated with charging), emissions reduction (minimizing the environmental impact of transportation and electricity generation), and battery health preservation (minimizing degradation and extending vehicle battery lifespans). Each objective can be mathematically formulated with appropriate metrics and evaluation functions that quantify performance in that dimension.

At step 2202, the system defines the constraints that limit the feasible solution space for the optimization problem. These constraints can include battery state of charge limitations (minimum and maximum levels, rate limitations), owner preferences and availability restrictions (time windows, geographic boundaries, service type preferences), grid capacity and connection constraints (available connection points, power limits), and vehicle location and travel time constraints (physical positioning, travel distances, traffic conditions). Each constraint is formulated as a mathematical inequality or equality that must be satisfied by any valid solution.

At step 2203, the system determines the decision variables that will be optimized during the process. These typically include binary variables indicating service assignment (mobility, grid, or idle) for each vehicle at each time interval, continuous variables representing charging or discharging power levels, route selection variables for mobility services, and timing variables for service delivery. The decision variables fully define the possible actions that can be taken for each vehicle across the scheduling horizon.

At step 2204, the system applies objective weighting to establish the relative importance of each optimization objective. This weighting may be derived from system-level priorities, user preferences, regulatory requirements, or dynamic conditions such as air quality alerts or grid stress levels. The weights determine how the system will trade off competing objectives when they cannot all be maximized simultaneously. The weighting scheme may use techniques such as the Analytic Hierarchy Process (AHP) or direct stakeholder input to quantify relative priorities.

At step 2205, the system performs constraint prioritization to determine how to handle potential constraint violations when strict feasibility cannot be maintained. This prioritization establishes which constraints are considered hard constraints (must never be violated) versus soft constraints (can be violated with appropriate penalties). For soft constraints, the prioritization may define the relative severity of different types of violations, guiding the system in making appropriate trade-offs when necessary.

At step 2206, the system generates an initial population of potential solutions for the scheduling problem. In some embodiments, this may comprise using genetic algorithm principles, wherein this initial population contains a diverse set of candidate schedules that allocate vehicles to services across the scheduling horizon. The initial population may be generated through a combination of random sampling, heuristic rules, historical patterns, and domain knowledge to ensure sufficient diversity and quality to support effective optimization.

At step 2207, the system evaluates the fitness of each candidate solution in the population. This fitness evaluation calculates performance metrics for each objective dimension (e.g., revenue, energy cost, emissions, battery health, etc.) based on the specific service allocations and parameters in the solution. The weighted sum of these objective metrics, adjusted for any constraint violations, can be used to determine the overall fitness score for each solution.

At step 2208, the system performs selection and reproduction operations on the evaluated population. Using techniques such as tournament selection, roulette wheel selection, or rank-based selection, the system identifies high-fitness solutions that will serve as parents for the next generation. The selection process can be configured to balance exploitation of known good solutions with exploration of the solution space, maintaining appropriate selection pressure while preserving diversity.

At step 2209, the system can be configured to apply crossover and mutation operations to create a new generation of candidate solutions. Crossover operations combine elements from selected parent solutions to create offspring solutions that inherit characteristics from both parents. Mutation operations introduce random variations into solutions to maintain genetic diversity and explore new regions of the solution space. Specialized operators may be employed that respect the structure and constraints of the scheduling problem.

At step 2210, the system checks for convergence to determine whether the optimization process should terminate or continue generating additional generations. Convergence criteria may include, but are not limited to, reaching a maximum number of generations, achieving a threshold level of fitness improvement between generations, or satisfying a time limit for computation. If convergence criteria are not met, the process returns to step 2209 to create another generation through crossover and mutation.

At step 2211, the system identifies the Pareto front from the final generation of solutions. The Pareto front consists of non-dominated solutions for which no other solution is better across all objectives. These represent the optimal trade-offs between competing objectives, where improving one objective would necessarily degrade another. The Pareto front provides decision-makers with a set of optimal alternatives rather than a single "best" solution.

At step 2212, the system selects the final solution from the Pareto front based on current system priorities, contextual factors, and operational requirements. This selection may comprise applying additional criteria beyond the original optimization objectives, such as solution robustness, adaptability to changing conditions, or alignment with specific strategic goals. The selected solution becomes the operational schedule for implementation.

The process concludes at an optimization complete point, with a comprehensive schedule for all vehicles in the fleet that optimally balances revenue generation, energy costs, environmental impact, and battery health while respecting owner preferences and system constraints. This schedule may be implemented through vehicle scheduling subsystem 1402 and continuously monitored and adapted as conditions change.

Through this exemplary multi-objective optimization process, the autonomous fleet management system creates maximum value from the dual-flexibility capabilities of autonomous electric vehicles while respecting the diverse interests of all stakeholders in the transportation and energy ecosystems.

Figure 23:
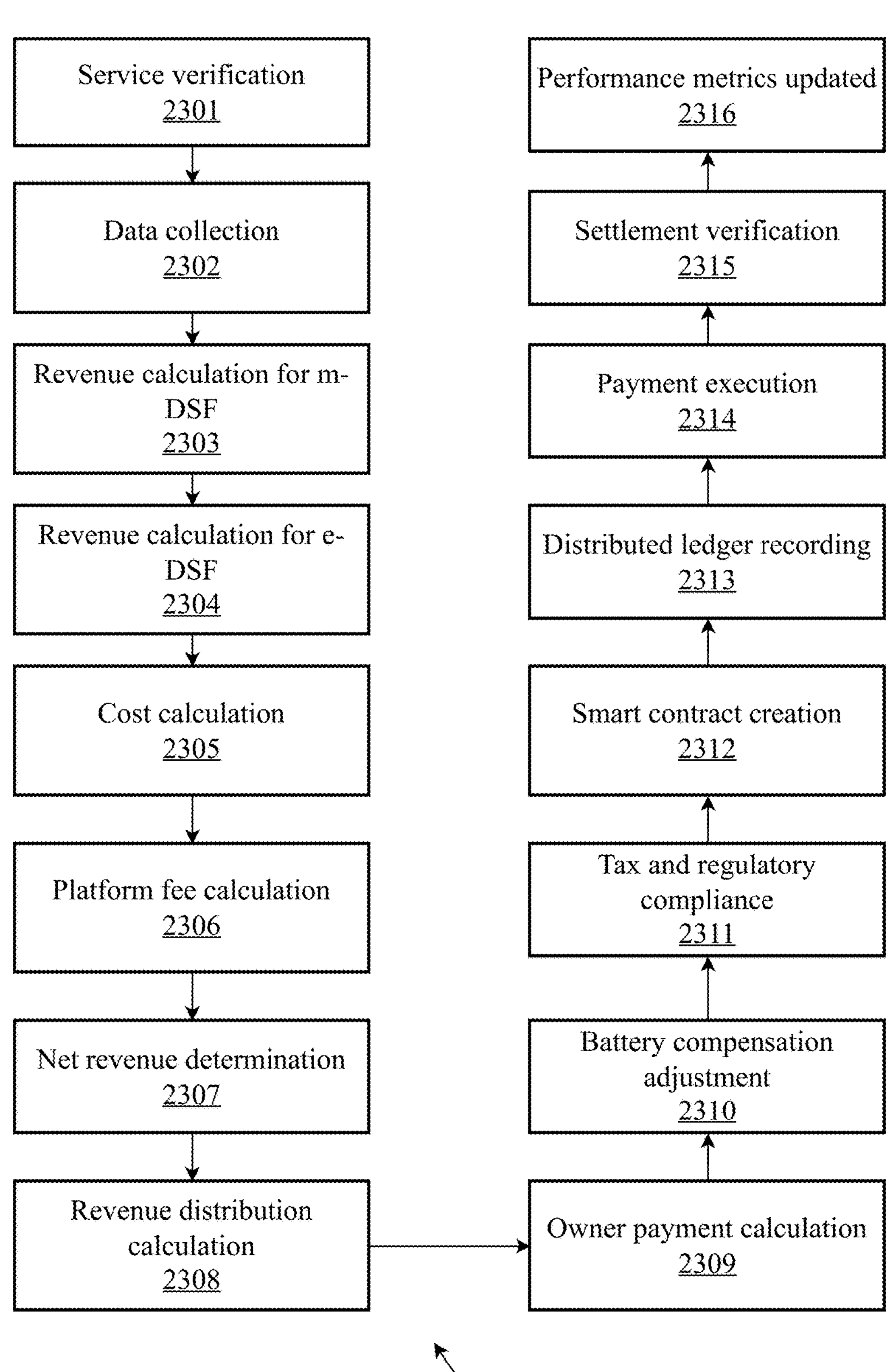
FIG. 23 is a flow diagram illustrating an exemplary method diagram for revenue distribution and settlement, according to an embodiment.

FIG. 23 is a flow diagram illustrating an exemplary method 2300 diagram for revenue distribution and settlement, according to an embodiment. According to the embodiment, process 2300 illustrates a revenue distribution and settlement method implemented by the autonomous fleet management system to fairly compensate vehicle owners for both mobility services (m-DSF) and electricity grid services (e-DSF).

At step 2301, the system performs service verification for all completed services within the settlement period. This verification confirms that scheduled services were properly delivered according to their specifications and requirements. For mobility services, this may comprise verifying successful trip completion, route adherence, and service quality metrics. For grid services, this may comprise confirming connection establishment, power flow volumes, response to control signals, and performance against service requirements. The verification process creates an auditable record of confirmed service delivery as the foundation for revenue calculations.

At step 2302, the system collects a plurality of data from multiple sources to support accurate settlement calculations. This data collection can include trip details from mobility service providers (e.g., distances, durations, passenger/cargo details, etc.), energy measurements from charging stations (e.g., charging and discharging volumes, timestamps, rates, etc.), market settlement data from grid operators (e.g., prices, performance incentives/penalties, etc.), and vehicle telemetry (e.g., battery parameters, energy consumption, location history, etc.). The system normalizes and validates this data to ensure completeness and accuracy before proceeding with financial calculations.

At step 2303, the system calculates the gross revenue earned from mobility demand-side flexibility (m-DSF) services. This calculation applies the appropriate pricing models to the verified service data, which may include base fares, distance-based charges, time-based charges, surge pricing factors, quality bonuses, and special service premiums. For multi-passenger or shared mobility services, the calculation may account for the appropriate revenue division among participating parties. The result is the total mobility service revenue before costs and fees are considered.

At step 2304, the system calculates the gross revenue earned from electricity demand-side flexibility (e-DSF) services. This calculation applies market rates, contracted prices, or feed-in tariffs to the verified energy volumes, accounting for time-of-use factors, grid service category premiums, performance bonuses, capacity payments, and any penalties for service deviations. The calculation distinguishes between different grid service types (e.g., frequency regulation, peak shaving, energy arbitrage, etc.) with their distinct compensation structures. The result is the total grid service revenue before costs and fees.

At step 2305, the system calculates the operational costs associated with service delivery. These costs primarily include energy costs (the price paid for electricity consumed during vehicle charging) and battery degradation costs (the estimated depreciation of battery value resulting from cycling and usage patterns during service delivery). Energy costs can be calculated using the actual energy quantities and applicable retail electricity rates at the time and location of charging. Battery degradation costs may be calculated using one or more models that account for depth of discharge, charging/discharging rates, temperature conditions, and cycle frequency to estimate the incremental reduction in battery lifespan and performance.

At step 2306, the system calculates the platform fees to be retained by the system operator as compensation for providing the optimization, coordination, and transaction processing services. These fees may be structured as flat fees, percentage-based commissions, subscription fees, or a combination thereof, potentially with different rates for different service types or vehicle categories. The fee structure may also incorporate incentive mechanisms to encourage beneficial behaviors such as high service availability or participation during high-value periods.

At step 2307, the system determines the net revenue available for distribution by combining the gross revenues from m-DSF and e-DSF, subtracting the operational costs and platform fees. This calculation produces the total financial value created by the vehicle's participation in the dual-flexibility system during the settlement period, adjusted for all direct costs and platform fees, resulting in the distributable revenue pool.

At step 2308, the system calculates the specific revenue distribution among stakeholders according to predefined distribution rules and agreements. These rules determine how the net revenue is allocated among vehicle owners, charging infrastructure providers, financing partners, insurance providers, and other potential stakeholders. The distribution calculations may incorporate factors such as ownership arrangements (e.g., fully owned, leased, financed), risk-sharing agreements, contribution assessments, and performance incentives to ensure fair and transparent allocation of value.

At step 2309, the system calculates the specific payment due to each vehicle owner based on the revenue distribution results. This calculation consolidates all earnings across different service types, time periods, and locations into a single net payment amount. It accounts for any owner-specific adjustments such as loyalty bonuses, volume incentives, or special program participations. The calculation produces a comprehensive payable amount representing the owner's share of the value created by their vehicle during the settlement period.

At step 2310, the system applies battery compensation adjustments to the owner payments. These adjustments provide additional compensation specifically for battery degradation beyond normal usage patterns, ensuring that owners are properly compensated for the long-term impact of grid services on their battery assets. The adjustment calculations can use detailed battery impact models that compare actual degradation to baseline expectations and quantify the differential as a monetary value based on battery replacement costs, warranty implications, and residual value impacts.

At step 2311, the system ensures tax and regulatory compliance by applying appropriate withholding, reporting, and documentation procedures to the calculated payments. This may comprise generating and storing necessary tax documents, applying relevant tax withholdings or additions (e.g., VAT, GST, sales tax, etc.), and creating compliance records for regulatory requirements such as transportation service regulations, energy market participation rules, and financial services obligations. The system maintains comprehensive audit trails to demonstrate compliance with all applicable jurisdictional requirements.

At step 2312, the system creates smart contracts that encode the complete settlement terms and conditions in executable digital form. These contracts specify the payment amounts, recipient details, payment conditions, timing, and verification requirements. They may further include multi-signature authorization requirements, escrow provisions, conditional release mechanisms, or other security and verification features. The smart contracts serve as both the execution mechanism for payments and the immutable record of the settlement agreement between parties.

At step 2313, the system records all settlement details on distributed ledger subsystem 1406 to create a transparent, tamper-proof record of the entire transaction. This recording may comprise service verification evidence, revenue calculations, cost assessments, fee applications, distribution determinations, and payment authorizations. The distributed ledger provides all stakeholders with verifiable proof of the settlement process and results, ensuring transparency and accountability while maintaining appropriate privacy protections for sensitive information.

At step 2314, the system executes the actual payment transactions based on the smart contracts and distributed ledger records. This execution transfers the calculated amounts to the appropriate financial accounts or digital wallets of vehicle owners and other entitled stakeholders. The payment process may use traditional banking channels, digital payment networks, cryptocurrency transactions, or a combination of methods depending on stakeholder preferences and system capabilities. The system ensures accurate routing, secure transmission, and confirmation of receipt for all payments.

At step 2315, the system performs settlement verification to confirm that all payments were properly executed and received by the intended recipients. This verification may comprise reconciling payment transaction records with bank or payment provider confirmations, processing acknowledgment messages from recipients, verifying smart contract execution records, and updating settlement status indicators in the system database. Any discrepancies or failed transactions can be identified for immediate investigation and resolution.

At step 2316, the system updates performance metrics and financial records with the completed settlement data. This update can include calculating and storing key performance indicators such as revenue per vehicle-hour, cost per service type, profitability by location, and return on asset value. The system can be configured to generate financial reports for both system operators and vehicle owners, providing detailed breakdowns of earnings, costs, and value creation. These metrics and reports support performance analysis, financial planning, and continuous improvement of the dual-flexibility business model.

The process concludes with all services properly compensated, all stakeholders fairly remunerated, and all transactions permanently recorded in the distributed ledger system. The settlement results feed into subsequent optimization and scheduling processes, influencing future vehicle allocations based on demonstrated value creation patterns.

This exemplary revenue distribution and settlement method ensures transparent, accurate, and fair compensation for all participants in the autonomous fleet management system, creating a sustainable economic model that incentivizes optimal participation in both mobility and electricity services.

Figure 24:
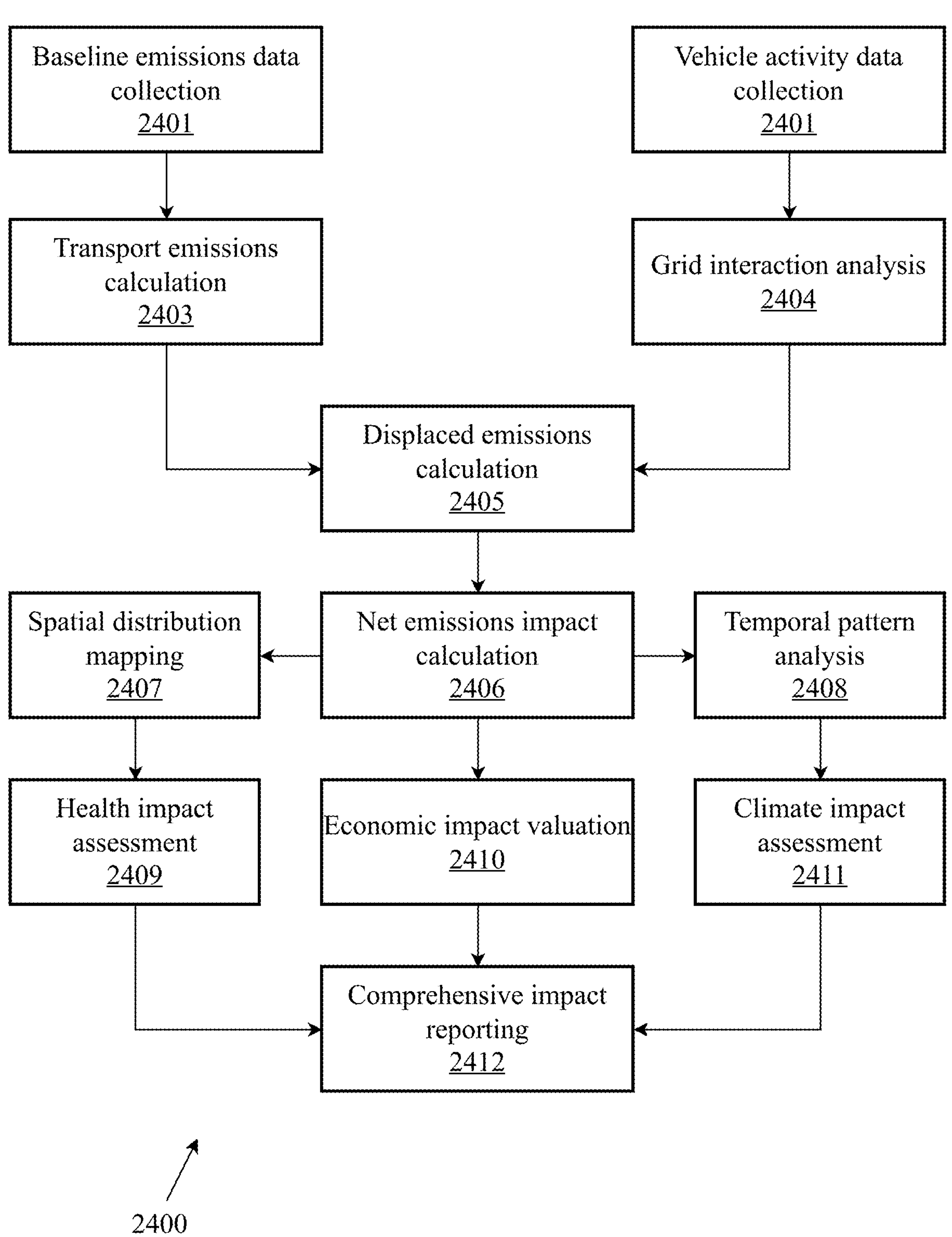
FIG. 24 is a flow diagram illustrating an exemplary method for emissions impact assessment, according to an embodiment.

FIG. 24 is a flow diagram illustrating an exemplary method 2400 for emissions impact assessment, according to an embodiment. According to the embodiment, process 2400 illustrates an exemplary emissions impact assessment method implemented by the autonomous fleet management system to quantify, analyze, and report the environmental effects of dual-flexibility operations. The process may be organized into three main phases for illustrative purposes: data acquisition, emissions analysis, and impact assessment.

At step 2401, the system performs baseline emissions data collection, gathering comprehensive information about the pre-existing environmental conditions and emissions profiles in the operational area. This may comprise collecting data on traffic patterns and volumes on different road segments, ambient air quality measurements from monitoring stations (particularly $NO_2$, $PM_{2.5}$, and other transportation-related pollutants), and grid emissions intensity factors representing the carbon intensity of electricity generation at different times and locations. This baseline data establishes the reference point against which the system's impacts will be measured.

At step 2402, the system collects detailed vehicle activity data for all autonomous electric vehicles participating in the dual-flexibility system. This data can include, but is not limited to, complete route histories for all mobility services (e.g., precise paths taken, distances traveled, speeds, acceleration patterns), energy consumption records (e.g., energy used per trip, efficiency metrics), and charging/discharging records (e.g., timing, duration, power levels, energy quantities). The vehicle activity data provides a comprehensive record of how the fleet operated during the assessment period.

At step 2403, the system calculates transportation emissions impacts based on the mobility services provided by the fleet. This calculation quantifies the emissions directly produced by the electric vehicles (which are typically zero at the tailpipe) and, more significantly, the emissions avoided by displacing conventional internal combustion engine (ICE) vehicles. The calculation considers factors such as the types of trips served, typical vehicle occupancy, regional vehicle fleet composition, and emissions profiles of displaced conventional vehicles to estimate the net transportation emissions effect.

At step 2404, the system analyzes grid interaction impacts resulting from vehicle charging and discharging activities. This analysis examines how the timing and location of electricity consumption and provision affected the overall grid emissions. It quantifies the emissions associated with charging the fleet based on the temporal and spatial grid emissions intensity, as well as the emissions reductions achieved by providing vehicle-to-grid services during high-emissions periods or by shifting charging to low-emissions periods when renewable generation is abundant.

At step 2405, the system calculates displaced emissions across both transportation and electricity sectors. This calculation can combine the transportation displacement effects (conventional vehicles replaced by zero-emission EVs) with the electricity system displacement effects (grid services that reduced the need for fossil fuel peaker plants, enabled higher renewable energy integration, or shifted load to cleaner generation periods). The calculation applies appropriate counterfactual scenarios to estimate what emissions would have occurred without the dual-flexibility system's interventions.

At step 2406, the system calculates the net emissions impact by aggregating all displacement effects and direct emissions (if any) across both sectors. This calculation produces a comprehensive metric representing the total emissions reduced or avoided due to the system's operations during the assessment period. The net impact is typically expressed in terms of carbon dioxide equivalent ($CO_2e$) to standardize the effect of different greenhouse gases, as well as in terms of criteria pollutants like $NO_x$ and particulate matter that affect air quality, but may be expressed in various formats dependent upon the use case and specific embodiment.

At step 2407, the system creates spatial distribution mapping of the emissions impacts. This mapping visualizes how the emissions benefits (or any potential increases) are geographically distributed across the operational area. It identifies areas of significant improvement, such as congested urban corridors where EV adoption has substantially reduced local emissions, as well as any areas where emissions may have shifted or concentrated due to changing traffic patterns or charging infrastructure locations.

At step 2408, the system performs temporal pattern analysis to understand how emissions impacts vary over different time periods. This analysis identifies peak impact periods, correlations with grid demand patterns, seasonal variations, and trends over time. It helps identify optimal operational patterns that maximize emissions reductions and reveals opportunities for further optimization of fleet scheduling to target high-impact periods.

At step 2409, the system conducts a health impact assessment that translates the emissions reductions into public health benefits. This assessment applies air quality modeling and epidemiological relationships to estimate reduced incidence of respiratory diseases, cardiovascular effects, and other health outcomes associated with decreased air pollution. The assessment may focus particularly on vulnerable populations and environmental justice considerations, identifying benefits to historically disadvantaged or pollution-burdened communities.

At step 2410, the system performs economic impact valuation to quantify the monetary value of the emissions reductions. This valuation applies established methodologies such as the social cost of carbon for climate impacts and health cost models for air quality improvements. The economic valuation provides a dollar-denominated measure of the externality benefits created by the system, which can inform policy decisions, incentive programs, and business model refinements.

At step 2411, the system conducts a climate impact assessment that focuses specifically on the greenhouse gas reduction potential and climate change mitigation effects of the system's operations. This assessment calculates the contribution toward carbon reduction goals, compares performance to science-based targets, and may include longer-term projections of climate benefits based on scaling the system to larger fleet sizes or expanded geographical coverage.

At step 2412, the system generates comprehensive impact reporting that integrates all assessment components into coherent and accessible documentation. These reports can be tailored to different stakeholders' needs, from detailed technical analyses for regulators and researchers to simplified dashboards for vehicle owners and the public. The reports may comprise key performance indicators, visual representations of impacts, comparative benchmarks, and recommendations for optimization. They serve as both accountability mechanisms and continuous improvement tools for the dual-flexibility system. These assessments feed back into the system's optimization algorithms, helping to further refine vehicle scheduling and allocation to maximize positive environmental impacts alongside economic benefits.

Through this exemplary emissions impact assessment method, the autonomous fleet management system quantifies its contribution to environmental sustainability, providing tangible metrics of its effectiveness in reducing emissions across both transportation and electricity sectors. This assessment framework enables continuous improvement, supports stakeholder engagement, and demonstrates the system's alignment with broader societal sustainability goals.

Figure 25:
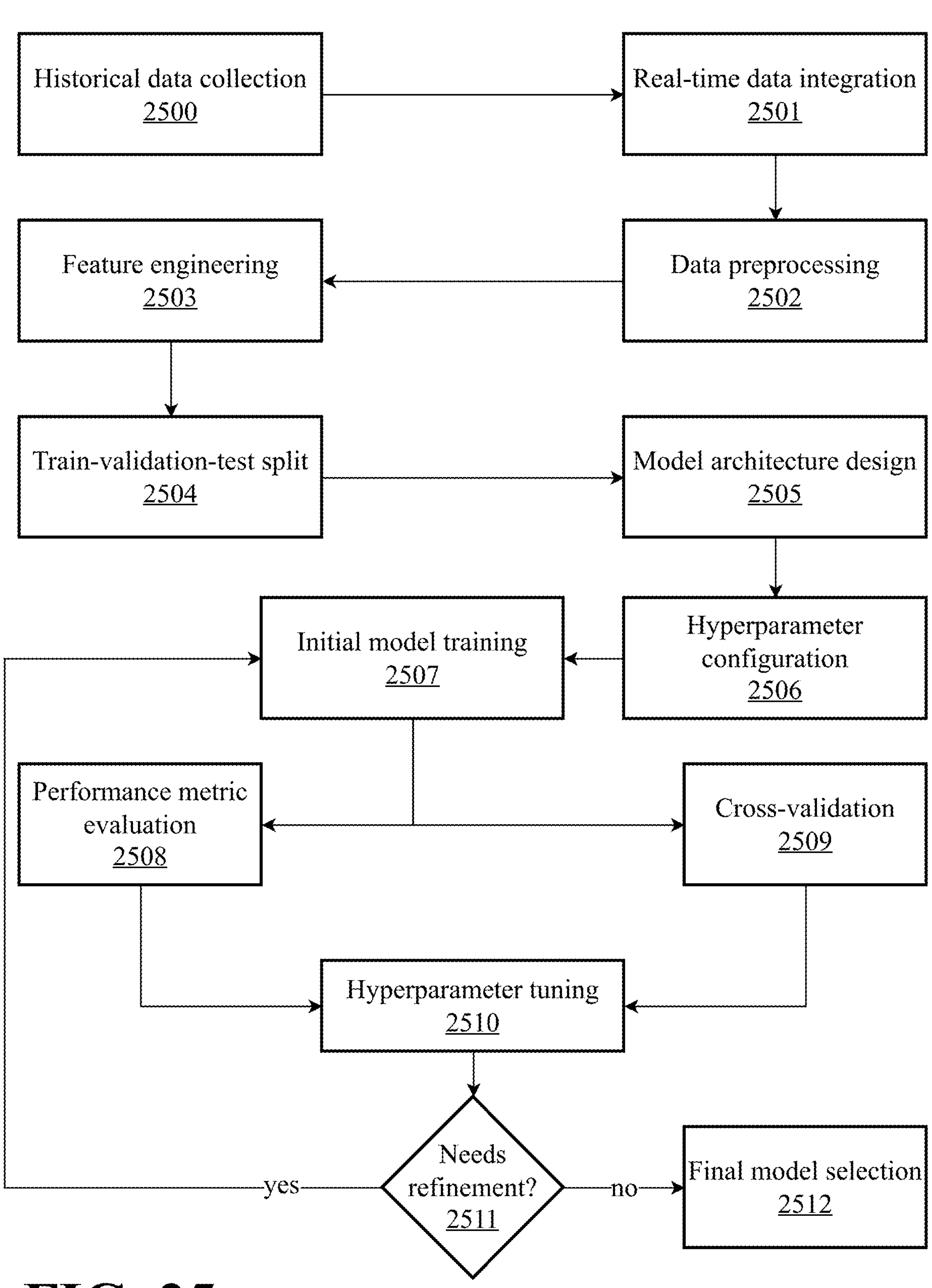
FIG. 25 is a flow diagram illustrating an exemplary method for training one or more of the models described herein, according to an embodiment.

FIG. 25 is a flow diagram illustrating an exemplary method for training one or more of the models described herein, according to an embodiment. According to the embodiment, the process illustrates a model training methodology which may be implemented within the machine learning engine of autonomous fleet management system 1400 (or other components described herein). This process enables the development of various predictive and optimization models that power various components of the platform, including demand forecasting, energy price prediction, battery degradation modeling, and multi-objective optimization algorithms. The process may be organized into three main phases for illustrative purposes: data acquisition and preparation, model development, and model evaluation and refinement.

At step 2500, the system performs historical data collection, gathering comprehensive datasets from a plurality of sources that span significant time periods to capture seasonal patterns, long-term trends, and rare events. These historical datasets may include, but are not limited to, vehicle movement records, charging/discharging histories, electricity market prices, emissions measurements, traffic patterns, weather conditions, and user behavior data. The datasets can be collected from both internal system records and external data providers, ensuring sufficient volume and variety to support robust model training.

At step 2501, the system integrates real-time data sources to augment and update the historical datasets with current information. This real-time data integration ensures that models remain relevant to current conditions and can capture emerging patterns or regime shifts not represented in historical data. The integration process establishes reliable pipelines from operational data sources to the machine learning environment, implementing appropriate data transformation, normalization, and quality control procedures to maintain consistency between historical and real-time data.

At step 2502, the system performs comprehensive data preprocessing to prepare the raw data for model training. This preprocessing may comprise handling missing values through imputation or exclusion, detecting and addressing outliers through statistical methods or domain-specific rules, normalizing or standardizing numerical features to consistent scales, encoding categorical variables using appropriate techniques (one-hot encoding, target encoding, etc.), and applying domain-specific transformations based on subject matter expertise. The preprocessing steps can be implemented as reproducible pipelines that can be applied consistently to training, validation, and production data.

At step 2503, the system conducts feature engineering to transform raw data elements into meaningful features that enhance model performance. This engineering process creates derived features that capture domain-specific relationships, temporal patterns (e.g., time of day, day of week, seasonality, etc.), spatial relationships (e.g., proximity to key locations, geographical clustering), interaction effects between different variables, and aggregate statistics over various time windows and geographical areas. The feature engineering may incorporate domain knowledge from both transportation and electricity sectors to identify the most informative predictors for the target modeling objectives.

At step 2504, the system performs a structured train-validation-test split of the processed data to enable proper model development and evaluation. This split typically allocates 60-70% of the data to the training set used for model fitting, 15-20% to the validation set used for hyperparameter tuning and model selection, and 15-20% to the test set reserved for final performance evaluation. The splitting methodology may consider temporal dependencies to prevent data leakage, ensuring that models are evaluated on future data relative to their training period. For spatial models, the splitting may also incorporate geographical considerations to test generalization across different areas.

The model development phase begins at step 2505 wherein the system designs appropriate model architectures based on the specific problem characteristics and requirements. For time series forecasting problems like demand prediction or price forecasting, architectures may include recurrent neural networks (LSTMs, GRUs), transformer models with temporal attention mechanisms, or specialized time series models like Prophet or ARIMA with exogenous variables. For spatial prediction tasks, architectures may incorporate convolutional neural networks, graph neural networks for road network modeling, or geospatial regression techniques. For multi-objective optimization problems, the system may design genetic algorithm structures, reinforcement learning architectures, or mathematical programming formulations depending on problem characteristics.

At step 2506, the system configures initial hyperparameters for the selected model architectures based on domain knowledge, literature review, and prior experience with similar problem types. These hyperparameters include, but are not limited to, model-specific settings (number of layers, neurons per layer, activation functions), training parameters (learning rate, batch size, optimization algorithm), regularization settings (dropout rates, L1/L2 penalties), and problem-specific configurations (sequence length for time series, spatial resolution for geographic models). The initial configuration provides a starting point for subsequent optimization while incorporating known best practices for the problem domain.

At step 2507, the system conducts initial model training using the configured architectures and hyperparameters on the training dataset. The training process implements appropriate optimization algorithms (gradient descent variants, evolutionary algorithms, etc.) and learning schedules (learning rate decay, early stopping) based on the model type. For neural network models, this typically involves mini-batch training with backpropagation using frameworks like TensorFlow or PyTorch. For genetic algorithms, this involves evolution over multiple generations with fitness evaluation. The training process includes monitoring of convergence metrics, computational resource utilization, and intermediate validation performance to ensure proper learning progression.

The model evaluation and refinement phase begins at step 2508 wherein the system evaluates the trained models using various performance metrics that align with the specific problem objectives. For forecasting models, metrics may include, but are not limited to, mean absolute error (MAE), root mean squared error (RMSE), mean absolute percentage error (MAPE), and domain-specific measures like energy cost prediction accuracy. For classification tasks, metrics may include precision, recall, F1-score, and area under the ROC curve. For optimization models, metrics may include solution quality, computational efficiency, and constraint satisfaction rates. The evaluation considers not only overall performance but also performance across different segments, time periods, and operating conditions to identify specific strengths and weaknesses.

At step 2509, the system implements cross-validation procedures to assess model robustness and generalization capability across different data subsets. For time series models, this may involve rolling window validation or blocked cross-validation that respects temporal dependencies. For spatial models, this may involve geographically stratified cross-validation. The cross-validation results provide insights into model stability, sensitivity to data variations, and potential overfitting issues. The system aggregates cross-validation metrics to create a comprehensive view of model performance beyond single-split evaluation.

At step 2510, the system performs hyperparameter tuning to optimize model configuration based on validation performance. This tuning may employ various search strategies such as grid search, random search, Bayesian optimization, or evolutionary algorithms depending on the dimensionality of the hyperparameter space and available computational resources. The tuning process systematically explores the hyperparameter space to identify configurations that maximize validation performance metrics while maintaining computational efficiency and avoiding overfitting. Advanced implementations may leverage multi-objective optimization to balance competing performance objectives.

At 2511, the system makes a decision regarding whether the current model requires further refinement based on the evaluation results and performance targets. This decision considers whether the model meets predefined performance thresholds, how it compares to benchmark models or previous versions, and whether it demonstrates acceptable generalization across different data conditions. If refinement is needed, the process follows the "Yes" path, returning to the initial model training step (2507) with adjusted architectures or hyperparameters. If the model meets performance requirements, the process follows the "No" path to final model selection.

At step 2512, the system performs final model selection, choosing the best-performing model configuration from among all evaluated variants based on validation performance, robustness, computational efficiency, and alignment with operational requirements. The selected model undergoes final evaluation on the reserved test dataset to verify its performance on completely unseen data. The system generates documentation of the selected model's architecture, hyperparameters, training process, and performance characteristics to support deployment and future maintenance.

The process concludes with the model ready for deployment, where it can be integrated into the appropriate subsystem of autonomous fleet management system 1400 to support operational decision-making. The deployed models enable accurate forecasting of mobility demand, electricity prices, and environmental conditions; optimal scheduling of vehicles across mobility and electricity services; and continuous improvement of system performance through data-driven insights.

FIG. 1 is a block diagram illustrating an exemplary system architecture for an artificial intelligence-based pricing, mapping, and emissions control platform 120, according to an embodiment. According to the embodiment, platform 120 is configured as a cloud-based computing platform comprising various system or sub-system components configured to provide functionality directed to the execution of generating pricing and emissions context aware vehicle routing using artificial intelligence and machine learning techniques. Exemplary platform systems can include a user interface 125, a data processing subsystem 200, a machine learning and artificial intelligence (ML/AI) subsystem 300, an emission data acquisition system 200, a road pricing system 300, a vehicle tracking system 400, an AI-based routing system 500, and an output system 600. A user, AI agent, simulation/simulation result, or telematics may be used to request an optimized route based on multi-variate factors and constraints. According to an embodiment, platform 120 users can specify output targets such as, for example, user-specified output formats, downstream applications, and/or the like.

In some embodiments, subsystems 200-600, 125 may each be implemented as standalone software applications or as a services/microservices architecture which can be deployed (via platform 120) to perform a specific task or functionality. In such an arrangement, services can communicate with each other over an appropriate network using lightweight protocols such as HTTP, gRPC, or message queues. This allows for asynchronous and decoupled communication between services. Services may be scaled independently based on demand, which allows for better resource utilization and improved performance. Services may be deployed using containerization technologies such as Docker or containerd and orchestrated using container orchestration platforms like Kubernetes. This allows for easier deployment and management of services.

The emissions data acquisition system 200 provides a foundation for assessing the environmental impact of urban mobility and designing effective strategies for reducing emissions. Road transportation is a significant contributor to air pollution, particularly in urban areas, and is responsible for emitting various pollutants such as nitrogen oxides (NOx), particulate matter (PM), carbon monoxide (CO), and volatile organic compounds (VOCs). These pollutants have diverse and severe impacts on human health, including respiratory and cardiovascular diseases, cancer, and premature mortality, as well as on the environment, such as acid rain, eutrophication, and biodiversity loss. Monitoring and reducing transportation emissions is therefore vital for improving air quality, protecting public health, and mitigating climate change, and is a key objective of sustainable urban mobility policies and plans.

There are various technologies and methods for monitoring transportation emissions which may be implemented, individually or in combination, in different embodiments of platform 120, each with its own advantages and limitations in terms of coverage, resolution, accuracy, and cost. Satellite-based monitoring, such as using data from Sentinel-5P or Aura, provides a global and consistent view of the atmospheric composition, but has a relatively low spatial and temporal resolution and may be affected by weather conditions or surface properties. Ground-based monitoring, such as using data from air quality stations or sensor networks, provides a more local and detailed view of the emissions, but has a limited spatial coverage and may not capture the full variability and dynamics of the emissions. Mobile monitoring, such as using data from vehicle-based or drone-based sensors, provides a more flexible and responsive view of the emissions, but may have a higher cost and complexity and may require careful calibration and validation. Emissions modeling, such as using data from traffic models or emission factors, provides a more comprehensive and predictive view of the emissions, but may have a lower accuracy and reliability and may depend on various assumptions and uncertainties.

Integrating and fusing data from multiple emissions monitoring sources can help overcome their individual limitations and provide a more robust and reliable view of the emissions. Data integration involves combining data from different sources and formats into a common and consistent representation, using techniques such as data mapping, data cleaning, and data harmonization. Data fusion involves combining data from different sources and types into a more accurate and complete estimate, using techniques such as data assimilation, data interpolation, and data weighting. Data emissions acquisition system 200 may provide mechanisms and techniques for emissions data integration and fusion that benefit from advanced data science and machine learning techniques, such as deep learning, Bayesian networks, and ensemble methods, which can learn from the data and adapt to the changing conditions and uncertainties.

The emissions data acquired and processed by system 200 can enable various applications and services for sustainable urban mobility, such as: emissions-based pricing, such as dynamic road tolling or parking fees, which incentivize the use of cleaner vehicles or routes and discourage the use of polluting ones; emissions-based routing, such as eco-routing or green navigation, which recommend the most environmentally friendly routes or modes of transportation based on the real-time emissions data; emissions-based planning, such as identifying emission hotspots or evaluating the impact of transportation policies and projects on air quality and public health; and emissions-based monitoring, such as providing real-time information and alerts on the air quality levels and the associated health risks to the public and the authorities.

The emissions data acquisition and use raise various governance and ethical issues, such as data privacy, data security, data ownership, and data fairness, which need to be carefully addressed and regulated. For example, the emissions data may contain sensitive or personal information, such as the location and behavior of individuals or vehicles, which need to be protected and anonymized according to the relevant data protection laws and standards. Furthermore, the emissions data may also have biases or errors, such as under-representing certain areas or populations, which need to be identified and corrected to ensure the fairness and inclusiveness of the applications and services based on the data.

The road pricing system 300 plays a role in the AI-based system by providing the economic incentives for environmentally sustainable routing. By dynamically adjusting road prices based at least on real-time emissions data, it encourages drivers to avoid highly polluted areas and to spread out traffic more evenly across the road network. This approach has several benefits over traditional static pricing schemes, such as congestion charges or low-emission zones. First, it provides a more fine-grained and targeted incentive structure, as prices can vary continuously based on the actual emissions levels on each road segment. Second, it allows for more flexible and adaptive pricing, as prices can be adjusted in real-time based on changing traffic and emissions conditions. Third, it provides a more transparent and fair pricing system, as drivers are charged based on their actual contribution to emissions rather than a fixed fee.

However, implementing a dynamic road pricing scheme also presents several challenges. First, it requires a reliable and accurate source of real-time emissions data, which may be difficult to obtain in some areas. Second, it requires a sophisticated pricing algorithm that can balance multiple objectives, such as reducing emissions, managing congestion, and ensuring social equity. Third, it requires effective communication and enforcement mechanisms to ensure that drivers are aware of and compliant with the pricing scheme.

To address these challenges, the road pricing system can be designed with flexibility, scalability, and interoperability in mind. It may be able to integrate with various data sources and adapt to different pricing models and policies. It can also provide clear and timely information to drivers about the current prices and the potential benefits of taking alternative routes. Finally, it can work in concert with other systems, such as the AI-based routing system 500 and the user interface 125, to provide a seamless and integrated user experience.

According to an embodiment, pricing system 300 and or vehicle tracking system 400 can acquire and process real-time and historical data from a plurality of sensors and external data sources to generate a multi-dimensional representation of the transportation network state. The AI-based system can generate a multi-dimensional representation of the transportation network state by integrating various data sources and using advanced data processing and modeling techniques. This multi-dimensional representation can capture the complex dynamics and interactions within the transportation network, enabling the system to make informed decisions and optimize its performance. The system collects real-time and historical data from a wide range of sources, such as: traffic sensors (e.g., road-embedded sensors, cameras, and radar systems that measure traffic flow, speed, and density), GPS data (e.g., anonymized location data from vehicles and mobile devices that provide insights into travel patterns and route choices), weather data (e.g., meteorological data that affect traffic conditions, such as precipitation, temperature, and wind speed), emission data (e.g., sensors that measure air quality and pollutant concentrations, such as nitrogen oxides and particulate matter), event data (e.g., information about planned events, road closures, and construction activities that impact traffic), and user feedback (e.g., ratings, comments, and reports from users about their travel experiences and preferences).

The raw data collected from various sources is cleaned, filtered, and transformed to ensure consistency, accuracy, and reliability. This may involve techniques such as data normalization, outlier detection, and missing value imputation. The preprocessed data is analyzed to extract relevant features and patterns that characterize the transportation network state. This may include statistical measures (e.g., average speed, traffic volume), spatial-temporal patterns (e.g., congestion hotspots, peak hours), and derived indicators (e.g., road safety index, environmental impact score). The extracted features from different data sources are integrated and fused to create a comprehensive and coherent representation of the transportation network state. This may involve techniques such as data alignment, correlation analysis, and machine learning-based data fusion.

The fused data may be used to build a multi-dimensional model of the transportation network state, which captures the complex relationships and dependencies among different factors. This model can be represented using various techniques, such as graph-based models, tensor-based models, and deep learning models. The transportation network can be modeled as a graph, with nodes representing intersections or locations and edges representing road segments. Each node and edge can have multiple attributes, such as traffic volume, speed, emissions, and pricing. The transportation network state can be represented as a multi-dimensional tensor, where each dimension corresponds to a specific aspect, such as location, time, mode of transportation, and user type. This allows for efficient storage and processing of high-dimensional data. Additionally, or alternatively, advanced neural network architectures, such as convolutional neural networks (CNNs) and graph neural networks (GNNs), may be used to learn the complex patterns and dependencies within the transportation network state from large-scale data. The multi-dimensional representation of the transportation network state is continuously updated in real-time as new data becomes available. This allows the system to adapt to changing conditions and provide up-to-date insights and recommendations.

By generating a multi-dimensional representation of the transportation network state, the AI-based platform can capture the complex dynamics and interactions within the network, enabling it to make informed decisions and optimize its performance in terms of traffic management, emissions reduction, and user experience. This representation may serve as a foundation for various optimization algorithms and decision support tools within the platform.

Furthermore, platform 120 can generate one or more dynamic pricing models for segments of the transportation network based on the multi-dimensional network state representation and a set of pricing policies. Examples of pricing policies can include, but are not limited to, congestion pricing, time-of-day pricing, distance-based pricing, emissions-based pricing, dynamic demand-based pricing, user-specific pricing, and multi-modal pricing. These pricing policies can be used individually or in combination, depending on the specific goals and constraints of the transportation network. The AI-based platform can dynamically adjust and optimize these policies based on real-time data and user feedback to achieve the desired outcomes, such as reduced congestion, lower emissions, and improved user satisfaction.

Congestion pricing adjusts prices based on the level of congestion on a particular road segment or area. During peak hours or in heavily congested areas, the system may increase prices to discourage traffic and reduce congestion. Conversely, prices may be lowered during off-peak hours or in less congested areas to incentivize use. Time-of-day pricing sets different prices depending on the time of day. For example, prices may be higher during rush hours (e.g., 7-9 AM and 4-6 PM) and lower during off-peak hours. This encourages users to plan their trips during less busy times, helping to distribute traffic more evenly throughout the day. Distance-based pricing, under this policy, prices are determined based on the distance traveled by the user. Longer trips would incur higher costs, while shorter trips would be less expensive. This policy encourages users to optimize their route choices and reduce unnecessary travel. Emissions-based pricing takes into account the environmental impact of transportation. Vehicles with higher emissions (e.g., older or less efficient vehicles) would be charged higher prices, while cleaner vehicles (e.g., electric or hybrid cars) would enjoy lower prices. This encourages the adoption of more environmentally friendly transportation options. Dynamic demand-based pricing adjusts prices in real-time based on the current demand for transportation services. When demand is high, prices increase to balance the supply and demand, and when demand is low, prices decrease to attract more users. This helps to optimize the utilization of the transportation network. User-specific pricing offers personalized prices based on individual user preferences, behavior, and history. For example, frequent users or those who consistently choose eco-friendly routes may receive discounts or rewards. This policy encourages user loyalty and promotes sustainable transportation habits. Multi-modal pricing integrates pricing across different modes of transportation, such as public transit, ride-sharing, and bike-sharing. Users are encouraged to choose the most efficient and sustainable combination of modes for their trip, with prices adjusted accordingly. This helps to optimize the use of the entire transportation network.

In one embodiment, the transportation network is an inner-city road network, and the optimization objectives include minimizing travel time, emissions, and cost for users and the system operator. In some implementations, the dynamic pricing model is based on a combination of historical data, real-time data, and future predictions, and takes into account factors such as demand, supply, elasticity, and competition.

The vehicle tracking system 400 enables the AI-based platform 120 to generate highly personalized and environmentally optimized routes for individual vehicles. By tracking the real-time position, speed, and emissions of each vehicle, the system can dynamically adjust the route recommendations based on the current traffic and emissions conditions. This approach has several advantages over traditional navigation systems that rely on static, aggregate traffic data. First, it allows for more accurate and up-to-date estimation of travel times and emissions, as it takes into account the specific characteristics and behavior of each vehicle. Second, it enables proactive rerouting and congestion management, as the system can anticipate and mitigate potential bottlenecks before they occur. Third, it provides a more engaging and interactive user experience, as drivers can receive real-time updates and alerts about their route and emissions performance. According to an aspect, the multi-dimensional network state representation includes data layers provided by tracking system 400 for traffic flow, congestion, emissions, weather, events, and road conditions The implementation of a comprehensive vehicle tracking system may require a large-scale deployment of sensors and communication infrastructure to cover the entire road network and the massive amount of data generated needs to be efficiently processed, stored, and analyzed in real-time. To address these challenges, vehicle tracking system 400 can be designed with scalability, reliability, and security in mind. It can leverage cloud computing and big data technologies to handle the large volume and velocity of the vehicle data. It may also implement strict data governance and access control policies to protect user privacy and prevent unauthorized use of the data.

Furthermore, vehicle tracking system 400 may be seamlessly integrated with the other components of the AI-based platform, such as the emissions data acquisition, road pricing, and routing systems. This necessitates a modular and interoperable architecture that allows for easy data exchange and workflow coordination between the different modules.

The AI-based routing system 500 represents a significant advancement over traditional routing systems, which typically optimize for a single objective (e.g., shortest distance or time) and rely on static, historical data. By incorporating real-time data on emissions, pricing, and traffic, and using advanced optimization and machine learning techniques, the system can generate routes that are more environmentally sustainable, cost-effective, and adaptive to the dynamic conditions of the urban mobility system.

However, developing and deploying such a module also presents several challenges and considerations. First, it requires a robust and scalable data infrastructure to handle the large volume, variety, and velocity of the real-time data from the different sources. Second, it needs to balance the multiple, often conflicting objectives and preferences of the users, such as minimizing time, cost, and emissions, while ensuring safety, comfort, and reliability. Third, it must be able to handle the uncertainty and variability of the traffic and emissions conditions, and provide robust and flexible solutions that can adapt to the changing circumstances.

According to an embodiment, the AI-based routing system 500 may be designed with the users' needs and behaviors in mind, and provide an intuitive and engaging interface that allows them to express their preferences and constraints, and receive personalized and actionable recommendations. It may also be transparent and explainable, so that the users can understand and trust the rationale behind the route suggestions, and provide feedback and corrections when needed.

Finally, AI-based routing system 500 may be evaluated and validated rigorously, using both simulation and real-world experiments, to assess its effectiveness, efficiency, and robustness, and to identify and address any limitations or unintended consequences. This requires close collaboration and communication with the various stakeholders, such as the users, the operators, the regulators, and the public, to ensure the system's alignment with the broader goals and values of the urban mobility system.

The output system 600 provides an interface to platform users, and offers a seamless and enjoyable user experience that meets or exceeds the users' expectations, while also educating and empowering them to make informed and sustainable mobility choices.

Output system 600 can handle the diversity and dynamicity of the user preferences, contexts, and constraints, and provide personalized and adaptive recommendations that cater to their individual needs and goals. It may also be able to explain and justify the recommendations, and allow the users to provide feedback or override the system when needed.

Additionally, output system 600 can be configured to ensure the privacy, security, and transparency of the user data and interactions, and comply with relevant regulations and standards. It may provide clear and concise information about the data collection, usage, and sharing practices, and obtain the user's informed consent when necessary.

Closely related to output system 600 are various user interfaces 125 that are provided by platform 120. While they are closely related and interconnected, they can be considered as separate components with distinct roles and characteristics. The output system 600 is a broader concept that encompasses the various components and functionalities responsible for delivering the optimized routes and navigation guidance to the users. It includes not only the user interfaces but also the backend systems and algorithms that process the data and generate the outputs, such as the map rendering engine, the turn-by-turn navigation system, and the personalization and customization algorithms. The output system focuses on the technical aspects of delivering the information to the users, such as the data formats, communication protocols, and performance optimization. It aims to provide a seamless and efficient flow of information from the AI-based routing system to the users, regardless of the specific user interface or device they are using.

The user interfaces 125 are the specific components of the output system that enable the interaction between the users and the AI-based routing system. They can provide the visual, auditory, or haptic means for the users to input their preferences and constraints, view the recommended routes and navigation guidance, and provide feedback or report issues. The user interfaces can take various forms and designs, depending on the platform, device, embodiment, and context of use, such as: mobile app interfaces for smartphones or tablets, with touch-based interactions and location-based services; web-based interfaces for desktop or laptop computers, with mouse and keyboard interactions and more detailed information displays; in-vehicle interfaces for cars or trucks, with voice-based interactions and heads-up displays integrated with the vehicle's sensors and systems; and wearable interfaces for smartwatches or smart glasses, with gesture-based interactions and augmented reality features. For instance, the user interfaces 125 focus on the usability, accessibility, and user experience aspects of delivering the information to the users, such as the layout, typography, color scheme, and interaction design. They are designed to provide an intuitive, engaging, and satisfying experience for the users, that meets their needs, preferences, and expectations, and encourages them to use and trust the AI-based routing system.

In an embodiment, platform 120 can provide an interface 125 wherein end-users can input journey parameters or details to prompt the routing system to generate an optimized pathway/route/journey for vehicular transportation. The user can select journey details such as a start location, an end location, an optimization schedule, penalty (e.g., pathway that fines the user the least), fuel (e.g., pathway that uses the least fuel or electricity for battery usage), a time constraint (e.g., start/end time, maximum or minimum time to complete the journey), and cost (e.g., pathway that costs the least to user based on a combination of penalty, time, and fuel usage).

The output system 600 is a higher-level concept that includes the user interfaces as one of its key components, along with the backend systems and algorithms that support them. The user interfaces 125 are the specific touchpoints or channels through which the users interact with the output system and the AI-based routing system as a whole.

As shown, a plurality of exemplary data sources 110*a-h* and various third-party services may be integrated with platform 120 to enable its functionalities and optimize its performance. These data sources and services can be accessed through various application programming interfaces (APIs), data streams, and/or data marketplaces, and integrated into the AI-based platform 120 using data pipelines, data fusion techniques, and interoperability standards. The platform may also ensure the data quality, privacy, security, and compliance with the relevant regulations and licenses. The combination and integration of these diverse data sources and services enable the AI-based platform to provide a comprehensive, dynamic, and personalized view of the urban mobility system, and optimize its performance in terms of emissions, pricing, and routing.

A plurality of satellite instruments 110*a* can provide satellite data to platform 120. Atmospheric composition data, particularly nitrogen dioxide (NO2) concentrations, from Earth observation satellites such as NASA's Aura, ESA's Sentinel-5P, or JAXA's GOSAT can be sources of input data. Additionally, land use and/or land cover data from satellites like Landsat, MODIS, or Sentinel-2, can be implemented to help characterize the urban environment and its impact on emissions and mobility. Furthermore, ground-based sensor data from air quality monitoring stations measuring pollutants such as NO2, fine particulate matter (PM2.5), CO, and ozone (O3) can be collected by platform 120. Mobile sensor data from vehicles or portable devices equipped with air quality sensors, providing a more granular and dynamic view of the air pollution levels may also be leveraged to provide air quality data.

Weather data 110*b* may be received, retrieved, or otherwise obtained by platform 120. This may include, but is not limited to, meteorological data, such as temperature, humidity, wind speed and direction, and precipitation, from weather stations, radars, or satellites. Weather forecast data from numerical weather prediction models or machine learning-based models can be obtained, to anticipate the impact of weather on traffic, emissions, and air quality.

Social media platform 110*c* servers can be interfaced with to collect social media data to gather real-time event and sentiment data from user posts and images, which may be related to traffic conditions, weather conditions, and other relevant information. Crowdsourced data 110*d* can comprise data aggregated from a plurality of navigation applications (apps) operating on many user devices (e.g., smart phones, tablets, vehicle apps, etc.) to provide, among other things, real-time traffic data. Crowdsourced data can further comprise and/or be sourced from connected vehicles, smartphone sensors, and social media.

Traffic data 110*e* may comprise traffic flow, speed, and density data from road sensors, such as inductive loops, radar, or cameras, providing real-time information on the traffic conditions. Additionally, floating car data from GPS-equipped vehicles or mobile devices, can provide a more detailed and dynamic view of the traffic patterns and travel times. Traffic data may further include historical traffic data from transportation agencies or data providers, to help model and predict the typical traffic behavior and trends.

Vehicle data 110*f* may comprise vehicle characteristics data, such as make, model, year, fuel type, and emission standards, from vehicle registration databases or auto manufacturers. Vehicle emissions data from remote sensing devices or on-board diagnostics (OBD) systems, can provide a more accurate and specific view of the vehicle emissions. Furthermore, connected vehicle data from telematics systems or vehicle-to-everything (V2X) communication can be obtained, providing real-time information on the vehicle's location, speed, and performance.

User data 110*g* may include, but is not limited to: user profile data, such as demographics, preferences, and constraints, from the user's input or social media profiles; user feedback data, such as ratings, comments, or reports, on the recommended routes or the overall system performance; and user activity data, such as search queries, route selections, or navigation behavior, to personalize and improve the user experience.

Road network data 110*h* can include geographic information system (GIS) data on the road network topology, geometry, and attributes, from transportation agencies or mapping providers. Road infrastructure data, such as traffic signs, signals, and markings, may also be obtained from road asset management systems or computer vision algorithms. Additionally, point of interest (POI) data, such as fuel stations, parking lots, or charging stations, from location-based services or crowdsourcing platforms can be collected by platform 120.

Various third-party services may be integrated into platform 120 to collect input data and provide interoperability between the platform and the services. For instance, mapping and navigation services, such as Google Maps, HERE, or OpenStreetMap, can provide base maps, geocoding, and routing functionalities, while traffic information services, such as Waze, INRIX, or TomTom, may provide real-time traffic updates and incident reports. Parking and charging services, such as Park Whiz, SpotHero, or PlugShare, can provide information and reservation of parking spots or charging stations. Transit and mobility services, such as Uber, Lyft, or Lime, may provide multimodal transportation options and integrations.

According to some embodiments, platform 120 may further comprise a secure and privacy-preserving data management layer that ensures compliance with data protection regulations and user consent. According to some embodiments, platform 120 may further comprise a performance monitoring and evaluation system that continuously measures and reports on the system's effectiveness in achieving its optimization objectives and user satisfaction. According to some aspects, the system architecture of platform 120 is designed to be modular, scalable, and fault-tolerant, and supports plug-and-play integration of new data sources, models, and algorithms. According to some aspects, platform 120 is configured to manage and orchestrate the data flows and interactions between the system components using a centralized or decentralized architecture.

Figure 2:
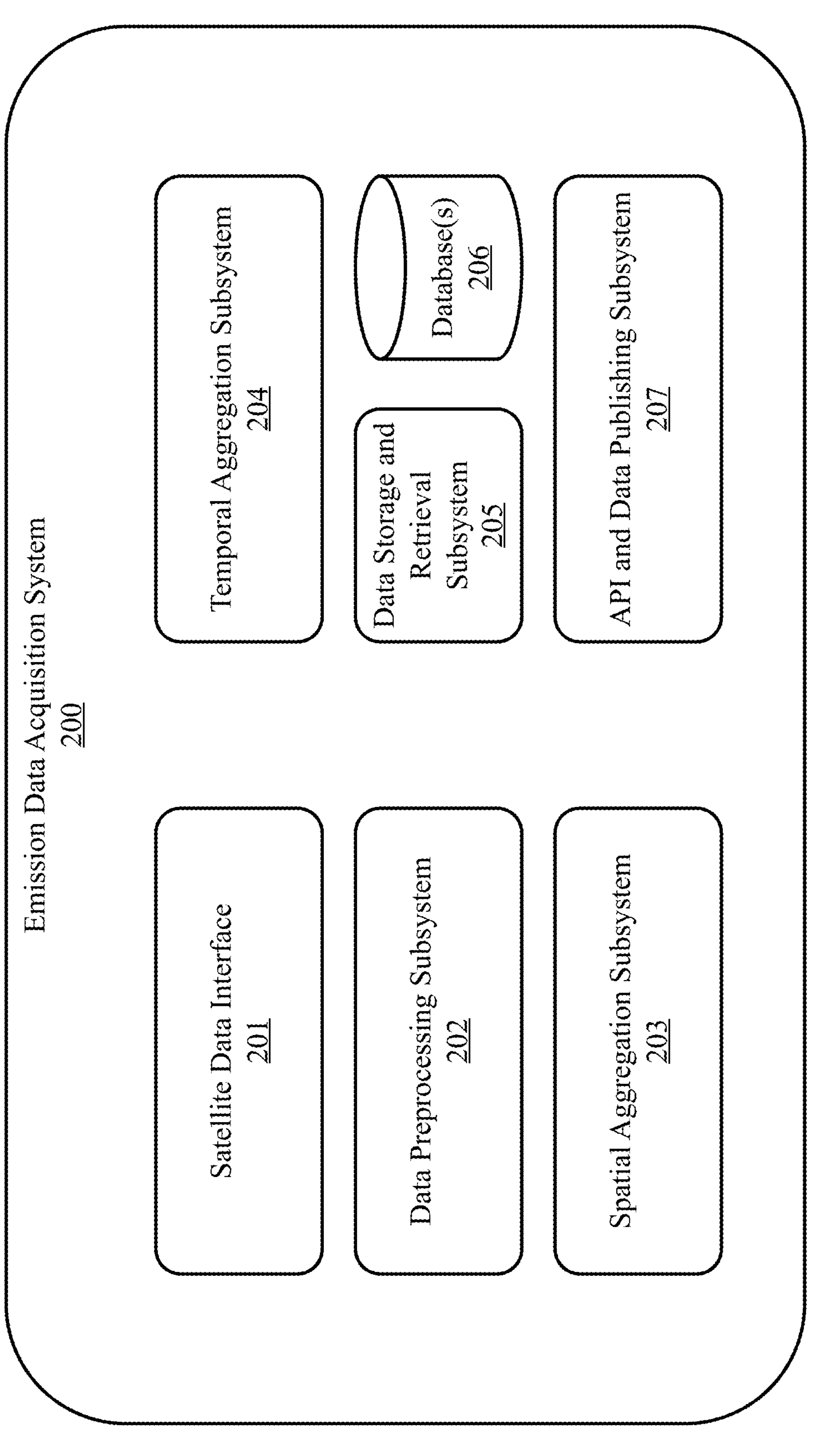
FIG. 2 is a block diagram illustrating an exemplary aspect of the AI-based platform for emissions control, an emission data acquisition system.

FIG. 2 is a block diagram illustrating an exemplary aspect of the AI-based platform for emissions control, an emission data acquisition system 200. According to the aspect, emission data acquisition system 200 is configured to provide the real-time NO2 concentration data that forms the basis for the dynamic road pricing and route optimization. According to the embodiment, the system 200 comprises a satellite data interface 201, a data preprocessing subsystem 202, a spatial aggregation subsystem 203, a temporal aggregation subsystem 204, a data storage and retrieval subsystem 205 that utilizes one or more databases 206 or other data storage systems, and an API and data publishing subsystem 207.

According to the aspect, the satellite data interface 201 is responsible for receiving raw data from the satellite instruments that measure NO2 concentrations. It can support the various, specific data formats and protocols used by the relevant satellite systems, such as, for example, NASA's Aura and ESA's Sentinel-5P. The system may rely on data from satellite instruments designed to measure atmospheric NO2, such as Ozone Monitoring Instrument (OMI) on NASA's Aura satellite or TROPOspheric Monitoring Instrument (TROPOMI) on ESA's Sentinel-5P satellite. Different satellite instruments have different characteristics, such as spatial resolution, temporal coverage, and data quality. The emissions data acquisition system 200 can be designed with the specific capabilities and limitations of the chosen satellite instruments in mind. For example, NASA's OMI instrument has a spatial resolution of 13×24 km at nadir, while ESA's TROPOMI instrument has a resolution of 3.5×7 km. The system can be configured to handle and optimize for these differences. These instruments use spectroscopic techniques to measure NO2 concentrations in the atmosphere. Satellite instruments continuously measure atmospheric NO2 concentrations and transmit this data to ground stations. Accordingly, the satellite data interface 201 may be configured for establishing a connection with these ground stations or data providers to receive the raw NO2 data. According to some implementations, the interface may be designed to handle potential issues like data transmission errors, latency, and intermittent connectivity. It can also be configured with the ability to authenticate and authorize itself to access the satellite data securely.

Satellite data can come in various file formats, each with its own structure and metadata conventions. The emissions data acquisition system is configured to parse and interpret these formats correctly to extract the relevant NO2 information. Common formats for satellite data include HDF5, NetCDF4, and GeoTIFF. The system may use, for example, standard libraries or tools to read and write these formats, such as the Python packages h5py, netCDF4, and GDAL.

According to the aspect, the data preprocessing subsystem 202 performs initial processing and quality control on the raw satellite data. Raw satellite data may contain noise, errors, or gaps due to factors like instrument limitations, atmospheric conditions, or data transmission issues. The subsystem 202 may apply calibration factors, filter out invalid or low-quality measurements, and convert the data into a standardized format for further processing. The raw satellite data may be in various formats, such as HDF (Hierarchical Data Format) or NetCDF (Network Common Data Form). The subsystem 202 is configured to handle these formats and convert them into a standardized internal format for processing. The preprocessing unit may apply algorithms for calibration, filtering, and quality control of the raw data. These may include techniques such as, for example, dark current subtraction, geometric correction (correcting for distortions due to satellite viewing angle) radiometric calibration (converting raw sensor counts to physical units), and cloud masking (removing measurements contaminated by clouds). Preprocessing techniques may further include removing outliers, correcting for instrumental biases, and interpolating missing data points. The choice of algorithms may depend on the specific characteristics of the satellite instrument and the data quality requirements of the application. The subsystem may also maintain metadata about the preprocessing steps applied to each dataset for traceability and quality assurance purposes. The data preprocessing subsystem ensures that the data is cleaned, calibrated, and standardized before further processing.

As the satellite measurements may have a higher spatial resolution than required for the AI-based dynamic pricing, mapping, and emissions control platform 120, the spatial aggregation subsystem 203 aggregates the data to a specified grid size (e.g., 1 km×1 km). Satellite instruments typically measure NO2 concentrations at a high spatial resolution, such as a few kilometers or even less. Spatial aggregation methods are used to estimate NO2 concentrations at a coarser spatial resolution than the original satellite measurements. However, for the purposes of road pricing and routing, a coarser resolution (e.g., 1 km×1 km) may be sufficient. The spatial aggregation subsystem 203 is responsible for aggregating the high-resolution data to the desired grid size. It may use techniques like interpolation or averaging to estimate NO2 concentrations for grid cells with missing or partial data. Simple methods like nearest-neighbor interpolation are fast but may not capture spatial variations well. More advanced methods like kriging or Gaussian process regression can provide better estimates but are computationally more expensive. According to an embodiment, spatial aggregation subsystem 203 may use methods like nearest-neighbor interpolation, bilinear interpolation, or kriging to estimate NO2 concentrations for grid cells with missing or partial data. For example, the choice of aggregation method (e.g., interpolation, averaging) should balance computational efficiency with accuracy. The subsystem 203 may be configured to also handle edge cases, such as grid cells that partially overlap with water bodies or other irrelevant areas.

According to the aspect, the temporal aggregation subsystem 204 aggregates the spatially processed data over a specified time interval (e.g., hourly or daily averages). It maintains a rolling window of recent data to provide the most up-to-date emissions information to the other system components. NO2 concentrations can vary significantly over time, depending on factors such as traffic patterns, weather conditions, and industrial activities. Temporal aggregation subsystem 204 aggregates the spatially processed data over a specified time interval to provide a more stable and representative estimate of NO2 levels. The choice of time interval (e.g., hourly, daily) should balance the need for real-time updates with the potential for short-term fluctuations. The subsystem 204 may also maintain a history of past NO2 levels to enable trend analysis and predictive modeling. Historical NO2 data can be stored in database 206.

According to the aspect, data storage and retrieval subsystem 205 ensures that the processed and aggregated NO2 data is stored in a database 206 or data warehouse for efficient retrieval by other systems/subsystems. This component may also handle data compression, indexing, and backup to ensure data integrity and availability. Data storage and retrieval subsystem 205 may use various databases including, but not limited to, relational databases (e.g., PostgreSQL), NoSQL databases (e.g., MongoDB), or big data platforms (e.g., Hadoop, Spark) depending on the volume, variety, and velocity of the data. The processed and aggregated NO2 data needs to be stored in a way that enables efficient retrieval by other system/subsystem of the AI-based dynamic pricing, mapping, and emissions control platform 120, as well as potential external clients. The subsystem 205 is responsible for designing and managing the database infrastructure for this purpose. For example, the database(s) should be optimized for spatial and temporal queries, such as retrieving NO2 levels for a specific location and time range. It should also ensure data integrity, security, and backup to prevent data loss or unauthorized access.

According to the aspect, the API and data publishing subsystem 207 may be configured to expose the processed NO2 data to other subsystems and external systems via a well-defined API. It may support various data formats (e.g., JSON, CSV, XML) and protocols (e.g., REST, MQTT) to facilitate integration with different clients. API and data publishing subsystem 207 may adhere to standard API specifications like OpenAPI or GraphQL, and use secure communication protocols like HTTPS and authentication and authorization protocols like OAuth2 or JSON Web Token (JWT) to ensure data security and privacy. API standards provide a consistent and interoperable way for different systems to communicate and exchange data. The API can support common data formats and protocols to maximize interoperability.

Figure 3:
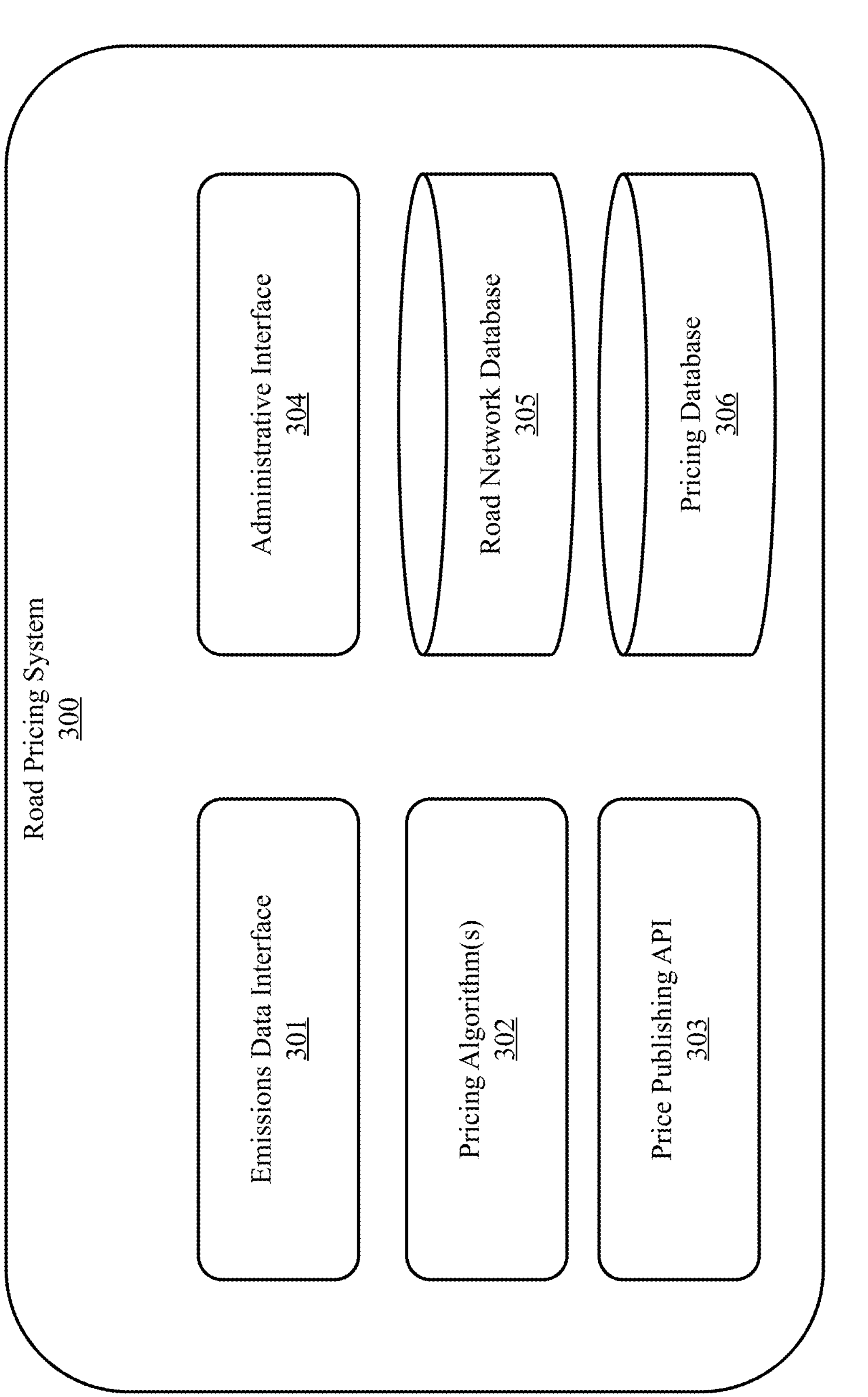
FIG. 3 is a block diagram illustrating an exemplary aspect of the AI-based platform for emissions control, a road pricing system.

FIG. 3 is a block diagram illustrating an exemplary aspect of the AI-based platform for emissions control, a road pricing system 300. According to the aspect, road pricing system 300 is configured to translate the real-time NO2 emission data into dynamic, location-specific prices that can incentivize environmentally friendly routing decisions. According to the embodiment, the system 300 comprises an emissions data interface 301, a road network database 305, one or more pricing algorithms 302, a pricing database 306, a price publishing API 303, and an administration interface 304.

According to the aspect, the emissions data interface 301 is configured to retrieve the latest NO2 emission data from the emission data acquisition system 200. It may periodically poll the emissions API or subscribe to real-time updates using a publish-subscribe pattern. For example, this may comprise making HTTP requests to the emissions API, parsing the response data in JSON or XML format, and handling any errors or exceptions.

According to the aspect, a road network database 305 is present and configured to store information about a road network in a target area, including road segments, lengths, capacities, and speed limits. It may also include historical traffic data and road closure schedules. According to an embodiment, the road network database may model the road network as a graph, with road segments as edges and intersections as nodes. Each edge can have attributes like length, capacity, speed limit, and emissions level. The database may support efficient spatial queries, such as finding all road segments within a given bounding box.

According to the aspect, one or more pricing algorithms 302 may be utilized to apply the dynamic pricing logic to each road segment based on its NO2 emissions level and other relevant factors. It may use, for example, a rule-based approach, a machine learning model, or a combination of both. The pricing algorithm(s) may take into account various factors, such as the NO2 emissions level, the road type and capacity, the time of day, and the historical traffic patterns. It may use techniques like congestion pricing, where the price increases with the level of congestion, or emissions-based pricing, where the price is directly proportional to the NO2 level. The algorithm(s) can be designed to incentivize drivers to take less polluted routes and to spread out traffic to reduce congestion.

According to the aspect, a pricing database 306 is present and configured to store the dynamic prices for each road segment, along with historical pricing data for analytics and auditing purposes. It may be optimized for fast read access by AI-based routing system 500 and other systems/subsystems. According to an embodiment, the pricing database 306 can store the current and historical prices for each road segment, along with metadata such as the timestamp and the pricing algorithm version. It may use a schema that optimizes for fast read access, such as denormalized tables or materialized views. The database may also utilize mechanisms for data backup, recovery, and archiving.

According to the aspect, the price publishing API 303 is configured to expose the current road prices to other systems/subsystems, such as user interface 125 and AI-based routing system 500. It may notify subscribed clients of price updates in real-time. For example, the price publishing API may use a real-time messaging protocol, such as WebSocket or MQTT, to notify subscribed clients of price updates as soon as they are available. This allows the user interface and the routing engine to always display and use the most up-to-date prices.

According to the aspect, the administration interface 304 provides a user interface for system administrators to monitor and manage the road pricing system. It may include features like configuring pricing rules, setting emissions thresholds, and generating pricing reports. The administration interface can have a user-friendly design that allows system administrators to easily monitor and manage the road pricing system. It may use responsive web design principles to ensure accessibility on different devices and screen sizes. The interface may also have appropriate security measures, such as user authentication and authorization, to prevent unauthorized access or manipulation of the pricing data.

Figure 4:
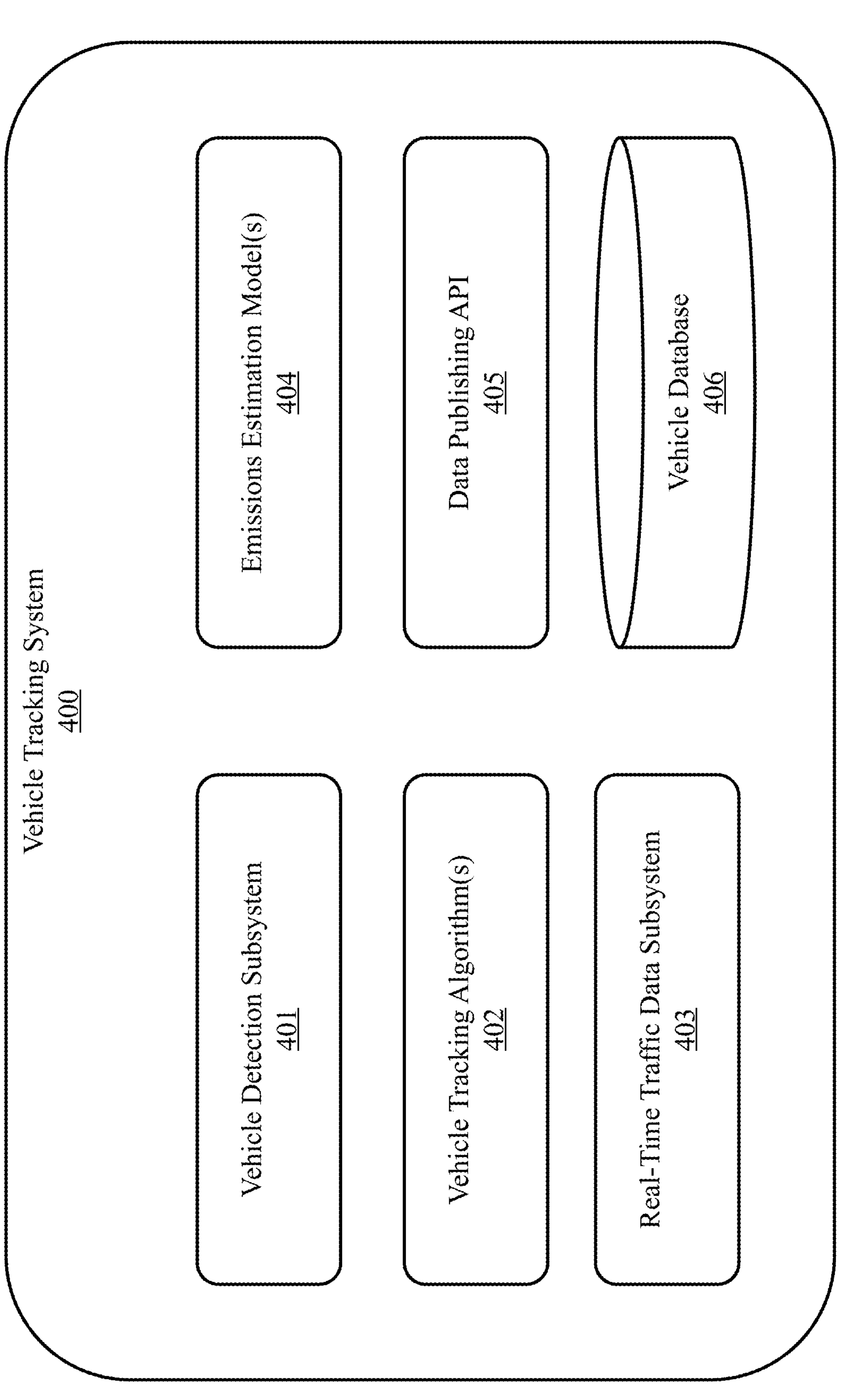
FIG. 4 is a block diagram illustrating an exemplary aspect of the AI-based platform for emissions control, a vehicle tracking system.

FIG. 4 is a block diagram illustrating an exemplary aspect of the AI-based platform for emissions control, a vehicle tracking system 400. According to the aspect, vehicle tracking system 400 is configured to provide real-time information about the location, speed, and emissions profile of individual vehicles in the network. This information is used by AI-based routing system 500 to generate personalized, environmentally optimized routes for each vehicle. According to the embodiment, the system 400 comprises a vehicle detection subsystem 401, one or more vehicle tracking algorithms 402, a real-time traffic data subsystem 403, one or more emissions estimation models 404, a data publishing API 405, and a vehicle database 406.

According to the aspect, the vehicle detection subsystem 401 can be configured to use various technologies to perform vehicle detection such as automatic number plate recognition (ANPR) cameras, radio-frequency identification (RFID) readers, and/or Global Positioning System (GPS) trackers to detect and identify vehicles entering and exiting the road network. It may be deployed at strategic locations such as intersections, on-ramps, or toll booths. ANPR cameras capture images of vehicle license plates and use optical character recognition (OCR) algorithms to extract the plate number. The accuracy of ANPR can be affected by factors such as lighting conditions, camera angles, and plate designs. Vehicle tracking system 401 may utilize high-quality cameras and advanced OCR algorithms to ensure reliable plate recognition. For instance, machine learning can be used to perform image recognition (e.g., picture to text) and then using the textual value to ping/query a vehicle inquiry system.

According to the aspect, a vehicle database 406 stores information about each vehicle, including, but not limited to, its license plate number, make and model, fuel type, emissions rating, and owner details. It may be integrated with external databases such as the registration records from the Department of Motor Vehicles or other similar governmental or regulatory entities which may exist in a given country/locality.

According to the aspect, vehicle tracking system 400 may implement one or more vehicle tracking algorithms 402 which process the raw data from the vehicle detection subsystem to track the movement of each vehicle through the road network. It may use techniques such as map matching, Kalman filtering, or particle filtering to estimate the vehicle's location, speed, and trajectory. Map matching is the process of aligning the raw vehicle location data (e.g., GPS coordinates) with the digital road network map. It involves finding the most likely path that the vehicle has traveled based on the sequence of location points. The vehicle tracking system can use efficient map matching algorithms that can handle noisy and sparse location data, such as, for example, the Hidden Markov Model or the ST-Matching algorithm. Kalman filtering is a technique for estimating the state of a dynamic system (e.g., a vehicle's position and speed) based on noisy sensor measurements. It works by recursively updating the state estimate based on the observed data and the system model. In an embodiment, vehicle tracking system 400 can use Kalman filters to smooth out the raw vehicle trajectories and to predict the vehicle's future position for real-time tracking.

According to the aspect, the real-time traffic data subsystem 403 can be configured to aggregate the individual vehicle trajectories to generate real-time traffic data for each road segment, such as traffic volume, average speed, and congestion level. It may also integrate with external traffic data sources such as loop detectors, traffic cameras, social media platforms, or crowdsourced data from navigation apps (e.g., Google Maps, Waze, Apple Maps, etc.). Inductive loop detectors are the most common type of traffic sensors, which are embedded in the pavement of roadways. They work by detecting changes in the magnetic field caused by the metal in passing vehicles. The data from multiple loop detectors can be used to estimate traffic volume, speed, and occupancy for each lane. Magnetic loop detectors are similar to inductive loops but use a different technology to detect vehicles. They measure the change in the Earth's magnetic field caused by the presence of a vehicle, which allows them to detect stationary vehicles as well as moving ones. Microloop detectors are a newer type of loop detector that uses wireless technology to transmit the traffic data to a roadside unit. They are easier to install and maintain than traditional loops, as they don't require direct connection to the traffic controller cabinet. Closed-circuit television (CCTV) cameras are widely used for traffic monitoring and incident detection. They provide real-time video footage of the roadway, which can be analyzed by human operators or computer vision algorithms to detect traffic patterns, incidents, or congestion. Video analytics cameras are advanced traffic cameras that have built-in video analytics capabilities, such as vehicle tracking, speed estimation, or license plate recognition. They can provide more detailed and automated traffic data than traditional CCTV cameras. Thermal cameras use infrared technology to detect the heat signatures of vehicles, even in low-light or nighttime conditions. They can provide accurate counts of vehicles and pedestrians, as well as detect unusual events such as wrong-way driving or stopped vehicles. Additionally, many modern vehicles are equipped with sensors and communication devices that can transmit real-time data about their location, speed, and driving behavior to the cloud. This data can be aggregated and anonymized to provide a comprehensive view of traffic conditions across the road network. In addition to GPS data, smartphones have a variety of sensors, such as accelerometers, gyroscopes, and barometers, that can provide information about the user's movement and environment. This data can be used to detect driving events, such as hard braking or sharp turns, and to infer traffic conditions based on the collective behavior of many users. Social media platforms, such as Twitter or Instagram, can be a valuable source of real-time traffic information, especially for incidents or events that are not captured by traditional sensors. In an embodiment, vehicle tracking system 400 may connect with social media servers and use natural language processing and machine learning techniques to extract relevant traffic data from social media posts and images.

According to the aspect, one or more emissions estimation models 404 may be used to estimate the real-time emissions of each vehicle based on its speed, acceleration, and emissions rating. It may use models such as the Motor Vehicle Emission Simulator (MOVES) or the Computer Program to Calculate Emissions from Road Transport (COPERT) model. The MOVES model is a comprehensive emissions modeling system developed by the US Environmental Protection Agency (EPA). It estimates vehicle emissions based on various input parameters, such as vehicle type, age, speed, and road grade. The vehicle tracking system can use the MOVES model to estimate the real-time emissions of each vehicle based on its speed and acceleration profile.

Similarly, the COPERT model is a widely used tool for estimating emissions from road transport in Europe. It was developed by the European Environment Agency (EEA) in cooperation with the European Commission's Joint Research Centre (JRC) and is used by many European countries for official reporting of road transport emissions. COPERT uses a methodology based on the EMEP/EEA air pollutant emission inventory guidebook, which provides guidance on estimating emissions from various sources, including road transport. The model calculates emissions of a wide range of pollutants, including greenhouse gases ($CO_2$, $CH_4$, $N_2O$), air pollutants (CO, $NO_x$, VOC, PM), and toxic substances (PAHs, POPs, heavy metals). The model requires detailed input data on the vehicle fleet (e.g., vehicle numbers, types, ages, and emission standards), traffic activity (e.g., annual mileage, average speed, road types), and fuel consumption (e.g., fuel types, quantities, properties). This data is typically obtained from national statistics, vehicle registration databases, and traffic surveys. COPERT uses a comprehensive database of emission factors, which specify the amount of pollutants emitted per unit of activity (e.g., grams per kilometer) for different vehicle categories and emission standards. The emission factors are based on extensive laboratory and real-world measurements and are regularly updated to reflect the latest technologies and regulations. COPERT takes into account the effects of various emission control technologies, such as catalytic converters, particulate filters, and exhaust gas recirculation (EGR), on the emission performance of vehicles. The model applies different emission factors for vehicles with and without these technologies, based on their emission standards and deterioration over time. The model also considers the effects of fuel properties, such as sulfur content, aromatic content, and biodiesel blend, on the emissions of certain pollutants. For example, higher sulfur content in diesel fuel can lead to higher particulate matter emissions, while higher biodiesel blends can reduce $CO_2$ emissions but increase $NO_x$ emissions.

The COPERT model is continuously updated and improved to reflect the latest scientific knowledge and policy developments in the field of road transport emissions. The current version, COPERT 5, includes new features such as the ability to model emissions from plug-in hybrid and electric vehicles, as well as emissions from non-exhaust sources such as tire and brake wear. In the context of the AI-based dynamic pricing, mapping, and emissions control platform 120, the COPERT model can be a valuable tool for estimating the real-time emissions of individual vehicles based on their speed, acceleration, and other parameters. The model's emission factors and algorithms can be integrated into the vehicle tracking system to provide accurate and consistent emissions data for route optimization and environmental assessment.

According to the aspect, a data publishing API 405 is present and configured to expose the real-time vehicle and traffic data to other systems/subsystems, such as the routing engine and the user interface. It may use protocols such as WebSocket, MQTT, or REST API to stream the data in real-time. For instance, WebSocket is a communication protocol that enables real-time, bidirectional data transfer between a client and a server over a single TCP connection. It is well-suited for streaming high-frequency data such as vehicle positions and traffic updates. The vehicle tracking system can use WebSocket to publish the real-time data to the other systems and to handle client subscriptions and authentication.

Figure 5:
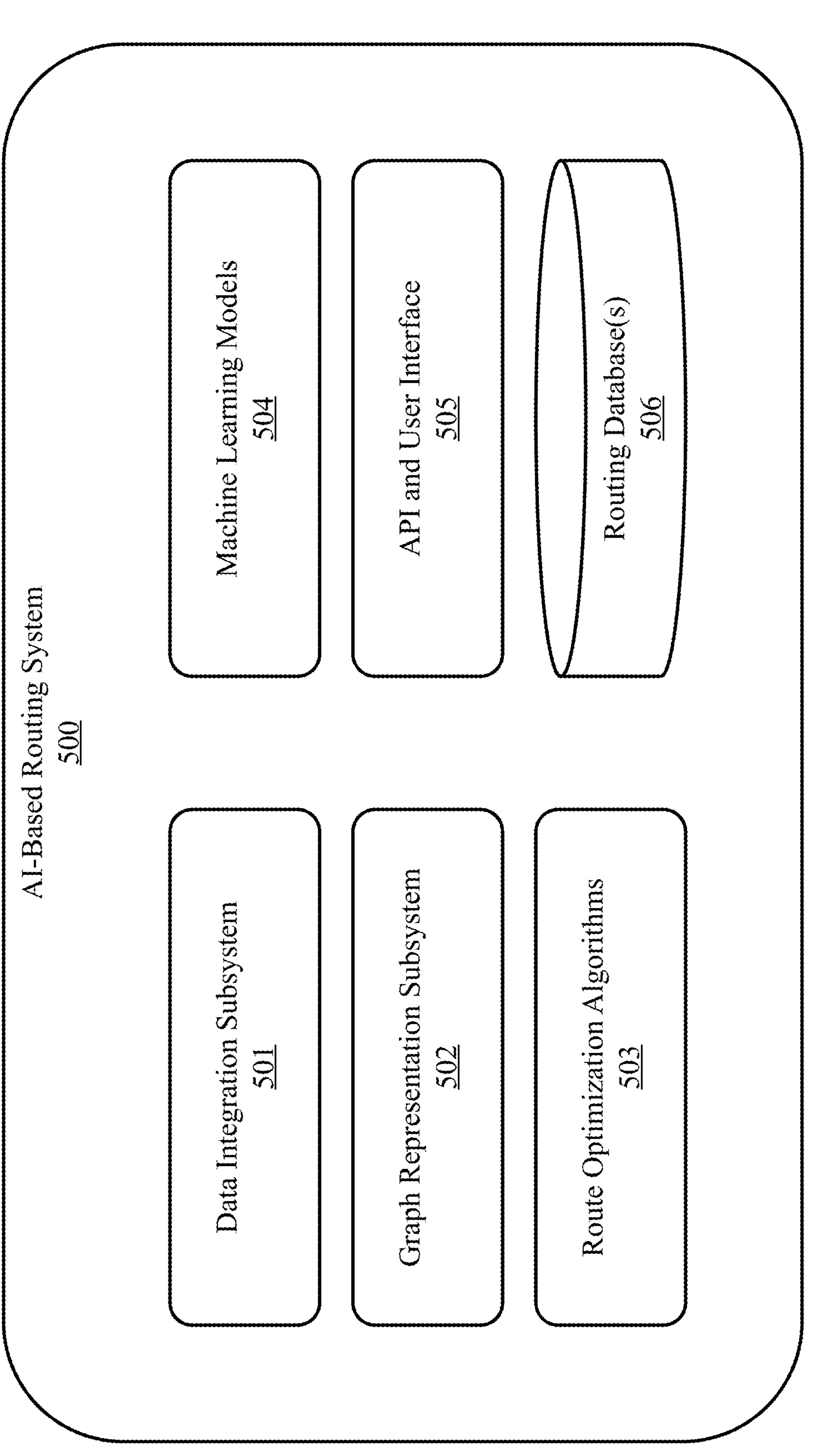
FIG. 5 is a block diagram illustrating an exemplary aspect of the AI-based platform for emissions control, an AI-based routing system.

FIG. 5 is a block diagram illustrating an exemplary aspect of the AI-based platform for emissions control, an AI-based routing system 500. According to the aspect, AI-based routing system 500 is configured to generates personalized, environmentally optimized routes for individual vehicles based on real-time traffic, emissions, and pricing data. According to the embodiment, the system 500 comprises a data integration subsystem 501, a graph representation subsystem 502, one or more route optimization algorithms 503, various machine learning models 504, an API and user interface 505, and a routing database 506.

According to the aspect, the data integration subsystem 501 collects and preprocesses the real-time data from various sources, such as the emissions data acquisition system 200, the road pricing system 300, and the vehicle tracking system 400. It also integrates static data, such as the road network topology, speed limits, and turn restrictions, from geographic information systems (GIS) databases. The data integration layer uses various techniques, such as REST APIs, message queues, and data streams, to collect and harmonize the heterogeneous data from the different modules. It may apply data cleaning, transformation, and aggregation methods to ensure the quality and consistency of the data.

According to the aspect, the graph representation subsystem 502 may be configured to model a road network as a directed graph, where nodes represent intersections or decision points, and edges represent road segments. Each edge is associated with a set of attributes, such as length, speed, emissions, and price, which are dynamically updated based on the real-time data. In some implementations, the routing system uses efficient graph traversal and shortest path algorithms, such as Dijkstra's algorithm, A* search, or contraction hierarchies, to find the optimal routes in real-time. These algorithms are adapted to handle the dynamic and multi-objective nature of the problem, by incorporating time-dependent and stochastic edge weights.

According to the aspect, one or more advanced route optimization algorithms 503 may be applies to find the best route between a given origin and destination, based on the user's preferences and constraints. The algorithms may consider multiple objectives, such as minimizing travel time, emissions, and cost, and can handle complex trade-offs and uncertainties. In an embodiment, the route optimization problem is formulated as a multi-objective optimization model, which seeks to minimize a weighted sum of the travel time, emissions, and cost, subject to various constraints, such as road capacity, speed limits, and user preferences. The model may be solved, for example, using exact or heuristic methods, such as integer programming, genetic algorithms, or simulated annealing.

According to an embodiment, platform 120 can perform route optimization using a genetic algorithm economic and environmental dispatch (GA-EED) tool to identity one or more optimized pathways, based on multiple preferences and constraints. The GA-EED tool is an AI tool that uses a genetic algorithm approach to optimize the dispatch of energy resources considering both economic and environmental factors. Genetic algorithms are a class of optimization algorithms inspired by the principles of natural selection and genetics, which evolve a population of candidate solutions over multiple generations to find the optimal solution. In the context of the AI-based routing system, the GA-EED tool can be adapted to optimize the selection of routes considering various economic and environmental criteria, such as: minimizing fuel consumption or energy use of vehicles; minimizing emissions or air pollution along the route; minimizing travel time or distance; minimizing road congestion or traffic delays; and balancing the trade-offs between these different criteria based on user preferences and system goals. According to an aspect, the multi-objective optimization algorithm is based on a metaheuristic such as genetic algorithms, particle swarm optimization, or simulated annealing, and is adapted to handle dynamic and stochastic problem instances For example, the GA-EED tool can work by encoding potential routes as "chromosomes" and applying genetic operators such as selection, crossover, and mutation to evolve and improve the routes over successive generations. For example: selection can be based on tournament or roulette wheel methods to prefer fitter routes; crossover may comprise swapping segments of parent routes to create offspring routes; and mutation may comprise randomly altering nodes or attributes of a route. In an embodiment, the route can be encoded as a sequence of nodes or waypoints that the vehicle must pass through, along with any relevant attributes like travel mode, speed, or charging/fueling stops.

The fitness of each route can be evaluated based on a weighted combination of the economic and environmental criteria, and the best routes would be selected and reproduced in each generation. Exemplary fitness optimization objectives can include, but are not limited to: total travel time, considering factors like road type, speed limits, traffic congestion, and weather conditions; energy consumption, based on the vehicle type, speed profile, road grade, and auxiliary loads; emissions, which may calculated using models like COPERT that estimate pollutant emissions based on vehicle type, speed, and driving conditions; and route penalties, based on factors like road pricing, safety risk, environmental impact, and user preferences, similar to the penalty matrix in the power system application. AI-based routing system 500 can generate optimal routes that balance multiple objectives while respecting various constraints and system conditions. This can help reduce travel times, energy consumption, emissions, and costs for both individual users and the overall transportation system.

The route optimization must respect various constraints, such as: road network topology and connectivity; vehicle range and refueling/recharging requirements; traffic rules and turn restrictions; and user-specified origin, destination, waypoints, and time windows. Constraint violations can be handled by penalty functions (e.g., penalty matrix) that reduce the fitness of infeasible routes, or by repair mechanisms that modify routes to restore feasibility. The route optimization can incorporate a penalty matrix to discourage the use of certain roads or areas based on factors like congestion, emissions, safety, or environmental impact. The penalty matrix can be dynamically updated based on real-time data from sensors, satellites, weather stations, mobile device sensors, onboard vehicle sensors, social media, or traffic management systems.

The GA-EED tool iterates the process of fitness evaluation, selection, crossover, and mutation over multiple generations until a termination criterion is met, such as, for example, a maximum number of generations or a convergence threshold.

The GA-EED tool can be integrated into the routing system of the AI-based dynamic pricing, mapping, and emissions control platform 120, and can be run in real-time or offline depending on the computational resources and data availability. The specific implementation details of the GA-EED tool, such as the chromosome encoding, fitness evaluation, and genetic operator settings, may be adapted and fine-tuned for the specific routing problem and data sources used by the system.

In an embodiment, the multi-objective optimization algorithm comprises a GA-EED tool that optimizes the selection of routes considering various economic and environmental criteria, such as minimizing fuel consumption, emissions, travel time, and road congestion, while balancing the trade-offs between these criteria based on user preferences and system goals.

In an embodiment, the GA-EED tool for vehicle route optimization may be integrated with other modules of a Co-ordinated and Centralized Energy Management System (ConCEMS) that integrates supply-side, demand-side and transmission line management systems for optimal grid operation. The optimal routes generated by the GA-EED tool can be integrated with the other modules of ConCEMS, such as: a home energy management system (HEMS) module can use the estimated travel times and energy consumption to optimize the scheduling of home loads and EV charging; a supply-side energy management system (SSEMS) module can use the estimated power demand of EV charging to optimize the dispatch of generators and renewable sources; and a transmission line management system (TLMS) module can use the estimated traffic flows to calculate the dynamic line ratings and check for any transmission bottlenecks.

With respect to Carbon-Adjust, platform 120 can integrate with an improved comfort biased smart home load manager (iCBSHLM). The iCBSHLM is a tool for managing the energy consumption of smart homes while considering the comfort preferences of the occupants. It uses a combination of optimization algorithms and machine learning techniques to schedule and control the operation of various home appliances and systems, such as HVAC, lighting, and electric vehicles, to minimize energy costs and emissions while maintaining a satisfactory level of comfort for the occupants. In the context of the AI-based routing system, the iCBSHLM can be used to optimize the charging and discharging of electric vehicles (EVs) at home, considering the user's comfort preferences, energy prices, and emissions intensity of the grid. For instance, the iCBSHLM can be integrated into the user interface system 125 of the AI-based platform 120, and can communicate with the EV's battery management system and the home energy management system to control the charging and discharging schedule. The iCBSHLM can function by learning the user's comfort preferences and energy consumption patterns over time, and using this knowledge to optimize the EV charging schedule to minimize costs and emissions while ensuring that the EV has sufficient charge for the user's planned trips. The iCBSHLM can also be used to provide personalized recommendations and incentives to the user for optimizing their EV usage and home energy consumption, based on their comfort preferences and the system's goals for reducing emissions and congestion.

According to an embodiment, platform 120 integrates with an iCBSHLM to optimize the charging and discharging of EVs at home, considering the user's comfort preferences, energy prices, and emissions intensity of the grid, and provides personalized recommendations and incentives to the user for optimizing their EV usage and home energy consumption, thereby adapting the user and vehicle behavior models based on the received user feedback.

The GA-EED tool and the iCBSHLM are two examples of advanced AI techniques that can be used in some embodiments to optimize the economic and environmental performance of the AI-based routing system 500, by considering the complex trade-offs and interactions between different criteria and stakeholders.

According to the aspect, one or more machine learning models 504 may be used to predict the future traffic and emissions conditions based on historical patterns and real-time data. The models can learn from the feedback and behavior of the users to continuously improve the accuracy and relevance of the route recommendations. In some embodiments, the routing system uses various machine learning techniques, such as deep neural networks, reinforcement learning, and probabilistic graphical models, to predict the future traffic and emissions conditions based on historical and real-time data. The models can be trained on large datasets of traffic and emissions measurements, and can be continuously updated and refined based on the feedback and behavior of the users.

The AI-based routing system 500 can utilize various machine learning models to predict traffic conditions, emissions, and other relevant factors for optimizing routes. With respect to traffic speed and congestion prediction the system may implement long short-term memory (LSTM) neural networks, convolutional neural networks (CNN) and/or gradient boosting machines (GBM). LSTM is a type of recurrent neural network (RNN) that can learn long-term dependencies in sequential data. It can be used to predict future traffic speeds or congestion levels based on historical patterns and real-time data, such as traffic flow, speed, and density measurements from sensors or floating car data. CNNs are commonly used for image recognition tasks, but they can also be applied to traffic speed prediction by treating the road network as a grid-like image. The CNN can learn spatial and temporal patterns in the traffic data and predict the speed or congestion levels for each road segment. GBM is an ensemble learning method that combines multiple weak prediction models (e.g., decision trees) to create a strong model. It can be used to predict traffic speeds or congestion levels based on various features, such as time of day, day of week, weather conditions, and road characteristics.

With respect to emissions predictions the system may implement multiple linear regression (MLR), random forest (RF), and/or support vector regression (SVR) models. MLR is a simple but effective method for modeling the relationship between a dependent variable (e.g., emissions) and multiple independent variables (e.g., traffic speed, acceleration, road grade). It can be used to estimate the emissions of individual vehicles based on their real-time driving parameters and the COPERT or other emission factors. RF is an ensemble learning method that builds multiple decision trees on random subsets of the data and features, and combines their predictions to reduce overfitting and improve accuracy. It can be used to predict vehicle emissions based on various categorical and continuous features, such as vehicle type, fuel type, speed, and acceleration. SVR is a regression version of the support vector machine (SVM) algorithm, which finds a hyperplane that maximizes the margin between the data points and the hyperplane. It can be used to predict vehicle emissions based on multiple features, while handling non-linear relationships and outliers in the data.

With respect to travel time prediction the system may implement Kalman filtering, Bayesian networks, and/or deep belief networks (DBN). As previously discussed, Kalman filtering is a recursive algorithm that estimates the state of a dynamic system (e.g., travel time) based on noisy measurements and a transition model. It can be used to predict the travel time of a route based on real-time traffic data and historical patterns, while adapting to the changing traffic conditions and uncertainties. Bayesian networks are probabilistic graphical models that represent the conditional dependencies between random variables (e.g., travel time, traffic flow, incidents). They can be used to predict the travel time of a route based on the observed or inferred values of the relevant variables, and update the predictions as new evidence becomes available. DBNs are generative neural networks that learn a hierarchical representation of the input data by stacking multiple layers of Restricted Boltzmann Machines (RBM). They can be used to predict the travel time of a route based on multiple features, such as traffic speed, congestion, incidents, and weather, while capturing the complex and non-linear relationships between the variables.

These are just a few examples of the many machine learning models and techniques that can be used for traffic, emissions, and travel time prediction in the routing system. The choice of the appropriate model depends on various factors, such as the type and quality of the data, the computational resources and constraints, the desired accuracy and interpretability, and the specific requirements and objectives of the routing problem. Moreover, the models may be trained, validated, and tested on representative and diverse datasets, and continuously updated and refined based on the feedback and performance metrics from the real-world deployment. The routing system may also incorporate a machine learning engine 700 which can provide techniques for data preprocessing, feature selection, hyperparameter tuning, and model ensemble to improve the robustness and generalization of the predictions.

The routing system 500 can provide real-time navigation guidance to the users, by continuously monitoring their position and speed, and updating the route recommendations based on the changing traffic and emissions conditions. It can use map matching and dead reckoning (deduced reckoning) techniques to accurately locate the vehicles on the road network, and provide turn-by-turn instructions and alerts.

According to the aspect, the optimized routes are exposed to the users through a web or mobile application interface 505, which allows them to enter their destination, preferences, and constraints, and receive turn-by-turn navigation guidance. The routing system can also provide an API for integration with third-party applications and services.

API and user interface 505 may provide a portal through which governmental or local authorities can input a weight matrix for all concerned roads across a geographical entity. By feeding their weight matrix into the system it means they provide a set of numerical values or weights that represent the relative importance or priority of different factors or criteria for each road segment in the given area. The weight matrix may include factors such as (but not limited to): environmental impact wherein the weight assigned is to the environmental impact of traffic on each road, based on factors such as air quality, noise pollution, or greenhouse gas emissions; road conditions wherein the weight assigned is to the physical condition of each road, based on factors such as pavement quality, lane width, or presence of potholes or cracks; traffic volume wherein the weight is assigned to the typical traffic volume on each road, based on factors such as average daily traffic, peak hour traffic, or percentage of heavy vehicles; safety wherein the weight is assigned to the safety risk of each road, based on factors such as accident history, speed limit, or presence of pedestrians or cyclists; and strategic importance wherein the weight is assigned to the strategic importance of each road, based on factors such as connectivity to key destinations, emergency routes, or evacuation paths.

The weight matrix is essentially a way for the authorities to encode their priorities, policies, and local knowledge into a quantitative format that can be used by AI-based routing system 500 to optimize the routes and pricing based on these factors. For example, if the authorities assign a high weight to the environmental impact factor for a certain road, the routing system will prioritize reducing emissions and congestion on that road, possibly by recommending alternative routes or modes of transportation to the users. The use of a weight matrix allows the authorities to have a direct and transparent influence on the behavior and outcomes of the AI-based routing system, while still leveraging the power and efficiency of AI to optimize the routes and pricing based on multiple criteria and constraints. It also enables a collaborative and iterative approach to managing the urban mobility system, where the authorities and the AI system can learn from each other and adapt to the changing needs and preferences of the users and the environment.

AI-based routing system 500 can be configured to generate, compute, derive, infer, or otherwise calculate a penalty matrix as a way to assign a numerical cost or penalty to each road segment based on various factors that discourage or penalize the use of that road by the vehicles. According to an embodiment, the penalty matrix can be used by the one or more routing algorithms 503 to calculate the optimal routes that minimize the total penalty or cost while satisfying the given constraints and preferences. The penalty matrix can include factors such as (but not limited to): environmental impact wherein the penalty is assigned to each road based on its environmental impact, such as the level of air pollution, noise, or greenhouse gas emissions caused by the traffic on that road; congestion wherein the penalty is assigned to each road based on its level of congestion, such as the average delay, queue length, or speed reduction caused by the traffic on that road; road pricing wherein the penalty is assigned to each road based on its pricing scheme, such as the toll fee, congestion charge, or dynamic pricing applied to the vehicles using that road; safety risk wherein the penalty is assigned to each road based on its safety risk, such as the frequency or severity of accidents, violations, or conflicts involving the vehicles or pedestrians on that road; and user preferences wherein the penalty is assigned to each road based on the user's preferences or constraints, such as the avoidance of certain areas, road types, or traffic conditions specified by the user.

The weight matrix provided by the governmental or local authorities can play a role in determining the values and priorities of the penalty matrix used by the routing system. The weight matrix essentially defines the relative importance or contribution of each factor in the overall penalty calculation. For example, if the weight matrix assigns a high weight to the environmental impact factor, the routing system will prioritize the roads with lower emissions or pollution levels in the penalty matrix, and will recommend the routes that minimize the environmental impact to the users.

The use of a penalty matrix enables the routing system to balance multiple and potentially conflicting objectives and criteria in a quantitative and transparent way, while respecting the priorities and preferences of the authorities and users. It also enables a dynamic and adaptive approach to route optimization, where the penalties can change based on the current conditions and goals of the system, such as reducing emissions during peak hours or promoting safety during adverse weather. The integration of the weight matrix into the penalty matrix ensures that the routing system aligns with the policies and values of the authorities, while leveraging the power and flexibility of AI to find the best solutions for the users and the environment. It also fosters a collaborative and iterative relationship between the authorities and the AI system, where both parties can learn from each other and improve the performance and outcomes of the AI-based dynamic pricing, mapping, and emissions control platform 120 over time.

According to the aspect, one or more routing databases 506 are present and configured to store information to support AI-based routing system functionality. This can include a plurality of weight matrices obtained from governmental or local authorities, a plurality of penalty matrices obtained for a plurality of road segments, and may further comprise various route optimization algorithms and ML models which may be implemented by routing system 500. Additionally, routing database 506 may store computed individual and overall penalty scores which may be obtained by analyzing the stored weight and penalty matrices.

Figure 6:
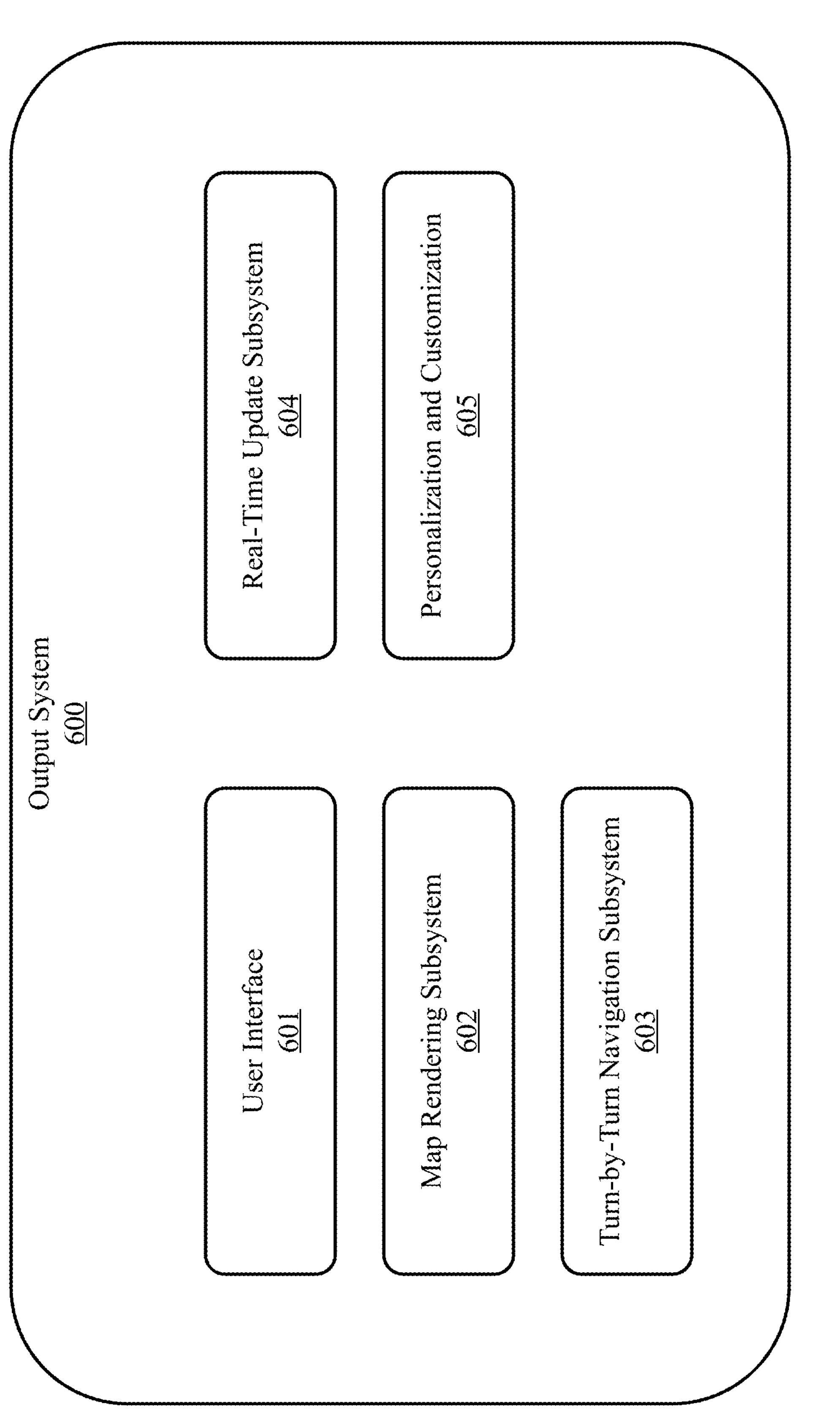
FIG. 6 is a block diagram illustrating an exemplary aspect of the AI-based platform for emissions control, an output system.

FIG. 6 is a block diagram illustrating an exemplary aspect of the AI-based platform for emissions control, an output system 600. According to the aspect, output system 600 is configured for delivering the optimized routes and navigation guidance to the users in a clear, timely, and actionable manner. It is the interface between the AI-based routing system 500 and the end-users, and plays a role in the overall user experience and satisfaction. According to the embodiment, the output system 600 comprises a user interface 601, a map rendering subsystem 602, a turn-by-turn navigation subsystem 603, a real-time update subsystem 604, and various features for personalization and customization 605.

According to the aspect, the user interface 601 may provide a graphical user interface (GUI) for the users to interact with the routing system, input their preferences and constraints, and view the recommended routes and navigation guidance. The user interface can be a web-based or mobile application, or an in-vehicle navigation system, depending on the platform and device. For instance, the user interface should be designed with user-centered principles, such as simplicity, consistency, and responsiveness. It should provide a clear and intuitive workflow for inputting the origin, destination, and preferences, and displaying the recommended routes and alternatives. It may also adapt to different screen sizes, resolutions, and input methods, and provide accessibility features for users with disabilities.

According to the aspect, the map rendering subsystem 602 component is responsible for rendering the map and visualizing the recommended routes, traffic conditions, and points of interest. It may use a geographic information system (GIS) database to store and retrieve the map data, and applies cartographic techniques to style and label the map features. For example, map rendering subsystem 602 can use various technologies, such as WebGL, OpenGL, or DirectX, to render the map and route visualizations in 2D or 3D. It may optimize the map data storage, retrieval, and caching to ensure fast and smooth rendering, even for large and complex road networks. It may also apply cartographic best practices, such as color schemes, symbology, and labeling, to enhance the readability and aesthetics of the map.

According to the aspect, the turn-by-turn navigation subsystem 603 generates the turn-by-turn navigation instructions for the recommended routes, based on the road network topology, traffic rules, and user preferences. It may use natural language generation techniques to provide clear and concise verbal or written instructions, and synchronizes them with the map display and the user's location. In an embodiment, the turn-by-turn navigation component can use rule-based or machine learning-based techniques to generate the navigation instructions in natural language. It may consider factors such as the road type, speed limit, landmarks, and user familiarity to provide clear and relevant instructions. It can also handle edge cases, such as roundabouts, U-turns, or ambiguous intersections, and provide additional guidance or warnings when needed.

According to the aspect, the real-time update subsystem 604 is configured to receive real-time updates from the routing system and other data sources, such as traffic incidents, road closures, or weather alerts, and notify the users of any changes or disruptions to their routes. It may also allow the users to report feedback or incidents, and integrate them into the routing system for continuous improvement. For example, real-time update subsystem 604 can use various communication protocols, such as WebSocket, MQTT, or SSE, to receive and send real-time data between the client and server. It can handle the data volume, latency, and reliability challenges of real-time communication, and provide graceful degradation or fallback mechanisms in case of network or server failures.

As shown, the system provides methods and techniques that allow the users to personalize and customize 605 the output of the routing system, based on their preferences, history, and context. It can learn from the user's behavior and feedback to adapt the route recommendations, user interface, and communication style to their individual needs and expectations. In an embodiment, the personalization and customization component 605 can use various machine learning algorithms, such as collaborative filtering, content-based filtering, or hybrid approaches, to learn from the user's preferences and behavior. It can collect implicit or explicit feedback from the user's interactions with the system, such as route selections, ratings, or comments, and use them to build user profiles and recommendation models. In some embodiments, the interactive user interface includes features for personalization, gamification, and incentivization to encourage user engagement and behavior change.

Figure 7:
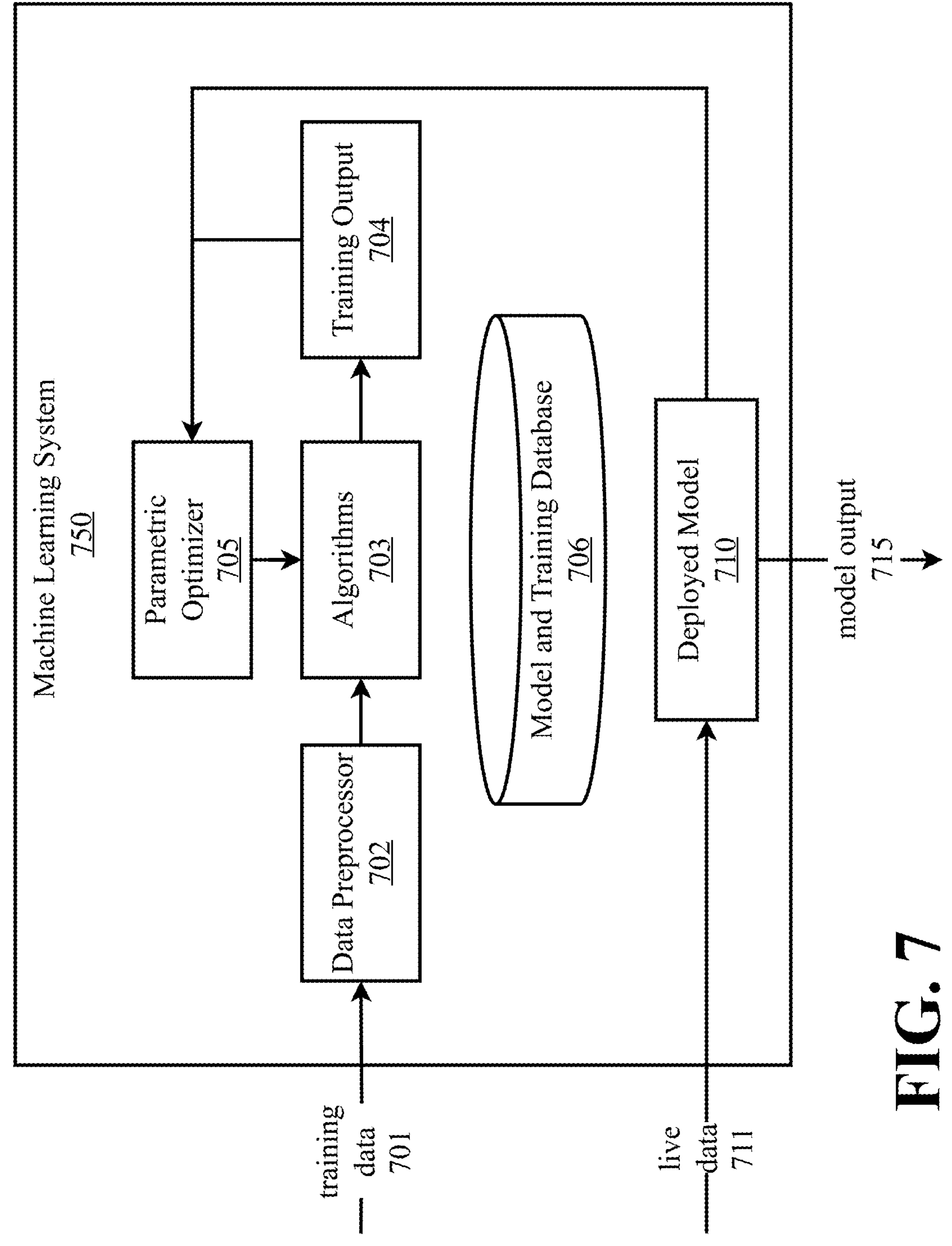
FIG. 7 is a block diagram illustrating an exemplary architecture for a subsystem of the platform for AI-based pricing, mapping, and emissions control, a machine learning system.

FIG. 7 is a block diagram illustrating an exemplary architecture for a subsystem of the platform for AI-based pricing, mapping, and emissions control, a machine learning system 700. According to the embodiment, machine learning engine may comprise a model training stage comprising a data preprocessor 702, one or more machine and/or deep learning algorithms 703, training output 704, and a parametric optimizer 705, and a model deployment stage comprising a deployed and fully trained model 710 configured to perform tasks described herein such as generating traffic, routing, and emission predictions.

At the model training stage, a plurality of training data 701 may be received at machine learning engine 700. In some embodiments, the plurality of training data may be obtained from one or more databases 206, 305, 306, 406 and/or directly from various sources 110*a-h* and third-party services. Data preprocessor 702 may receive the input data (e.g., road network information, vehicle information, satellite data, etc.) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 702 may also be configured to create a training dataset, a validation dataset, and a test set from the plurality of input data 701. For example, a training dataset may comprise 80% of the preprocessed input data, the validation set 10%, and the test dataset may comprise the remaining 10% of the data. The preprocessed training dataset may be fed as input into one or more machine and/or deep learning algorithms 703 to train a predictive model traffic routing and emissions, for example.

Machine learning engine 700 may be fine-tuned to ensure each model performed in accordance with a desired outcome. Fine-tuning involves adjusting the model's parameters to make it perform better on specific tasks or data. In this case, the goal is to improve the model's performance on video game or simulation data. The fine-tuned models are expected to provide improved accuracy and quality when processing video game or simulation data, which can be crucial for applications like predicting and generating future game states. The refined models can be optimized for real-time processing, meaning they can quickly analyze and understand game states, simulations, and user inputs as they happen. Additionally, by using the smaller, fine-tuned models instead of a larger model for routine tasks, the machine learning system 700 reduces computational costs associated with AI processing.

During model training, training output 704 is produced and used to measure the accuracy and usefulness of the predictive outputs. During this process a parametric optimizer 705 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 700 to evaluate a model's performance. Metrics may include, but are not limited to latency between a user input and a generated game state, quality of generated game states, and the realism of generated game states.

The test dataset can be used to test the accuracy of the model outputs. If the training model is making predictions that satisfy a certain criterion then it can be moved to the model deployment stage as a fully trained and deployed model 710 in a production environment making predictions based on live input data 711 (e.g., road network information, vehicle information, satellite data, etc.). Further, model predictions made by a deployed model can be used as feedback and applied to model training in the training stage, wherein the model is continuously learning over time using both training data and live data and predictions.

A model and training database 706 is present and configured to store training/test datasets and developed models. Database 706 may also store previous versions of models.

According to some embodiments, the one or more machine and/or deep learning models may comprise any suitable algorithm known to those with skill in the art including, but not limited to: Large Language Models (LLMs), generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 703 may comprise a deep learning algorithm such as neural networks (e.g., recurrent, convolutional, long short-term memory networks, etc.). According to an embodiment, algorithms 703 may comprise a GA-EED model and/or variants thereof. According to some aspects, user and vehicle behavior models are based on machine learning techniques such as deep learning, reinforcement learning, or Bayesian inference, and are trained on large-scale data sets of user preferences, choice behavior, and vehicle trajectories.

In some implementations, ML engine 700 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in model and training database 706.

DETAILED DESCRIPTION OF EXEMPLARY ASPECTS

The methods and processes described herein are illustrative examples and should not be construed as limiting the scope or applicability of the artificial intelligence-based pricing, mapping, emissions control, and fleet management platform. These exemplary implementations serve to demonstrate the versatility and adaptability of the platform. It is important to note that the described methods may be executed with varying numbers of steps, potentially including additional steps not explicitly outlined or omitting certain described steps, while still maintaining core functionality. The modular and flexible nature of the artificial intelligence-based pricing, mapping, emissions control, and fleet management platform allows for numerous alternative implementations and variations tailored to specific use cases or technological environments. As the field evolves, it is anticipated that novel methods and applications will emerge, leveraging the fundamental principles and components of the platform in innovative ways. Therefore, the examples provided should be viewed as a foundation upon which further innovations can be built, rather than an exhaustive representation of the platform's capabilities.

Figure 8:
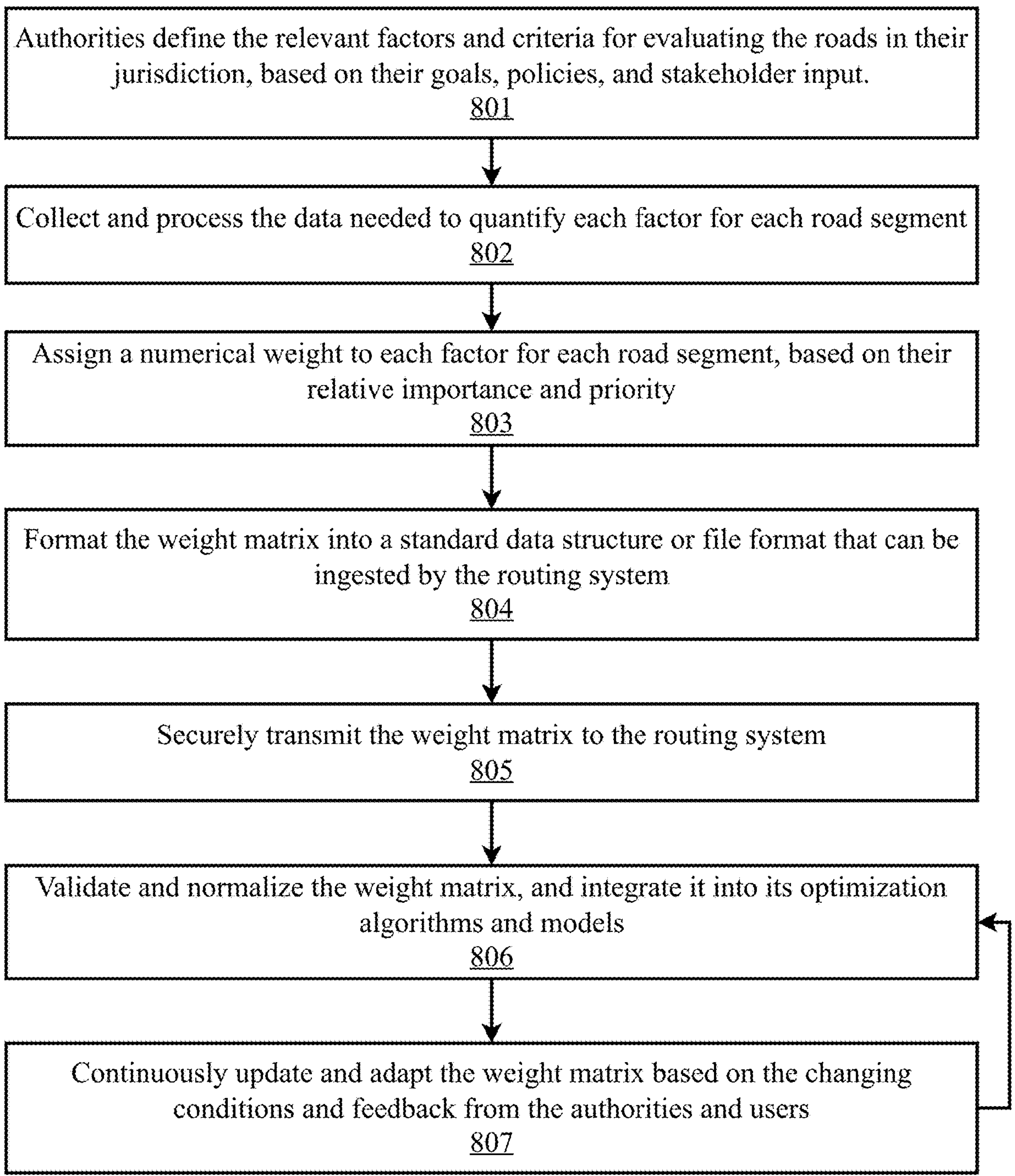
FIG. 8 is a flow diagram illustrating an exemplary method for feeding a weight matrix into the AI-based routing system, according to an embodiment.

FIG. 8 is a flow diagram illustrating an exemplary method 800 for feeding a weight matrix into the AI-based routing system 500, according to an embodiment. According to the embodiment, the process of feeding the weight matrix into the routing system begins at step 801 by local authorities defining the relevant factors and criteria for evaluating the roads in their jurisdiction, based on their goals, policies, and stakeholder input. In some implementations, local authorities can be work with platform administrators to collaboratively define the relevant factors and criteria. At step 802 the authorities and/or platform collect and process the data needed to quantify each factor for each road segment, using various sources such as traffic sensors, emissions models, road surveys, or historical data. At step 803 the authorities and/or platform assign a numerical weight to each factor for each road segment, based on their relative importance and priority, using methods such as pairwise comparison, multi-criteria decision analysis, or expert judgment. The authorities and/or platform can format the weight matrix into a standard data structure or file format that can be ingested by the routing system at step 804, such as, for example a CSV file or JSON object. At step 805 the authorities can securely transmit the weight matrix to the routing system through an API or data pipeline, ensuring the integrity and confidentiality of the data. At step 806 the routing system validates and normalizes the weight matrix, and integrates it into its optimization algorithms and models. This may comprise the use of techniques such as weighted sum, weighted product, or multi-objective optimization, according to the aspect. As a last step 807, the routing system continuously updates and adapts the weight matrix based on the changing conditions and feedback from the authorities and users, using techniques such as, for example, reinforcement learning or Bayesian optimization. The updated weight matrix may be reintegrated into the optimization algorithms and models to provide continuous and dynamic learning and optimizations which reflect the relevant factors and criteria of the authorities, users, and various stakeholders.

Figure 9:
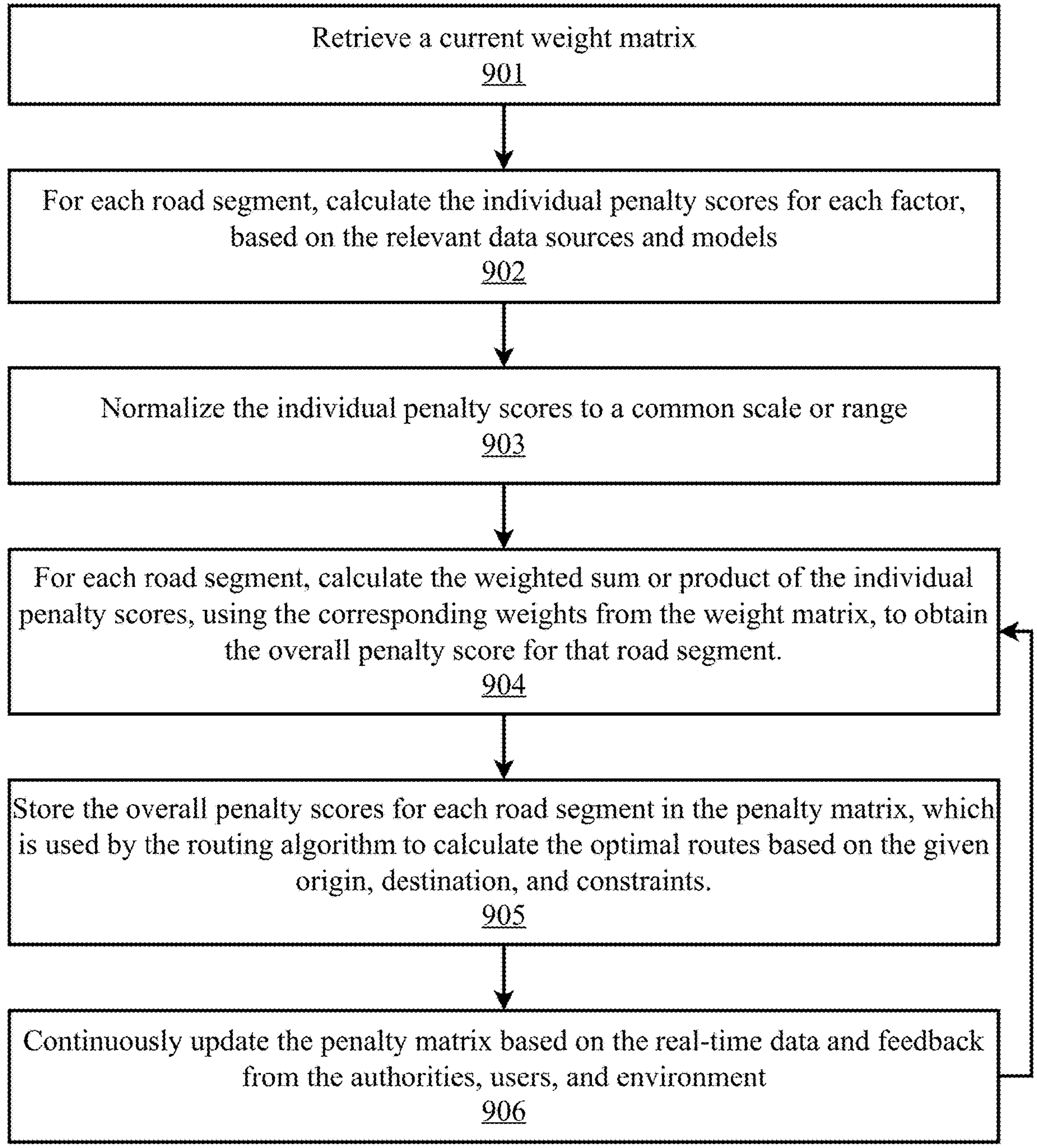
FIG. 9 is a flow diagram illustrating an exemplary method for incorporating a weight matrix into a penalty matrix, according to an embodiment.

FIG. 9 is a flow diagram illustrating an exemplary method 900 for incorporating a weight matrix into a penalty matrix, according to an embodiment. According to the embodiment, the process begins at step 901 when the AI-based routing system 500 receives, retrieves, or otherwise obtains the latest weight matrix from the authorities' database or API, and validates its format and consistency. At step 902, for each road segment, the routing system calculates the individual penalty scores for each factor, based on the relevant data sources and models, such as, for example, the emissions data from the air quality sensors, the congestion data from the traffic cameras, or the pricing data from the toll operators. At step 903, the routing system normalizes the individual penalty scores to a common scale or range to ensure the comparability and consistency of the scores across different factors and road segments. For instance, the scale or range may be 0 to 1 or 0 to 100, or some other suitable range of values. At step 904, for each road segment, the routing system calculates the weighted sum or product of the individual penalty scores, using the corresponding weights from the weight matrix, to obtain the overall penalty score for that road segment. The routing system stores the overall penalty scores for each road segment in the penalty matrix at step 905, which is used by the routing algorithm(s) to calculate the optimal routes based on the given origin, destination, and constraints. At step 906, the routing system continuously updates the penalty matrix based on the real-time data and feedback from the authorities, users, and environment. This may comprise the use of techniques such as dynamic weighting, adaptive penalization, or multi-objective optimization. The updated penalty matrix may then be used to calculate individual penalty scores which can be applied to compute a new overall penalty score for a given road segment.

Figure 10:
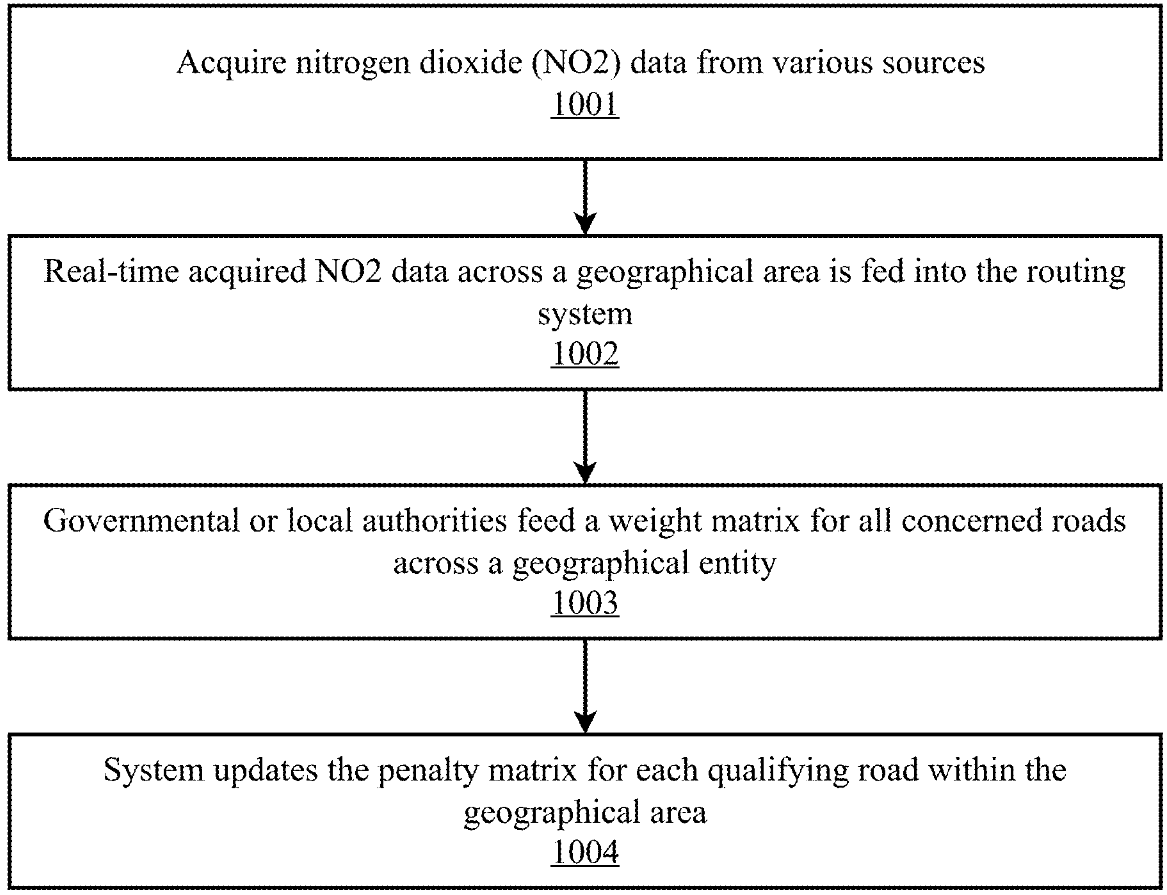
FIG. 10 is a flow diagram illustrating an exemplary method for geo-specific pathway for updating a penalty matrix, according to an embodiment.

FIG. 10 is a flow diagram illustrating an exemplary method 1000 for geo-specific pathway for updating a penalty matrix, according to an embodiment. According to the embodiment, the process begins at step 1001 when platform 120 acquires emissions data including NO2 from various sources such as, for example, satellite instruments. At step 1002, the real-time acquired NO2 data across a geographical area is fed into the routing system. At step 1003, the system receives a weight matrix from governmental or local authorities for all concerned roads across a geographical entity. At step 1004, the platform updates the penalty matrix for each qualifying road within the geographical area/entity.

Figure 11:
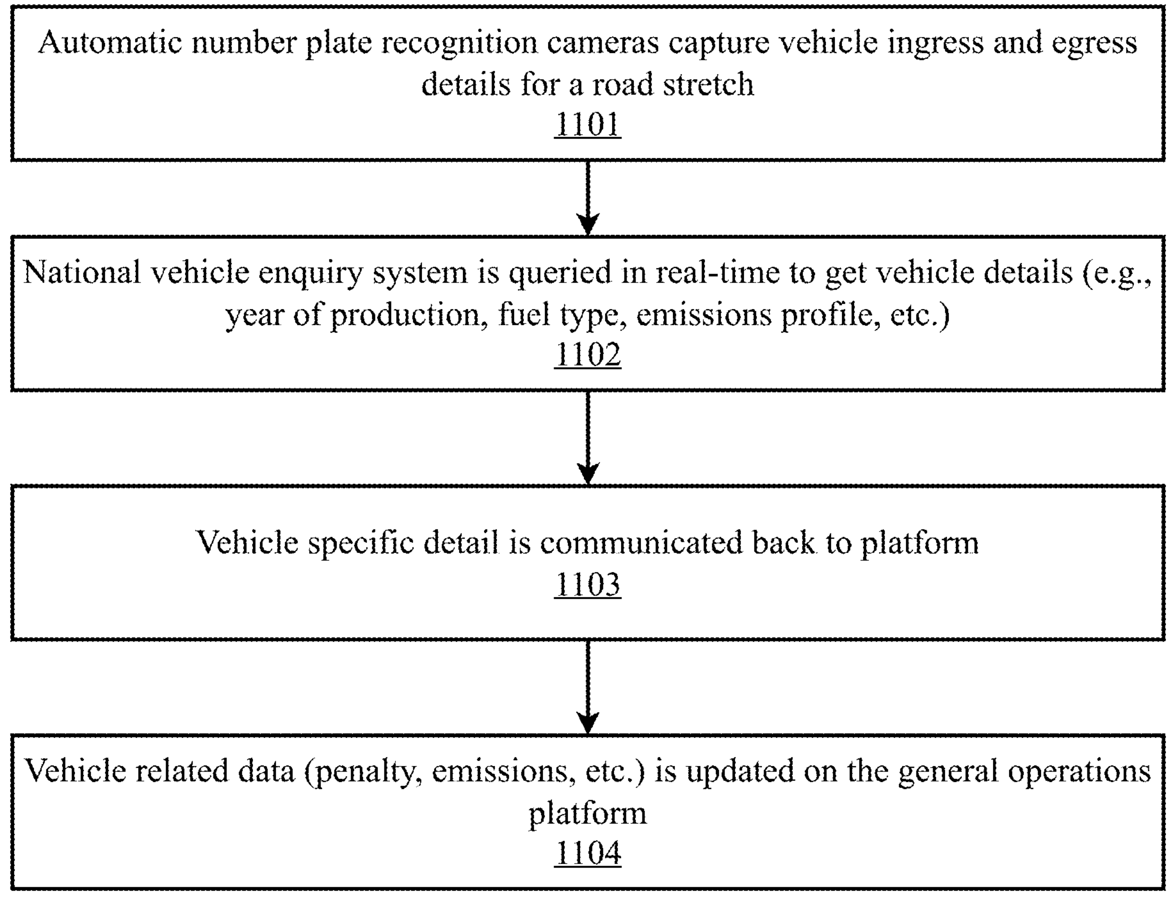
FIG. 11 is a flow diagram illustrating an exemplary method for acquiring vehicle data, according to an embodiment.

FIG. 11 is a flow diagram illustrating an exemplary method 1100 for acquiring vehicle data, according to an embodiment. According to the embodiment, the process begins at step 1101 when automatic number plate recognition cameras capture vehicle ingress and egress details for a road stretch in a given geographical area. Platform may receive vehicle details from one or more ANPR systems and perform AI- or ML-based operations on the details, such as OCR to transform the image data to textual data. This textual data (i.e., textual representation of vehicle license plates) may be used to query databases to obtain vehicle specific information. At step 1102, a national vehicle enquiry system is queried in real-time to get vehicle details (e.g., year of production, fuel type, emissions profile, etc.). The vehicle detail is communicated back to platform 120 at step 1103. The obtained vehicle related data (e.g., penalty, emissions, etc.) is updated on the platform at step 1004. The obtained vehicle data may be stored in vehicle database 406 and accessed by various platform systems/subsystem to facilitate AI-based routing and emissions control.

Figure 12:
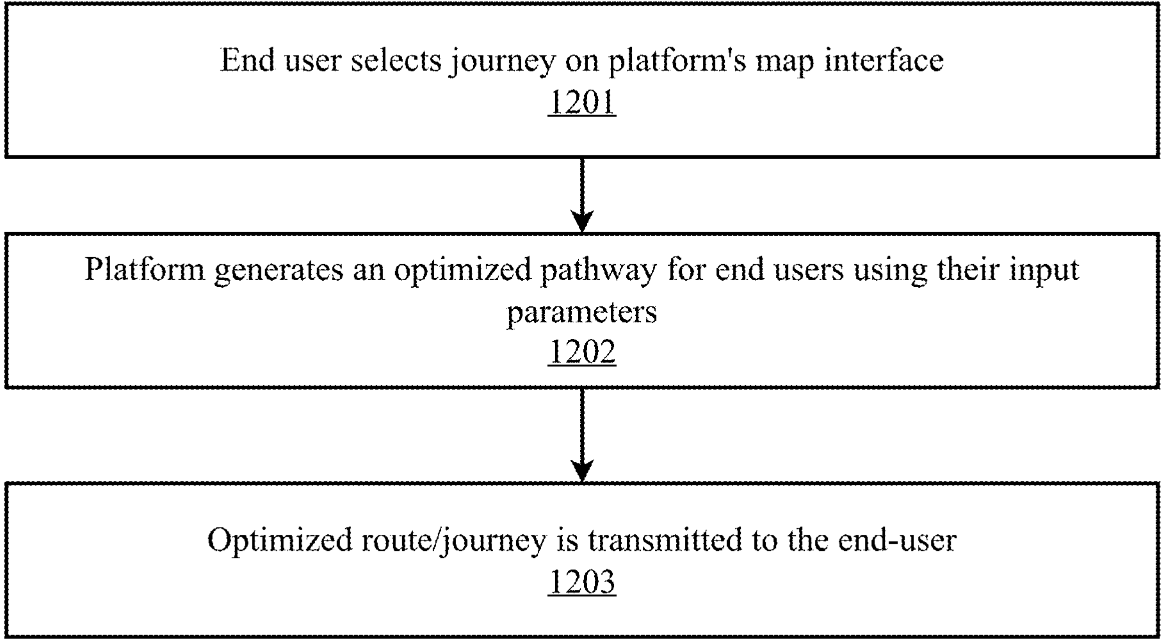
FIG. 12 is a flow diagram illustrating an exemplary method for an end-user interaction with an AI-based dynamic pricing, mapping, and emissions control platform, according to an embodiment.
Figure 12:

FIG. 12 is a flow diagram illustrating an exemplary method 1200 for an end-user interaction with an AI-based dynamic pricing, mapping, and emissions control platform 120, according to an embodiment. According to the embodiment, the process begins at step 1201 when an end-user selects a journey on the platform's map interface (or another interface, depending upon the embodiment). The user can select journey details such as a start location, an end location, an optimization schedule, penalty (e.g., pathway that fines the user the least), fuel (e.g., pathway that uses the least fuel or electricity for battery usage), a time constraint (e.g., start/end time, maximum or minimum time to complete the journey), and cost (e.g., pathway that costs the least to user based on a combination of penalty, time, and fuel usage). At step 1202, the platform generates an optimized pathway/route for the end-user using their input parameters. At step 1203, the optimized route/journey is transmitted to the end-user. The end-user can accept the generated route, or they may choose to query the platform for a new route based on different criteria/parameters or without changing anything. The platform can use the user input (e.g., rejection or accepting of generated route) to update the one or more AI/ML optimization models as well as update penalty scores/overall scores with respect to the individual user.

Figure 13:
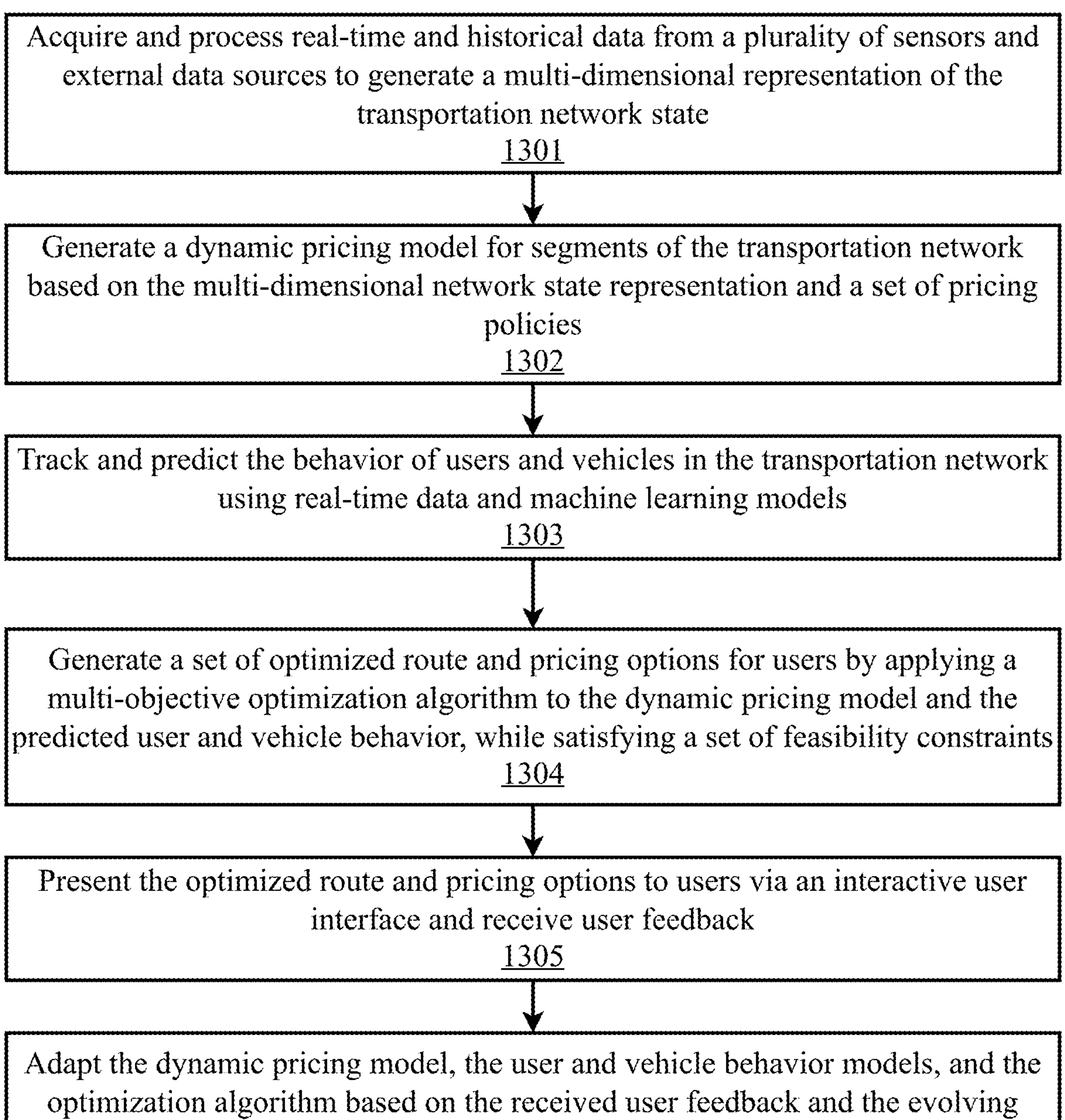
FIG. 13 is a flow diagram illustrating an exemplary method for dynamic optimization of a transportation network, according to an embodiment.

FIG. 13 is a flow diagram illustrating an exemplary method 1300 for dynamic optimization of a transportation network, according to an embodiment. According to the embodiment, the method may be performed by platform 120 and/or one or more of its system/subsystem components. According to the embodiment, the process begins at step 1301 when the system acquires and processes real-time and historical data from a plurality of sensors and external data sources to generate a multi-dimensional representation of a transportation state network. According to an aspect, the transportation state network is an inner-city road network. At step 1302, the system generates a dynamic pricing model for segments of the transportation network based on the multi-dimensional network state representation and a set of pricing policies. According to an aspect, the multi-dimensional network state representation comprises data layers for traffic flow, congestion, emissions, weather, events, and road conditions. At step 1303, the system tracks and predicts the behavior of users and vehicles in the transportation network using real-time data and machine learning models. At step 1304, the system generates a set of optimized route and pricing options for users by applying a multi-objective optimization algorithm to the dynamic pricing model and the predicted user and vehicle behavior, while satisfying a set of feasibility constraints. According to an aspect, the dynamic pricing model is based on a combination of historical data, real-time data, and future predictions, and takes into account factors such as demand, supply, elasticity, and competition. According to an aspect, the user and vehicle behavior models are based on machine learning techniques such as deep learning, reinforcement learning, or Bayesian inference, and are trained on large-scale data sets of user preferences, choice behavior, and vehicle trajectories. According to an aspect, the multi-objective optimization algorithm is based on a metaheuristic such as genetic algorithms, particle swarm optimization, or simulated annealing, and is adapted to handle dynamic and stochastic problem instances.

At step 1305, the system presents the optimized route and pricing options to users via an interactive user interface and receives user feedback. According to an aspect, the interactive user interface includes features for personalization, gamification, and incentivization to encourage user engagement and behavior change. At step 1306, the system adapts the dynamic pricing model, the user and vehicle behavior models, and the optimization algorithm based on the received user feedback and the evolving transportation network state.

According to some aspects, the system and method employs a genetic algorithm economic and environmental dispatch (GA-EED) tool to optimize the selection of routes considering various economic and environmental criteria, such as minimizing fuel consumption, emissions, travel time, and road congestion, while balancing the trade-offs between these criteria based on user preferences and system goals. According to some aspects, the system and method integrates with an improved comfort biased smart home load manager (iCBSHLM) to optimize the charging and discharging of electric vehicles (EVs) at home, considering the user's comfort preferences, energy prices, and emissions intensity of the grid, and provides personalized recommendations and incentives to the user for optimizing their EV usage and home energy consumption. According to some aspects, the system incorporates a penalty matrix that assigns numerical costs to each road segment based on factors such as environmental impact, congestion, road pricing, safety risk, and user preferences, and updates the penalty matrix dynamically based on real-time data from sensors, weather stations, and traffic management systems to discourage the use of certain roads or areas and promote more sustainable and efficient route choices.

Exemplary Computing Environment

Figure 26:
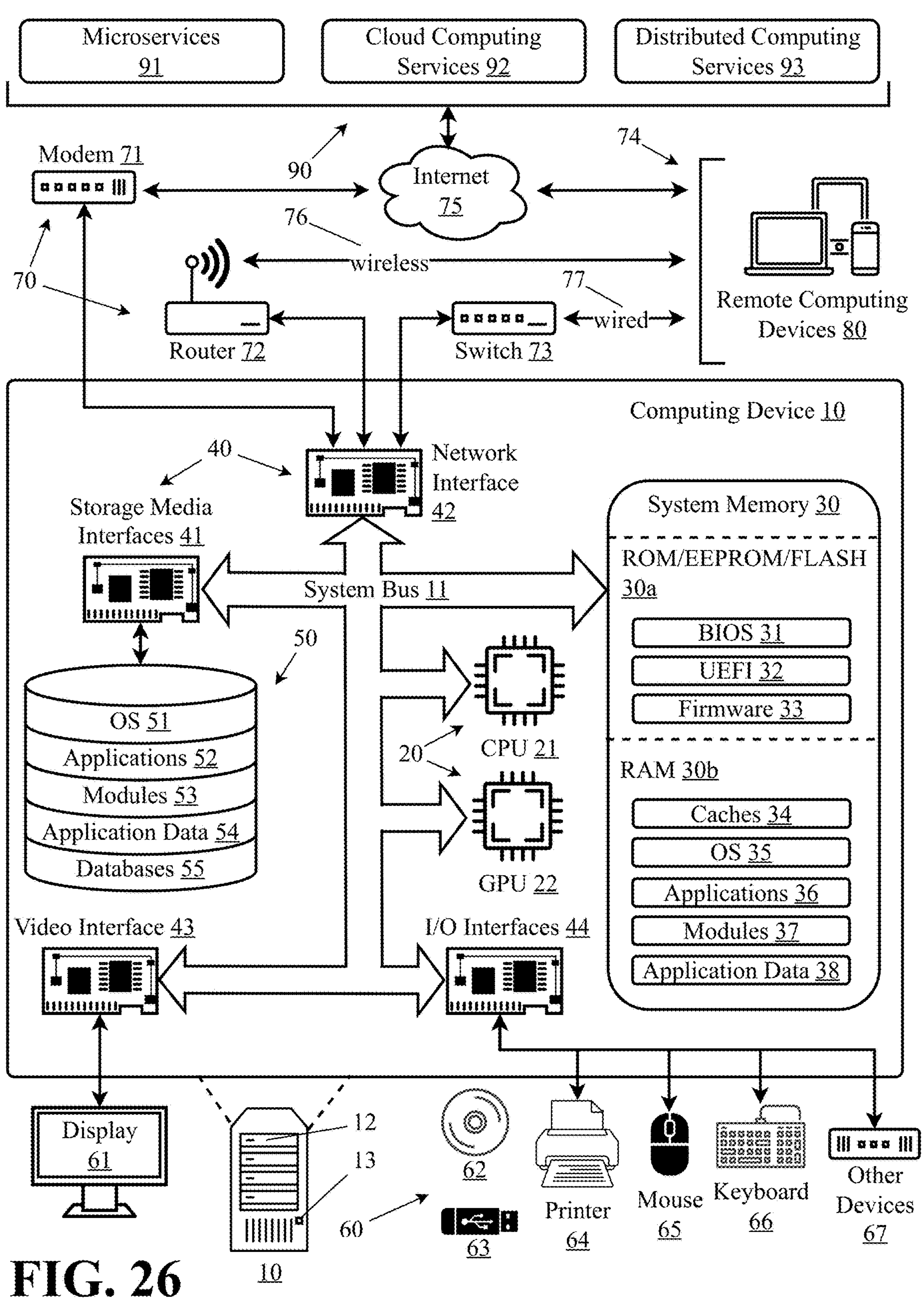
FIG. 26 illustrates an exemplary computing environment on which an embodiment described herein may be implemented.

FIG. 26 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44. Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer-implemented system for integrated management of electric vehicles, comprising:

a computing device comprising at least a memory and a processor;

a plurality of programming instructions stored in the memory and operable on the processor, wherein the plurality of programming instructions, when operating on the processor, cause the computing device to:

acquire data related to transportation networks and electricity networks, wherein the acquired data comprises energy mix temporal forecasts, earth observation measurements of atmospheric emissions, and emission-based route penalties;

receive scheduling information for a plurality of electric vehicles, wherein the scheduling information designates time periods according to different availability categories;

allocate the plurality of electric vehicles between transportation services and electricity grid services based on the scheduling information and the acquired data, wherein allocating comprises:

implementing a hierarchical optimization approach that operates across multiple time horizons comprising at least a long-term planning layer, a day-ahead scheduling layer, and a real-time dispatch layer, wherein each layer operates at different temporal granularities and provides inputs to subsequent layers; and applying genetic algorithm optimization process comprising:

encoding vehicle schedules as chromosomes structured as three-dimensional matrices with dimensions corresponding to vehicles, time slots, and assignment types, the chromosomes representing complete allocation patterns across the plurality of electric vehicles and time periods;

evaluating fitness of each chromosome based on weighted objective functions for revenue generation, energy costs, emissions reduction, and battery degradation; and performing genetic operations comprising tournament selection, specialized crossover operators, and mutation operators tailored for dual-flexibility coordination;

implement the optimization process to determine vehicle allocations that balance multiple objectives;

for certain time periods, provide alternative transportation options while allocating associated vehicles to other services;

present allocation decisions to users;

manage financial transactions associated with the vehicle services; and transmit allocation instructions to at least one of an onboard controller of each of the plurality of electric vehicles or a charging infrastructure controller to control vehicle charging and discharging operations based on the determined allocations.

2. The system of claim 1, wherein the scheduling information designates time periods as one of: needed for personal use with no alternative, available for system allocation, or needed for personal use with an acceptable alternative.

3. The system of claim 1, wherein the data related to transportation networks and electricity networks comprises at least one of: energy mix temporal forecasts, earth observation data, emission-based route penalties, electricity pricing data, grid demand signals, or traffic patterns.

4. The system of claim 1, wherein the optimization process comprises a hierarchical optimization approach operating across multiple time horizons including long-term planning, day-ahead scheduling, and real-time dispatch layers.

5. The system of claim 1, wherein the multiple objectives include at least two of: revenue generation, energy cost minimization, emissions reduction, renewable energy utilization, battery health preservation, and service reliability.

6. The system of claim 1, wherein the system applies a genetic algorithm to balance multiple objectives while satisfying vehicle-specific constraints and system-level constraints.

7. The system of claim 1, wherein managing financial transactions includes recording service verification, compensation calculation, and transaction execution using a distributed ledger system.

8. The system of claim 1, wherein the system generates dynamic pricing for transportation network segments based on real-time emissions data obtained from satellite measurements and ground-based sensors.

9. The system of claim 1, wherein the system calculates net emissions impact by aggregating emissions reductions from both transportation services and electricity grid services provided by the electric vehicles.

10. The system of claim 1, wherein the system predicts future conditions in both transportation and electricity domains using machine learning models trained on historical data and continuously updated with real-time operational data.

11. A computer-implemented method for integrated management of electric vehicles, comprising the steps of:

acquiring data related to transportation networks and electricity networks, wherein the acquired data comprises energy mix temporal forecasts, earth observation measurements of atmospheric emissions, and emission-based route penalties;

receiving scheduling information for a plurality of electric vehicles, wherein the scheduling information designates time periods according to different availability categories;

allocating the plurality of electric vehicles between transportation services and electricity grid services based on the scheduling information and the acquired data, wherein allocating comprises:

implementing a hierarchical optimization approach that operates across multiple time horizons comprising at least a long-term planning layer, a day-ahead scheduling layer, and a real-time dispatch layer, wherein each layer operates at different temporal granularities and provides inputs to subsequent layers; and applying genetic algorithm optimization process comprising:

encoding vehicle schedules as chromosomes representing complete allocation patterns across the plurality of electric vehicles and time periods;

evaluating fitness of each chromosome based on weighted objective functions for revenue generation, energy costs, emissions reduction, and battery degradation; and performing genetic operations comprising tournament selection, specialized crossover operators, and mutation operators tailored for dual-flexibility coordination;

implementing the optimization process to determine vehicle allocations that balance multiple objectives;

for certain time periods, providing alternative transportation options while allocating associated vehicles to other services;

presenting allocation decisions to users;

managing financial transactions associated with the vehicle services; and transmitting allocation instructions to at least one of an onboard controller of each of the plurality of electric vehicles or a charging infrastructure controller to control vehicle charging and discharging operations based on the determined allocations.

12. The method of claim 11, wherein the scheduling information designates time periods as one of: needed for personal use with no alternative, available for system allocation, or needed for personal use with an acceptable alternative.

13. The method of claim 11, wherein the data related to transportation networks and electricity networks comprises at least one of: energy mix temporal forecasts, earth observation data, emission-based route penalties, electricity pricing data, grid demand signals, or traffic patterns.

14. The method of claim 11, wherein the optimization process comprises a hierarchical optimization approach operating across multiple time horizons including long-term planning, day-ahead scheduling, and real-time dispatch layers.

15. The method of claim 11, wherein the multiple objectives include at least two of: revenue generation, energy cost minimization, emissions reduction, renewable energy utilization, battery health preservation, and service reliability.

16. The method of claim 11, wherein implementing the optimization process includes applying a genetic algorithm to balance the multiple objectives while satisfying vehicle-specific constraints and system-level constraints.

17. The method of claim 11, wherein managing financial transactions includes recording service verification, compensation calculation, and transaction execution using a distributed ledger system.

18. The method of claim 11, further comprising generating dynamic pricing for transportation network segments based on real-time emissions data obtained from satellite measurements and ground-based sensors.

19. The method of claim 11, further comprising calculating net emissions impact by aggregating emissions reductions from both transportation services and electricity grid services provided by the electric vehicles.

20. The method of claim 11, further comprising predicting future conditions in both transportation and electricity domains using machine learning models trained on historical data and continuously updated with real-time operational data.

* * * * *